US012451148B2

(12) United States Patent
Sugiura et al.

(10) Patent No.: US 12,451,148 B2
(45) Date of Patent: *Oct. 21, 2025

(54) SOUND SIGNAL REFINEMENT METHOD, SOUND SIGNAL DECODE METHOD, APPARATUS THEREOF, PROGRAM, AND STORAGE MEDIUM

(71) Applicant: NTT, Inc., Tokyo (JP)

(72) Inventors: Ryosuke Sugiura, Tokyo (JP); Takehiro Moriya, Tokyo (JP); Yutaka Kamamoto, Tokyo (JP)

(73) Assignee: NTT, Inc., Tokyo (JP)

( * ) Notice: Subject to any disclaimer, the term of this patent is extended or adjusted under 35 U.S.C. 154(b) by 178 days.

This patent is subject to a terminal disclaimer.

(21) Appl. No.: 18/031,579

(22) PCT Filed: Nov. 5, 2020

(86) PCT No.: PCT/JP2020/041400

§ 371 (c)(1),
(2) Date: Apr. 12, 2023

(87) PCT Pub. No.: WO2022/097237

PCT Pub. Date: May 12, 2022

(65) Prior Publication Data

US 2023/0377585 A1 Nov. 23, 2023

(51) Int. Cl.
*G10L 19/008* (2013.01)
*G10L 21/043* (2013.01)

(52) U.S. Cl.
CPC .......... *G10L 19/008* (2013.01); *G10L 21/043* (2013.01)

(58) Field of Classification Search
CPC ...... G10L 19/008; G10L 21/043; G10L 19/18
See application file for complete search history.

(56) References Cited

U.S. PATENT DOCUMENTS

| | | | | |
|---|---|---|---|---|
| 2003/0236583 | A1 * | 12/2003 | Baumgarte ............. | H04S 5/005 700/94 |
| 2008/0010072 | A1 | 1/2008 | Yoshida et al. | |
| 2011/0224994 | A1 * | 9/2011 | Norvell ................. | G10L 19/008 704/500 |

(Continued)

FOREIGN PATENT DOCUMENTS

| | | | |
|---|---|---|---|
| JP | 2005117132 | A | 4/2005 |
| WO | 2006070751 | A1 | 7/2006 |

*Primary Examiner* — Michael N Opsasnick

(57) ABSTRACT

There is provided a technology that improves, in a case where there is a sound signal obtained from a different code that is different from a code from which a decoded sound signal is obtained and that is derived from the same sound signal, the decoded sound signal by using the sound signal obtained from the different code. A signal (hereinafter, referred to as an upmixed common signal) obtained by upmixing a decoded sound common signal obtained by downmixing a decoded sound signal of each channel is subjected to signal purification using a signal (hereinafter, referred to as an upmixed monaural decoded sound signal) obtained by upmixing a monaural decoded sound signal to thereby generate a purified upmixed signal, and in each channel, the upmixed common signal is subtracted from the decoded sound signal and the purified upmixed signal is added thereto, to thereby generate a purified decoded sound signal.

14 Claims, 33 Drawing Sheets

(56) References Cited

U.S. PATENT DOCUMENTS

| | | | | |
|---|---|---|---|---|
| 2013/0262130 | A1* | 10/2013 | Ragot | G10L 19/008 704/500 |
| 2013/0301835 | A1* | 11/2013 | Briand | H04S 7/00 381/17 |
| 2014/0098963 | A1* | 4/2014 | Lang | G10L 19/008 381/23 |
| 2016/0064004 | A1* | 3/2016 | Laaksonen | G10L 19/22 704/500 |
| 2019/0156841 | A1* | 5/2019 | Fatus | G10L 19/008 |
| 2019/0189134 | A1* | 6/2019 | Li | G10L 19/008 |
| 2019/0392847 | A1* | 12/2019 | Vasilache | G10L 19/035 |
| 2020/0286495 | A1* | 9/2020 | Norvell | G10L 19/008 |
| 2023/0377585 | A1* | 11/2023 | Sugiura | G10L 19/008 |
| 2023/0386480 | A1* | 11/2023 | Sugiura | G10L 19/008 |
| 2023/0386481 | A1* | 11/2023 | Sugiura | G10L 19/26 |
| 2023/0386482 | A1* | 11/2023 | Sugiura | G10L 19/008 |
| 2023/0386497 | A1* | 11/2023 | Sugiura | G10L 19/008 |
| 2023/0395081 | A1* | 12/2023 | Sugiura | G10L 25/69 |
| 2023/0395092 | A1* | 12/2023 | Sugiura | G10L 19/008 |
| 2023/0402051 | A1* | 12/2023 | Sugiura | G10L 19/26 |
| 2023/0410832 | A1* | 12/2023 | Sugiura | G10L 21/0388 |
| 2024/0119947 | A1* | 4/2024 | Sugiura | G10L 19/26 |

* cited by examiner

SOUND SIGNAL REFINEMENT METHOD, SOUND SIGNAL DECODE METHOD, APPARATUS THEREOF, PROGRAM, AND STORAGE MEDIUM

CROSS-REFERENCE TO RELATED APPLICATIONS

This application is a U.S. National Stage Application filed under 35 U.S.C. § 371 claiming priority to International Patent Application No. PCT/JP2020/041400, filed on 5 Nov. 2020, the disclosure of which is hereby incorporated herein by reference in its entirety.

TECHNICAL FIELD

The present invention relates to a technique for post-processing a sound signal obtained by decoding a code.

BACKGROUND ART

As a technique for efficiently using a monaural code and a stereo code to encode/decode a stereo sound signal, there is a technique of Patent Literature 1. Patent Literature 1 discloses a scalable encoding/decoding method in which a monaural code representing a monaural signal and a stereo code representing a difference of a stereo signal from the monaural signal are obtained on the encoding side, and on the decoding side, a monaural decoded sound signal and a stereo decoded sound signal are obtained by performing decoding processing corresponding to the encoding side (see FIGS. 7 and 8).

As a technique of encoding, transmitting, and decoding a sound signal by a terminal connected to two lines having different priorities, there is a technique of Patent Literature 2. Patent Literature 2 discloses a technique in which a code for securing minimum quality is included in a packet with high priority and transmitted, and other codes are included in a packet with low priority and transmitted (see FIG. 1 and the like).

In a case where the scalable encoding/decoding method of Patent Literature 1 is used in the system of Patent Literature 2, it is only required to include the monaural code in the packet with high priority and include the stereo code in the packet with low priority on the transmission side. In this manner, on the reception side, a monaural decoded sound signal can be obtained using only the monaural code in a case where only the packet with high priority has arrived, and a stereo decoded sound signal can be obtained using both the monaural code and the stereo code in a case where the packet with low priority has also arrived in addition to the packet with high priority.

CITATION LIST

Patent Literature

Patent Literature 1: WO 2006/070751
Patent Literature 2: JP 2005-117132 A

SUMMARY OF INVENTION

Technical Problem

In a case where communication is performed by terminals connected to two lines having different priorities, a case where a monaural encoding/decoding method and a stereo encoding/decoding method independent from each other are used instead of using the scalable encoding/decoding method is also assumed. Further, a case of using the monaural encoding/decoding method and the stereo encoding/decoding method independent from each other in one line having the same priority is also assumed. In these cases, on the reception side, only the stereo code is used to obtain the stereo decoded sound signal regardless of whether or not the monaural code has arrived in addition to the stereo code. That is, in a case where stereo decoding independent of monaural decoding is performed on the reception side, even if the monaural code and the stereo code independent of each other derived from the same sound signal are input, there is a problem that the information included in the monaural code is not utilized in processing of obtaining the stereo sound signal output by the device on the reception side.

Therefore, it is an object of the present invention to improve, in a case where there is a sound signal obtained from a different code, a decoded sound signal by using the sound signal obtained from the different code, the different code being different from a code from which the decoded sound signal is obtained and being derived from the same sound signal.

Solution to Problem

One aspect of the present invention is a sound signal purification method for obtaining, for each frame, an n-th channel purified decoded sound signal $\tilde{X}_n$ that is a sound signal of each channel of stereo by using at least an n-th channel decoded sound signal $\hat{X}_n$ (n is each integer of 1 or more and N or less) that is a decoded sound signal of the each channel of the stereo obtained by decoding a stereo code CS and a monaural decoded sound signal $\hat{X}_M$ that is a monaural decoded sound signal obtained by decoding a monaural code CM that is a code different from the stereo code CS, in which the n-th channel decoded sound signal $\hat{X}_n$ is obtained by decoding the stereo code CS without using either information obtained by decoding the monaural code CM or the monaural code CM, and the sound signal purification method further includes a decoded sound common signal estimation step of obtaining, for the each frame, a decoded sound common signal $\hat{Y}_M$ that is a signal common to all channels of the stereo by using at least all of one or more and N or less n-th channel decoded sound signals $\hat{X}_n$, a decoded sound common signal upmixing step of obtaining, for the each frame, an n-th channel upmixed common signal $\hat{Y}_{Mn}$ that is a signal obtained by upmixing the decoded sound common signal $\hat{Y}_M$ for the each channel by an upmixing process using the decoded sound common signal $\hat{Y}_M$ and inter-channel relationship information that is information indicating a relationship between the channels of the stereo, a monaural decoded sound upmixing step of obtaining, for the each frame, an n-th channel upmixed monaural decoded sound signal $\hat{X}_{Mn}$ that is a signal obtained by upmixing the monaural decoded sound signal $\hat{X}_M$ for the each channel by an upmixing process using the monaural decoded sound signal $\hat{X}_M$ and information indicating a relationship between the channels of the stereo, an n-th channel signal purification step of obtaining, for the each frame and for each corresponding sample t with respect to the each channel n, a sequence based on a value $\tilde{y}_{Mn}(t)=(1-\alpha_{Mn})\times\hat{y}_{Mn}(t)+\alpha_{Mn}\times\hat{x}_{Mn}(t)$ obtained by adding a value $\alpha_{Mn}\times\hat{x}_{Mn}(t)$ obtained by multiplying an n-th channel purification weight $\alpha_{Mn}$ by a sample value $\hat{x}_{Mn}(t)$ of the n-th channel upmixed monaural decoded sound signal $\hat{X}_{Mn}$ and a value $(1-\alpha_{Mn})\times\hat{y}_{Mn}(t)$ obtained by multiplying a value $(1-\alpha_{Mn})$ obtained by subtracting the n-th channel purification weight $\alpha_{Mn}$ from 1 by a sample value $\hat{}y_{Mn}(t)$ of the n-th channel upmixed common signal $\hat{}Y_{Mn}$, as an n-th channel purified upmixed signal $\tilde{}Y_{Mn}$, an n-th channel separation combination weight estimation step of obtaining, for the each frame with respect to the each channel n, a normalized inner product value for the n-th channel upmixed common signal $\hat{}Y_{Mn}$ of the n-th channel decoded sound signal $\hat{}X_n$ as an n-th channel separation combination weight $\beta_n$, and an n-th channel separation combination step of obtaining, for the each frame and for each corresponding sample t with respect to the each channel n, a sequence based on a value $\tilde{}x_n(t)=\hat{}x_n(t)-\beta_n\times\hat{}y_{Mn}(t)+\beta_n\times\tilde{}y_{Mn}(t)$ obtained by subtracting a value $\beta_n\times\hat{}y_{Mn}(t)$ obtained by multiplying the n-th channel separation combination weight $\beta_n$ by the sample value $\hat{}y_{Mn}(t)$ of the n-th channel upmixed common signal $\hat{}Y_{Mn}$ from a sample value $\hat{}x_n(t)$ of the n-th channel decoded sound signal $\hat{}X_n$ and adding a value $\beta_n\times\tilde{}y_{Mn}(t)$ obtained by multiplying the n-th channel separation combination weight $\beta_n$ by a sample value $\tilde{}y_{Mn}(t)$ of the n-th channel purified upmixed signal $\tilde{}Y_{Mn}$, as the n-th channel purified decoded sound signal $\tilde{}X_n$.

Advantageous Effects of Invention

According to the present invention, in a case where there is a sound signal obtained from a different code that is different from a code from which a decoded sound signal is obtained and that is derived from the same sound signal, the decoded sound signal can be improved by using the sound signal obtained from the different code.

DESCRIPTION OF EMBODIMENTS

Prior to the description of each embodiment, a notation method in this description will be described.

A superscript "^" or "~" such as ^x or ~x for a certain character x should be originally described directly above the "x", but is described as ^x or ~x due to restriction of notation in the description.

<Encoding Device and Decoding Device to which Present Invention is Applied>

First, before describing each embodiment, an encoding device and a decoding device to which the invention is applied will be described using an example in a case where the number of channels of stereo is two.

<<Encoding device 500>>

Figure 32:
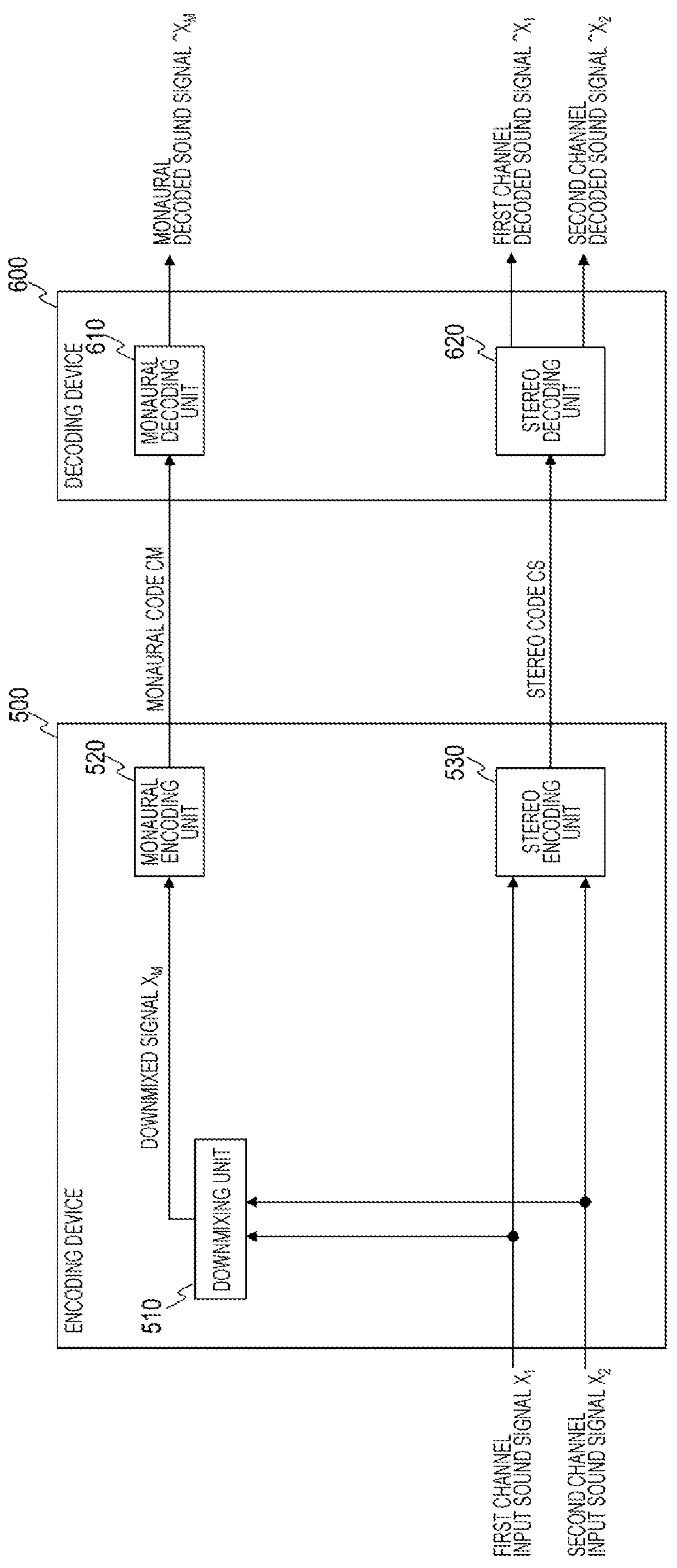
FIG. 32 is a block diagram illustrating an example of an encoding device 500 and a decoding device 600.

As illustrated in FIG. 32, the encoding device 500 as an application destination includes a downmixing unit 510, a monaural encoding unit 520, and a stereo encoding unit 530. The encoding device 500 encodes an input sound signal in a time domain of two-channel stereo in units of frames having a predetermined time length of 20 ms, for example, to obtain and output a monaural code CM and a stereo code CS to be described later. The sound signal in the time domain of two-channel stereo to be input to the encoding device is, for example, a digital voice signal or acoustic signal obtained by AD conversion of sound of voice, music, or the like collected by each of two microphones, and includes a first channel input sound signal that is an input sound signal of a left channel and a second channel input sound signal that is an input sound signal of a right channel. The monaural code CM and the stereo code CS, which are codes output by the encoding device 500, are input to the decoding device 600. In the encoding device 500, each unit described above performs the following processing for each frame. For example, the frame length is 20 ms, and the sampling frequency is 32 kHz. Assuming that the number of samples per frame is T, T is 640 in this example.

[Downmixing Unit 510]

The first channel input sound signal and the second channel input sound signal input to the encoding device 500 are input to the downmixing unit 510. From the first channel input sound signal and the second channel input sound signal, the downmixing unit 510 obtains and outputs a downmixed signal that is a signal obtained by mixing the first channel input sound signal and the second channel input sound signal. The downmixing unit 510 obtains the downmixed signal by, for example, the following first method or second method.

[[First Method for Obtaining Downmixed Signal]]

In the first method, the downmixing unit 510 obtains a sequence based on an average value of sample values for each corresponding sample of a first channel input sound signal $X_1=\{x_1(1), x_1(2), \ldots, x_1(T)\}$ and a second channel input sound signal $X_2=\{x_2(1), x_2(2), \ldots, x_2(T)\}$ as a downmixed signal $X_M=\{x_M(1), x_M(2), \ldots, x_M(T)\}$ (step S510A). That is, when each sample number (index of each sample) is t, $x_M(t)=(x_1(t)+x_2(t))/2$.

[[Second Method for Obtaining Downmixed Signal]]

In the second method, the downmixing unit 510 performs the following steps S510B-1 to S510B-3.

The downmixing unit 510 first obtains an inter-channel time difference T from the first channel input sound signal and the second channel input sound signal (step S510B-1). The inter-channel time difference T is information indicating how far ahead the same sound signal is included in the first channel input sound signal or the second channel input sound signal. The downmixing unit 510 may obtain the inter-channel time difference T by any known method, and is only required to obtain the inter-channel time difference T by, for example, a method exemplified in an inter-channel relationship information estimation unit 1132 described later in a second embodiment. When the downmixing unit 510 uses the method exemplified in the inter-channel relationship information estimation unit 1132 described later in the second embodiment, the inter-channel time difference T is a positive value in a case where the same sound signal is included in the first channel input sound signal before the second channel input sound signal, and the inter-channel time difference T is a negative value in a case where the same sound signal is included in the second channel input sound signal before the first channel input sound signal.

Next, the downmixing unit 510 obtains a correlation value between a sample sequence of the first channel input sound signal and a sample sequence of the second channel input sound signal at a position shifted backward from the sample sequence by the inter-channel time difference T, as an inter-channel correlation coefficient γ (step S510B-2).

Next, the downmixing unit 510 performs weighted averaging on the first channel input sound signal and the second channel input sound signal so that the input sound signal of a preceding channel out of the first channel input sound signal $X_1=\{x_1(1), x_1(2), \ldots, x_1(T)\}$ and the second channel input sound signal $X_2=\{x_2(1), x_2(2), \ldots, x_2(T)\}$ is included to be larger in the downmixed signal $X_M=\{x_M(1), x_M(2), \ldots, x_M(T)\}$ as the inter-channel correlation coefficient γ is larger, to obtain and output the downmixed signal (step S510B-3). For example, the downmixing unit 510 is only required to weight and add the first channel input sound signal $x_1(t)$ and the second channel input sound signal $x_2(t)$ to each corresponding sample number t using a weight determined by the inter-channel correlation coefficient γ to obtain the downmixed signal $x_M(t)$. Specifically, the downmixing unit 510 is only required to obtain $x_M(t)=((1+\gamma)/2)\times x_1(t)+((1-\gamma)/2)\times x_2(t)$ in a case where the inter-channel time difference τ is a positive value, that is, in a case where the first channel is preceding, and obtain $x_M(t)=((1-\gamma)/2)\times x_1(t)+((1+\gamma)/2)\times x_2(t)$ in a case where the inter-channel time difference τ is a negative value, that is, in a case where the second channel is preceding, as the downmixed signal $x_M(t)$. In a case where the inter-channel time difference τ is zero, that is, in a case where neither channel is preceding, the downmixing unit 510 is only required to set $x_M(t)=(x_1(t)+x_2(t))/2$ obtained by averaging the first channel input sound signal $x_1(t)$ and the second channel input sound signal $x_2(t)$ as the downmixed signal $x_M(t)$ for each sample number t.

[Monaural Encoding Unit 520]

The downmixed signal output by the downmixing unit 510 is input to the monaural encoding unit 520. The monaural encoding unit 520 encodes the input downmixed signal with $b_M$ bits by a predetermined encoding method to obtain and output the monaural code CM. That is, the $b_M$-bit monaural code CM is obtained from the input downmixed signal $X_M=\{x_M(1), x_M(2), \ldots, x_M(T)\}$ of T samples and is output. Any encoding method may be used, and for example, it is only required to use an encoding method such as the 3GPP EVS standard.

[Stereo Encoding Unit 530]

The first channel input sound signal and the second channel input sound signal input to the encoding device 500 are input to the stereo encoding unit 530. The stereo encoding unit 530 encodes the first channel input sound signal and the second channel input sound signal with $b_s$ bits in total by a predetermined encoding method to obtain and output the stereo code CS. That is, the stereo code CS of $b_s$ bits in total is obtained from the first channel input sound signal $X_1=\{x_1(1), x_1(2), \ldots, x_1(T)\}$ of the T samples and the second channel input sound signal $X_2=\{x_2(1), x_2(2), \ldots, x_2(T)\}$ of the T samples and is output. Any method may be used as the encoding method, and for example, a stereo encoding method compatible with the stereo decoding method of the MPEG-4 AAC standard may be used, or an encoding method for independently encoding each of the input first channel input sound signal and the input second channel input sound signal may be used. Regardless of which encoding method is used, it is only required to use a code obtained by combining all codes obtained by encoding as the stereo code CS.

Since the monaural code CM is a code obtained by the monaural encoding unit 520 as described above and the stereo code CS is a code obtained by the stereo encoding unit 530 as described above, the monaural code CM and the stereo code CS are different codes that do not include overlapping codes. That is, the monaural code CM is a code different from the stereo code CS, and the stereo code CS is a code different from the monaural code CM.

<<Decoding Device 600>>

As illustrated in FIG. 32, the decoding device 600 as an application destination includes a monaural decoding unit 610 and a stereo decoding unit 620. The decoding device 600 decodes the input monaural code CM in units of frames having the same time length as those of the corresponding encoding device 500 to obtain and output a monaural decoded sound signal that is a decoded sound signal in the monaural time domain, and decodes the input stereo code CS to obtain and output a first channel decoded sound signal and a second channel decoded sound signal that are decoded sound signals in the two-channel stereo time domain. In the decoding device 600, each unit described above performs the following processing for each frame.

[Monaural Decoding Unit 610]

The monaural code CM input to the decoding device 600 is input to the monaural decoding unit 610. The monaural decoding unit 610 decodes the monaural code CM by a predetermined decoding method to obtain and output the monaural decoded sound signal $\hat{}X_M=\{\hat{}x_M(1), \hat{}x_M(2), \ldots, \hat{}x_M(T)\}$. That is, the monaural decoding unit 610 decodes the monaural code CM, which is a code different from the stereo code CS, without using information obtained by decoding the stereo code CS or the stereo code CS, to obtain the monaural decoded sound signal $\hat{}X_M$. As the predetermined decoding method, a decoding method corresponding to the encoding method used by the monaural encoding unit 520 of the corresponding encoding device 500 is used. The number of bits of the monaural code CM is $b_M$.

[Stereo Decoding Unit 620]

The stereo code CS input to the decoding device 600 is input to the stereo decoding unit 620. The stereo decoding unit 620 decodes the stereo code CS by a predetermined decoding method to obtain and output a first channel decoded sound signal $\hat{}X_1=\{\hat{}x_1(1), \hat{}x_1(2), \ldots, \hat{}x_1(T)\}$ that is a decoded sound signal of the left channel and a second channel decoded sound signal $\hat{}X_2=\{\hat{}x_2(1), \hat{}x_2(2), \ldots, \hat{}x_2(T)\}$ that is a decoded sound signal of the right channel. That is, the stereo decoding unit 620 decodes the stereo code CS, which is a code different from the monaural code CM, without using information obtained by decoding the monaural code CM or the monaural code CM, to obtain the first channel decoded sound signal $\hat{}X_1$ and the second channel decoded sound signal $\hat{}X_2$. As the predetermined decoding method, a decoding method corresponding to the encoding method used by the stereo encoding unit 530 of the corresponding encoding device 500 is used. The total number of bits of the stereo code CS is $b_s$.

Since the encoding device 500 and the decoding device 600 operate as described above, the monaural code CM is a code derived from the same sound signal as the sound signal from which the stereo code CS is derived (that is, the first channel input sound signal $X_1$ and the second channel input sound signal $X_2$ input to the encoding device 500), but is a code different from the code from which the first channel decoded sound signal $\hat{}X_1$ and the second channel decoded sound signal $\hat{}X_2$ are obtained (that is, the stereo code CS).

First Embodiment

A sound signal purification device of a first embodiment improves a decoded sound signal of the each channel of the stereo by using a monaural decoded sound signal obtained from a code different from a code from which the decoded sound signal is obtained. Hereinafter, a sound signal purification device of the first embodiment will be described using an example in a case where the number of channels of the stereo is two.

<<Sound Signal Purification Device 1101>>

Figure 1:
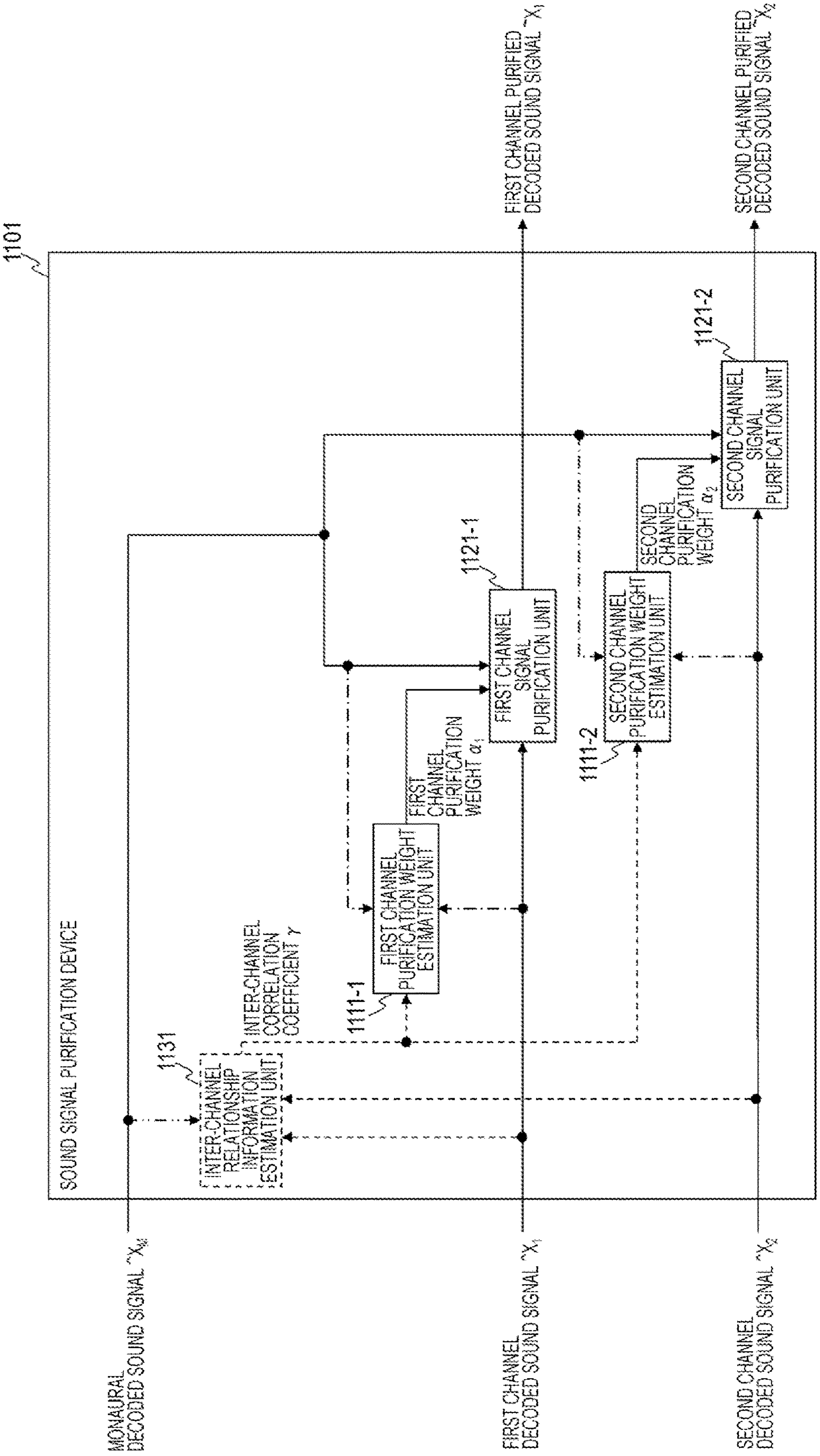
FIG. 1 is a block diagram illustrating an example of a sound signal purification device 1101.
Figure 2:
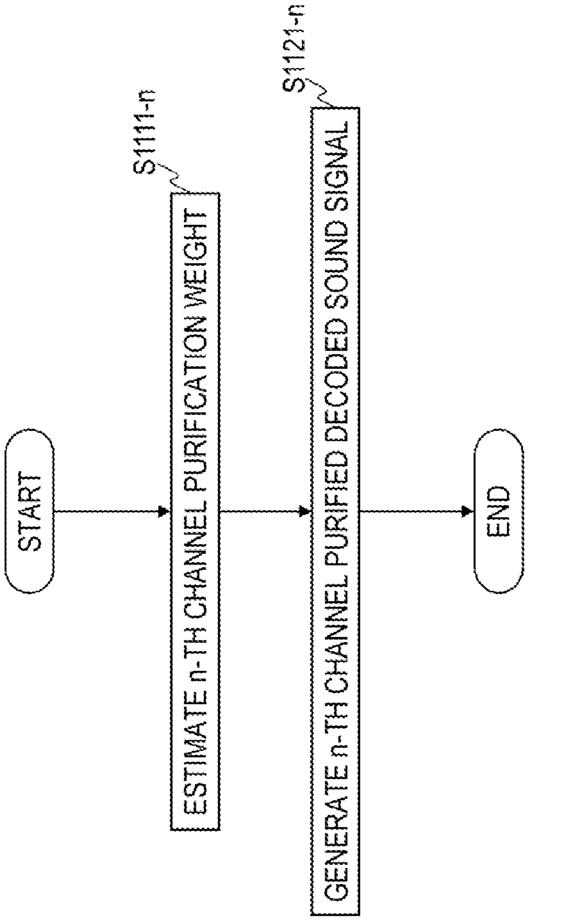
FIG. 2 is a flowchart illustrating an example of processing of the sound signal purification device 1101.

As illustrated in FIG. 1, the sound signal purification device 1101 of the first embodiment includes a first channel purification weight estimation unit 1111-1, a first channel signal purification unit 1121-1, a second channel purification weight estimation unit 1111-2, and a second channel signal purification unit 1121-2. The sound signal purification device 1101 obtains and outputs, for the each channel of the stereo in units of frames having a predetermined time length of 20 ms, for example, a purified decoded sound signal, which is a sound signal obtained by improving the decoded sound signals of the channel, from the monaural decoded sound signal and the decoded sound signal of the channel. The decoded sound signals of the respective channels input in units of frames to the sound signal purification device 1101 are, for example, the first channel decoded sound signal $\hat{}X_1=\{x_1(1), \hat{}x_1(2), \ldots, \hat{}x_1(T)\}$ of the T samples and the second channel decoded sound signal $\hat{}X_2=\{x_2(1), \hat{}x_2(2), \ldots, \hat{}x_2(T)\}$ of the T samples obtained by the stereo decoding unit 620 of the decoding device 600 described above decoding the $b_s$-bit stereo code CS that is a code different from the monaural code CM without using the information obtained by decoding the monaural code CM or the monaural code CM. The monaural decoded sound signal input in units of frames to the sound signal purification device 1101 is, for example, the monaural decoded sound signal $\hat{}X_M=\{x_M(1), \hat{}x_M(2), \ldots, \hat{}x_M(T)\}$ of the T samples obtained by the monaural decoding unit 610 of the decoding device 600 described above decoding the $b_M$-bit monaural code CM that is a code different from the stereo code CS without using the information obtained by decoding the stereo code CS or the stereo code CS. The monaural code CM is a code derived from the same sound signal as the sound signal from which the stereo code CS is derived (that is, the first channel input sound signal $X_1$ and the second channel input sound signal $X_2$ input to the encoding device 500), but is a code different from the code from which the first channel decoded sound signal $\hat{}X_1$ and the second channel decoded sound signal $\hat{}X_2$ are obtained (that is, the stereo code CS). Assuming that the channel number n (channel index n) of the first channel is 1 and the channel number n of the second channel is 2, the sound signal purification device 1101 performs steps S1111-*n* and S1121-*n* illustrated in FIG. 2 for the each channel for the each frame. That is, hereinafter, unless otherwise specified, as each unit or step to which "−n" is attached, a unit or step corresponding to the each channel exists, and specifically, each unit or step for the first channel to which "−1" is attached instead of "−n" and each unit or step for the second channel to which "−2" is attached instead of "−n" are present. Similarly, in the following description, unless otherwise specified, a suffix or the like with a notation of "n" indicates that there is one corresponding to each channel number, and specifically, there are one corresponding to the first channel to which "1" is added in place of "n" and one corresponding to the second channel to which "2" is added in place of "n".

[n-th Channel Purification Weight Estimation Unit 1111-*n*]

An n-th channel purification weight estimation unit 1111-*n* obtains and outputs an n-th channel purification weight $\alpha_n$ (step 1111-*n*). The n-th channel purification weight estimation unit 1111-*n* obtains the n-th channel purification weight $\alpha_n$ by a method based on a principle of minimizing a quantization error to be described later. The principle of minimizing the quantization error and the method based on this principle will be described later. The n-th channel decoded sound signal $\hat{}X_n=\{\hat{}x_n(1), \hat{}x_n(2), \ldots, \hat{}x_n(T)\}$ input to the sound signal purification device 1101 and the monaural decoded sound signal $\hat{}X_M=\{\hat{}x_M(1), \hat{}x_M(2), \ldots, \hat{}x_M(T)\}$ input to the sound signal purification device 1101 are input to the n-th channel purification weight estimation unit 1111-*n* as necessary as indicated by a one-dot chain line in FIG. 1. The n-th channel purification weight $\alpha_n$ obtained by the n-th channel purification weight estimation unit 1111-*n* is a value of 0 or more and 1 or less. However, since the n-th channel purification weight estimation unit 1111-*n* obtains the n-th channel purification weight $\alpha_n$ for the each frame by the method to be described later, the n-th channel purification weight $\alpha_n$ does not become zero or one in all frames. That is, there is a frame in which the n-th channel purification weight $\alpha_n$ is a value larger than 0 and smaller than 1. In other words, in at least any one of all the frames, the n-th channel purification weight $\alpha_n$ is a value larger than 0 and smaller than 1.

[n-th Channel Signal Purification Unit 1121-*n*]

The n-th channel decoded sound signal $\hat{X}_n=\{\hat{x}_n(1), \hat{x}_n(2), \ldots, \hat{x}_n(T)\}$ input to the sound signal purification device 1101, the monaural decoded sound signal $\hat{X}_M=\{\hat{x}_M(1), \hat{x}_M(2), \ldots, \hat{x}_M(T)\}$ input to the sound signal purification device 1101, and the n-th channel purification weight $\alpha_n$ output by the n-th channel purification weight estimation unit 1111-*n* are input to the n-th channel signal purification unit 1121-*n*. For each corresponding sample t, the n-th channel signal purification unit 1121-*n* obtains and outputs a sequence based on a value $\tilde{x}_n(t)$ obtained by adding a value $\alpha_n\times\hat{x}_M(t)$ obtained by multiplying the n-th channel purification weight $\alpha_n$ by a sample value $\hat{x}_M(t)$ of the monaural decoded sound signal $\hat{X}_M$ and a value $(1-\alpha_n)\times\hat{x}_n(t)$ obtained by multiplying a value $(1-\alpha_n)$ obtained by subtracting the n-th channel purification weight $\alpha_n$ from 1 by a sample value $\hat{x}_n(t)$ of the n-th channel decoded sound signal $\hat{X}_n$, as an n-th channel purified decoded sound signal $\tilde{X}_n=\{\tilde{x}_n(1), \tilde{x}_n(2), \ldots, \tilde{x}_n(T)\}$ (step S1121-*n*). That is, $\tilde{x}_n(t)=(1-\alpha_n)\times\hat{x}_n(t)+\alpha_n\times\hat{x}_M(t)$.

[Principle of Minimizing Quantization Error]

Hereinafter, the principle of minimizing the quantization error will be described. Depending on the encoding method/decoding method used by the stereo encoding unit 530 and the stereo decoding unit 620, the number of bits used for encoding the input sound signal of the each channel may not be determined positively, but in the following description, it is assumed that the number of bits used for encoding the input sound signal $X_n$ of the n-th channel is $b_n$.

The outline of the numbers of bits of the codes and the signals in processes of respective units of each device described above are as follows. The stereo encoding unit 530 of the encoding device 500 to which the sound signal purification device 1101 is applied encodes the input sound signal $X_n=\{x_n(1), x_n(2), \ldots, x_n(T)\}$ of the n-th channel to obtain a $b_n$-bit code. The monaural encoding unit 520 of the encoding device 500 to which the sound signal purification device 1101 is applied encodes the downmixed signal $X_M=\{x_M(1), x_M(2), \ldots, x_M(T)\}$ to obtain a $b_M$-bit code. The stereo decoding unit 620 of the decoding device 600 to which the sound signal purification device 1101 is applied obtains the decoded sound signal $\hat{X}_n=\{\hat{x}_n(1), \hat{x}_n(2), \ldots, \hat{x}_n(T)\}$ of the n-th channel from the $b_n$-bit code. The monaural decoding unit 610 of the decoding device 600 to which the sound signal purification device 1101 is applied obtains the monaural decoded sound signal $\hat{X}_M=\{\hat{x}_M(1), \hat{x}_M(2), \ldots, \hat{x}_M(T)\}$ from the $b_M$-bit code. For each corresponding sample t, the n-th channel signal purification unit 1121-*n* of the sound signal purification device 1101 obtains a sequence based on a value $\tilde{x}_n(t)=(1-\alpha_n)\times\hat{x}_n(t)+\alpha_n\times\hat{x}_M(t)$ obtained by adding a value $\alpha_n\times\hat{x}_M(t)$ obtained by multiplying the n-th channel purification weight $\alpha_n$ by the sample value $\hat{x}_M(t)$ of the monaural decoded sound signal $\hat{X}_M$ and a value $(1-\alpha_n)\times\hat{x}_n(t)$ obtained by multiplying a value $(1-\alpha_n)$ obtained by subtracting the n-th channel purification weight $\alpha_n$ from 1 by the sample value $\hat{x}_n(t)$ of the n-th channel decoded sound signal $\hat{X}_n$, as the n-th channel purified decoded sound signal $\tilde{X}_n=\{\tilde{x}_n(1), {}^{18}x_n(2), \ldots, \tilde{x}_n(T)\}$. The sound signal purification device 1101 should be designed so that energy of a quantization error included in the n-th channel purified decoded sound signal $\tilde{X}_n$ obtained by the above processing is small.

In many cases, the energy of a quantization error included in a decoded signal obtained by encoding or decoding an input signal (hereinafter also referred to as a "quantization error caused by encoding" for convenience) is roughly proportional to energy of the input signal, and tends to be exponentially smaller than the value of the number of bits for each sample used for encoding. Therefore, an average energy per sample of the quantization error caused by encoding of the input sound signal $X_n$ of the n-th channel can be estimated as the following Expression (1) using a positive number $\sigma_n^2$. Further, an average energy per sample of the quantization error caused by encoding of the downmixed signal $X_M$ can be estimated as the following Expression (2) using a positive number $\sigma_M^2$.

[Math. 1]

$$\sigma_n^2 2^{-\frac{2b_n}{T}} \quad (1)$$

[Math. 2]

$$\sigma_M^2 2^{-\frac{2b_M}{T}} \quad (2)$$

Here, it is assumed that the input sound signal $X_n=\{x_n(1), x_n(2), \ldots, x_n(T)\}$ of the n-th channel and the downmixed signal $X_M=\{x_M(1), x_M(2), \ldots, x_M(T)\}$ have respective sample values close enough to be regarded as the same sequence. For example, a case where the input sound signal $X_1=\{x_1(1), x_1(2), \ldots, x_1(T)\}$ of the first channel and the input sound signal $X_2=\{x_2(1), x_2(2), \ldots, x_2(T)\}$ of the second channel are obtained by collecting a sound emitted by a sound source at an equal distance from the two microphones under an environment with little background noise or reverberation, or the like corresponds to this condition. Since the energy of the signal including the value obtained by multiplying each sample value of the decoded sound signal $\hat{X}_n=\{\hat{x}_n(1), \hat{x}_n(2), \ldots, \hat{x}_n(T)\}$ of the n-th channel by $(1-\alpha_n)$ can be expressed by $(1-\alpha_n)^2$ times the energy of the downmixed signal, $\sigma_n^2$ of Expression (1) can be replaced with $(1-\alpha)^2\times\sigma_M^2$ using $\sigma_M^2$ described above, and thus the average energy per sample of the quantization error included in the sequence $\{(1-\alpha_n)\times\hat{x}_n(1), (1-\alpha_n)\times\hat{x}_n(2), \ldots, (1-\alpha_n)\times\hat{x}_n(T)\}$ of the value obtained by multiplying each sample value of the decoded sound signal $\hat{X}_n=\{\hat{x}_n(1), \hat{x}_n(2), \ldots, \hat{x}_n(T)\}$ of the n-th channel by $(1-\alpha_n)$ can be estimated as the following Expression (3).

[Math. 3]

$$(1-\alpha_n)^2\sigma_M^2 2^{-\frac{2b_n}{T}} \quad (3)$$

Further, the average energy per sample of the quantization error included in the sequence of values $\{\alpha_n\times x_M(1), \alpha_n\times x_M(2), \ldots, \alpha_n\times x_M(T)\}$ obtained by multiplying each sample value of the monaural decoded sound signal $\hat{X}_M$ by $\alpha_n$ can be estimated as the following Expression (4).

[Math. 4]

$$\alpha_n^2\sigma_M^2 2^{-\frac{2b_M}{T}} \quad (4)$$

Assuming that the quantization error caused by encoding of the input sound signal of the n-th channel and the quantization error caused by encoding of the downmixed signal have no correlation with each other, the average energy per sample of the quantization error included in the n-th channel purified decoded sound signal $\tilde{X}_n=\{\tilde{x}_n(1), \tilde{x}_n(2), \ldots, \tilde{x}_n(T)\}$ is estimated by the sum of Expressions (3) and (4). The n-th channel purification weight $\alpha_n$ that minimizes the energy of the quantization error included in the n-th channel purified decoded sound signal $\tilde{X}_n=\{\tilde{x}_n(1), \tilde{x}_n(2), \ldots, \tilde{x}_n(T)\}$ is obtained as the following Expression (5).

[Math. 5]

$$\alpha_n = \frac{2^{-\frac{2b_n}{T}}}{2^{-\frac{2b_n}{T}}+2^{-\frac{2b_M}{T}}} \quad (5)$$

That is, the n-th channel purification weight estimation unit 1111-*n* is only required to obtain the n-th channel purification weight $\alpha_n$ by Expression (5) in order to minimize the quantization error included in the n-th channel purified decoded sound signal under the condition that the input sound signal $X_n=\{x_n(1), x_n(2), \ldots, x_n(T)\}$ of the n-th channel and the downmixed signal $X_M=\{x_M(1), x_M(2), \ldots, x_M(T)\}$ have respective sample values close enough to be regarded as the same sequence.

[Method Based on Principle of Minimizing Quantization Error]

Hereinafter, a specific example of a method for obtaining the n-th channel purification weight $\alpha_n$ on the basis of the principle of minimizing the quantization error described above will be described.

First Example

A first example is an example of obtaining the n-th channel purification weight $\alpha_n$ by the principle of minimizing the quantization error described above. The n-th channel purification weight estimation unit 1111-*n* of the first example obtains the n-th channel purification weight $\alpha_n$ by Expression (5) using the number of samples T per frame, the number of bits $b_n$ corresponding to the n-th channel in the number of bits of the stereo code CS, and the number of bits $b_M$ of the monaural code CM. The method by which the n-th channel purification weight estimation unit 1111-*n* specifies the number of bits $b_n$ and the number of bits $b_M$ is common to all the examples, and thus will be described after the seventh example which is the last specific example.

Second Example

A second example is an example of obtaining the n-th channel purification weight $\alpha_n$ having a feature similar to the n-th channel purification weight $\alpha_n$ obtained in the first example. The n-th channel purification weight estimation unit 1111-*n* of the second example uses at least the number of bits $b_n$ corresponding to the n-th channel in the number of bits of the stereo code CS and the number of bits $b_M$ of the monaural code CM to obtain a value that is larger than 0 and smaller than 1, 0.5 when $b_n$ and $b_M$ are equal, closer to 0 than 0.5 as $b_n$ is larger than $b_M$, and closer to 1 than 0.5 as $b_M$ is larger than $b_n$ as the n-th channel purification weight $\alpha_n$.

Third Example

A third example is an example of obtaining the n-th channel purification weight $\alpha_n$ in consideration of a case where the input sound signal $X_n=\{x_n(1), x_n(2), \ldots, x_n(T)\}$ of the n-th channel and the downmixed signal $X_M=\{x_M(1), x_M(2), \ldots, x_M(T)\}$ cannot be regarded as the same sequence. In a case where the input sound signal $X_n=\{x_n(1), x_n(2), \ldots, x_n(T)\}$ of the n-th channel and the downmixed signal $X_M=\{x_M(1), x_M(2), \ldots, x_M(T)\}$ do not have respective sample values close enough to be regarded as the same sequence, the signal obtained by the weighted average $(1-\alpha_n)\times\hat{x}_n(t)+\alpha_n\times\hat{x}_M(t)$ has a waveform different from that of the input sound signal $X_n=\{x_n(1), x_n(2), \ldots, x_n(T)\}$ of the n-th channel even in a case where there is no quantization error. Therefore, in a case where there is no correlation at all between the input sound signal $X_n=\{x_n(1), x_n(2), \ldots, x_n(T)\}$ of the n-th channel and the downmixed signal $X_M=\{x_M(1), x_M(2), \ldots, x_M(T)\}$, accuracy can be rather maintained by using the n-th channel decoded sound signal $\hat{X}_n=\{\hat{x}_n(1), \hat{x}_n(2), \ldots, \hat{x}_n(T)\}$ without change as the n-th channel purified decoded sound signal $\tilde{X}_n=\{\tilde{x}_n(1), \tilde{x}_n(2), \ldots, \tilde{x}_n(T)\}$ without performing the weighted average processing described above.

Therefore, in consideration of a case where the input sound signal $X_n=\{x_n(1), x_n(2), \ldots, x_n(T)\}$ of the n-th channel and the downmixed signal $X_M=\{x_M(1), x_M(2), \ldots, x_M(T)\}$ cannot be regarded as the same sequence, the n-th channel signal purification unit 1121-*n* is preferably capable of obtaining the n-th channel purified decoded sound signal $\tilde{X}_n=\{\tilde{x}_n(1), \tilde{x}_n(2), \ldots, \tilde{x}_n(T)\}$ by the weighted average $(1-\alpha n)\times\hat{x}_n(t)+\alpha_n\times\hat{x}_M(t)$ based on the n-th channel purification weight $\alpha_n$, which is closer to the value obtained by the above Expression (5) as the correlation is higher and closer to zero as the correlation is lower, according to the correlation between the n-th channel decoded sound signal $\hat{X}_n=\{\hat{x}_n(1), \hat{x}_n(2), \ldots, \hat{x}_n(T)\}$ and the monaural decoded sound signal $\hat{X}_M=\{\hat{x}_M(1), \hat{x}_M(2), \ldots, \hat{x}_M(T)\}$. As the above correlation, for example, a normalized inner product value $r_n$ for the monaural decoded sound signal $\hat{X}_M=\{x_n(1), \hat{x}_n(2), \ldots, \hat{x}_n(T)\}$ of the n-th channel decoded sound signal $\hat{X}_n=\{\hat{x}_M(1), \hat{x}_M(2), \ldots, \hat{x}_M(T)\}$ can be used as expressed by the following Expression (6).

[Math. 6]

$$r_n = \frac{\sum_{t=1}^{T}\hat{x}_n(t)\hat{x}_M(t)}{\sum_{t=1}^{T}\hat{x}_M(T)\hat{x}_M(t)} \quad (6)$$

Thus, the n-th channel purification weight estimation unit 1111-*n* of the third example obtains the n-th channel purification weight $\alpha_n$ by the following Expression (7) using the normalized inner product value $r_n$ obtained by Expression (6).

[Math. 7]

$$\alpha_n = \frac{2^{-\frac{2b_n}{T}}}{2^{-\frac{2b_n}{T}}+2^{-\frac{2b_M}{T}}}r_n \quad (7)$$

Figure 3:
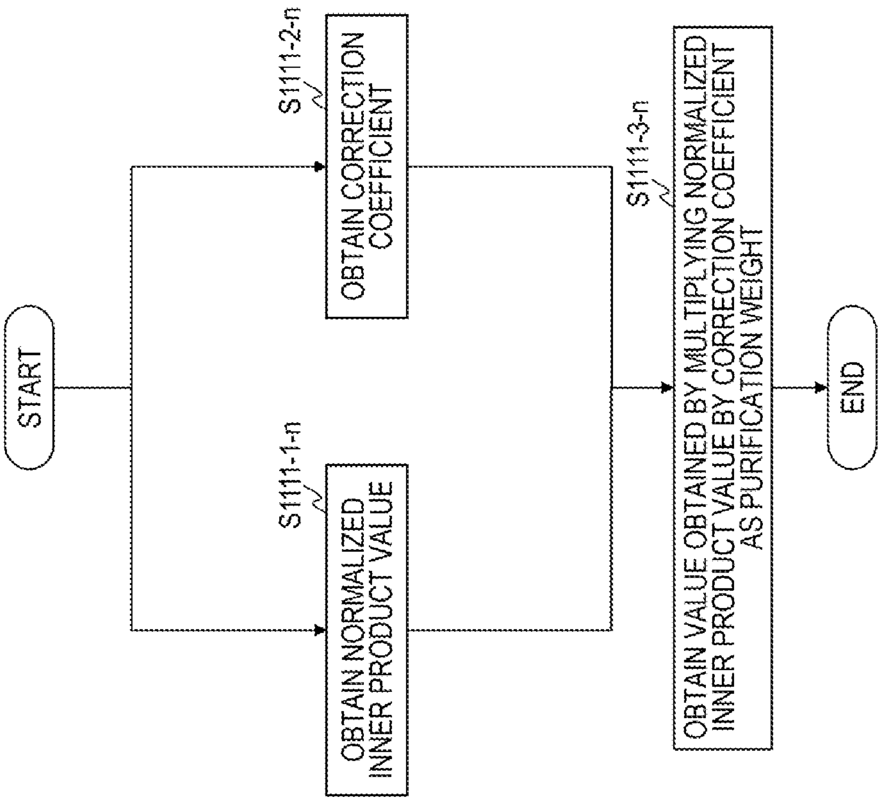
FIG. 3 is a flowchart illustrating an example of processing of an n-th channel purification weight estimation unit 1111-*n*.

For example, the n-th channel purification weight estimation unit 1111-*n* performs steps S1111-1-*n* to S1111-3-*n* illustrated in FIG. 3. The n-th channel purification weight estimation unit 1111-*n* first obtains the inner product value $r_n$ normalized by Expression (6) from the n-th channel decoded sound signal $\hat{X}_n$ and the monaural decoded sound signal $\hat{X}_M$ (step S1111-1-*n*). The n-th channel purification weight estimation unit 1111-*n* also obtains a correction coefficient $c_n$ by the following Expression (8) from the number of samples T per frame, the number of bits $b_n$ corresponding to the n-th channel in the number of bits of the stereo code CS, and the number of bits $b_M$ of the monaural code CM (step S1111-2-*n*).

[Math. 8]

$$c_n = \frac{2^{-\frac{2b_n}{T}}}{2^{-\frac{2b_n}{T}} + 2^{-\frac{2b_M}{T}}} \tag{8}$$

Next, the n-th channel purification weight estimation unit 1111-*n* obtains a value $c_n \times r_n$ obtained by multiplying the normalized inner product value $r_n$ obtained in step S1111-1-*n* by the correction coefficient $c_n$ obtained in step S1111-2-*n* as the n-th channel purification weight $\alpha_n$ (step S1111-3-*n*). That is, the n-th channel purification weight estimation unit 1111-*n* of the third example obtains the value $c_n \times r_n$ obtained by multiplying the correction coefficient $c_n$ obtained by Expression (8) using the number of samples T per frame, the number of bits $b_n$ corresponding to the n-th channel in the number of bits of the stereo code CS, and the number of bits $b_M$ of the monaural code CM by the normalized inner product value $r_n$ for the monaural decoded sound signal $\hat{X}_M$ of the n-th channel decoded sound signal $\hat{X}_n$, as the n-th channel purification weight $\alpha_n$.

Fourth Example

A fourth example is an example of obtaining the n-th channel purification weight $\alpha_n$ having a similar feature to the n-th channel purification weight $\alpha_n$ obtained in the third example. The n-th channel purification weight estimation unit 1111-*n* of the fourth example uses at least the n-th channel decoded sound signal $\hat{X}_n$, the monaural decoded sound signal $\hat{X}_M$, the number of bits $b_n$ corresponding to the n-th channel in the number of bits of the stereo code CS, and the number of bits $b_M$ of the monaural code CM to obtain the value $c_n \times r_n$ obtained by multiplying $r_n$ that is a value of 0 or more and 1 or less, closer to 1 as a correlation between the n-th channel decoded sound signal $\hat{X}_n$ and the monaural decoded sound signal $\hat{X}_M$ is higher, and closer to 0 as the correlation is lower by the correction coefficient $c_n$ that is a value larger than 0 and smaller than 1, 0.5 when $b_n$ and $b_M$ are equal, closer to 0 than 0.5 as $b_n$ is larger than $b_M$, and closer to 1 than 0.5 as $b_n$ is smaller than $b_M$, as the n-th channel purification weight $\alpha_n$.

Fifth Example

Figure 4:
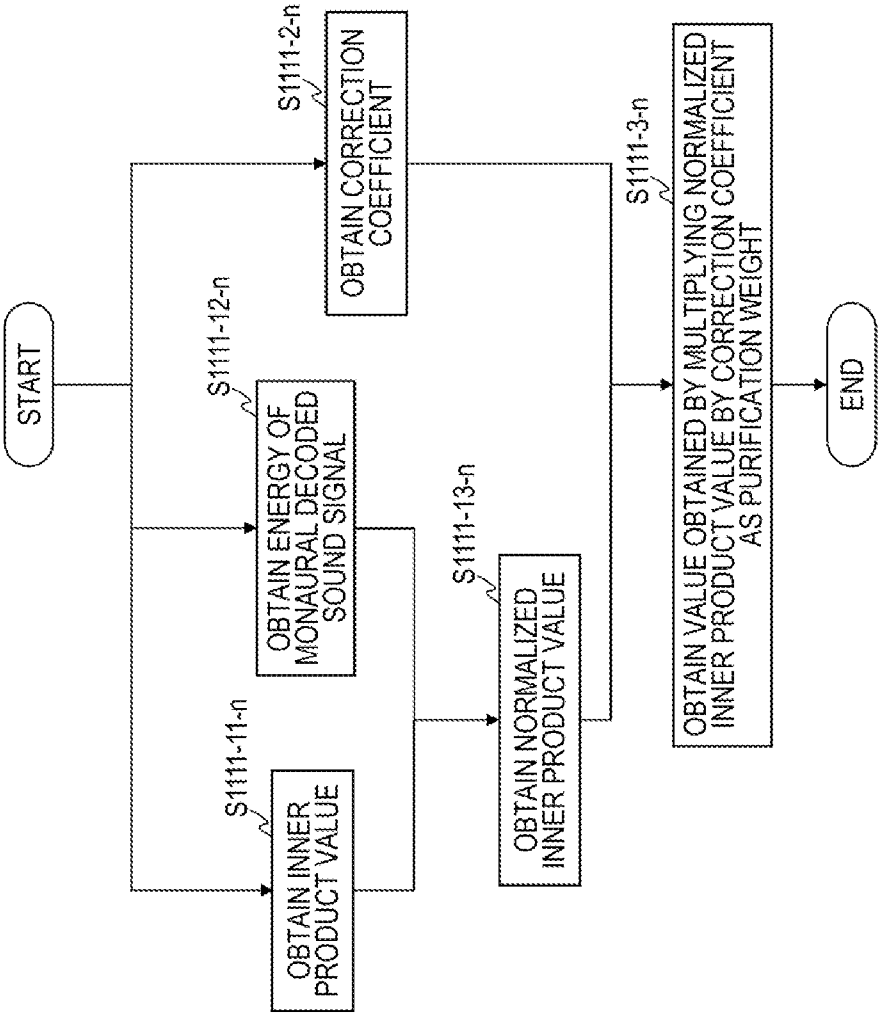
FIG. 4 is a flowchart illustrating an example of processing of the n-th channel purification weight estimation unit 1111-*n*.

A fifth example is an example in which, instead of the normalized inner product value of the third example, a value considering a value of input of a past frame is used. In the fifth example, a rapid variation between frames of the n-th channel purification weight $\alpha_n$ is reduced, and noise generated in the purified decoded sound signal due to the variation is reduced. For example, as illustrated in FIG. 4, the n-th channel purification weight estimation unit 1111-*n* of the fifth example performs the following steps S1111-11-*n* to S1111-13-*n*, and steps S1111-2-*n* and S1111-3-*n* similar to those of the third example.

The n-th channel purification weight estimation unit 1111-*n* first obtains an inner product value $E_n(0)$ to be used in the current frame by the following Expression (9) using the n-th channel decoded sound signal $\hat{X}_n=\{\hat{x}_n(1), \hat{x}_n(2), \ldots, \hat{x}_n(T)\}$, the monaural decoded sound signal $\hat{X}_M=\{\hat{x}_M(1), \hat{x}_M(2), \ldots, \hat{x}_M(T)\}$, and the inner product value $E_n(-1)$ that has been used in the previous frame (step S1111-11-*n*).

[Math. 9]

$$E_n(0) = \epsilon_n E_n(-1) + \frac{(1-\epsilon_n)}{T}\sum_{t=1}^{T}\hat{x}_n(t)\hat{x}_M(t) \tag{9}$$

Here, $\varepsilon_n$ is a predetermined value larger than 0 and smaller than 1, and is stored in advance in the n-th channel purification weight estimation unit 1111-*n*. Note that the n-th channel purification weight estimation unit 1111-*n* stores the obtained inner product value $E_n(0)$ in the n-th channel purification weight estimation unit 1111-*n* in order to use this inner product value $E_n(0)$ as the "inner product value $E_n(-1)$ that has been used in the previous frame" in the next frame.

The n-th channel purification weight estimation unit 1111-*n* also obtains energy $E_M(0)$ of the monaural decoded sound signal to be used in the current frame by the following Expression (10) using the monaural decoded sound signal $\hat{X}_M=\{x_M(1), \hat{x}_M(2), \ldots, \hat{x}_M(T)\}$ and energy $E_M(-1)$ of the monaural decoded sound signal that has been used in the previous frame (step 1111-12-*n*).

[Math. 10]

$$E_M(0) = \epsilon_M E_M(-1) + \frac{(1-\epsilon_M)}{T}\sum_{t=1}^{T}\hat{x}_M(t)\hat{x}_M(t) \tag{10}$$

Here, $\varepsilon_M$ is a predetermined value larger than 0 and smaller than 1, and is stored in advance in the n-th channel purification weight estimation unit 1111-*n*. Note that the n-th channel purification weight estimation unit 1111-*n* stores the obtained energy $E_M(0)$ of the monaural decoded sound signal in the n-th channel purification weight estimation unit 1111-*n* in order to use this energy $E_M(0)$ as the "energy $E_M(-1)$ of the monaural decoded sound signal that has been used in the previous frame" in the next frame. Note that, since the values of $E_M(0)$ are the same in the first purification weight estimation unit 1111-1 and the second purification weight estimation unit 1111-2, $E_M(0)$ may be obtained by either the first purification weight estimation unit 1111-1 or the second purification weight estimation unit 1111-2, and the obtained $E_M(0)$ may be used by the other n-th purification weight estimation unit 1111-*n*.

Next, the n-th channel purification weight estimation unit 1111-*n* obtains the normalized inner product value $r_n$ by the following Expression (11) using the inner product value $E_n(0)$ to be used in the current frame obtained in step S1111-11-*n* and the energy $E_M(0)$ of the monaural decoded sound signal to be used in the current frame obtained in step S1111-12-*n* (step S1111-13-*n*).

[Math. 11]

$$r_n = E_n(0)/E_M(0) \tag{11}$$

The n-th channel purification weight estimation unit 1111-*n* also obtains the correction coefficient $c_n$ by Expression (8) (step S1111-2-*n*). Next, the n-th channel purification weight estimation unit 1111-*n* obtains the value $c_n \times r_n$ obtained by multiplying the normalized inner product value $r_n$ obtained in step S1111-13-*n* by the correction coefficient $c_n$ obtained in step S1111-2-*n* as the n-th channel purification weight $\alpha_n$ (step S1111-3-*n*).

That is, the n-th channel purification weight estimation unit 1111-*n* of the fifth example obtains the value $c_n \times r_n$ obtained by multiplying the normalized inner product value $r_n$ obtained by Expression (11) using the inner product value $E_n(0)$ obtained by Expression (9) using each sample value $\hat{x}_n(t)$ of the n-th channel decoded sound signal $\hat{X}_n$, each sample value $\hat{x}_M(t)$ of the monaural decoded sound signal $\hat{X}_M$, and the inner product value $E_n(-1)$ of the previous frame, and the energy $E_M(0)$ of the monaural decoded sound signal obtained by Expression (10) using each sample value $\hat{x}_M(t)$ of the monaural decoded sound signal $\hat{X}_M$ and the energy $E_M(-1)$ of the monaural decoded sound signal of the previous frame by the correction coefficient $c_n$ obtained by Expression (8) using the number of samples T per frame, the number of bits $b_n$ corresponding to the n-th channel in the number of bits of the stereo code CS, and the number of bits $b_M$ of the monaural code CM, as the n-th channel purification weight $\alpha_n$.

Note that, as $\varepsilon_n$ and $\varepsilon_M$ described above is closer to 1, the normalized inner product value $r_n$ is more likely to include the influence of the n-th channel decoded sound signal and the monaural decoded sound signal of a past frame, and the normalized inner product value $r_n$ and the variation between frames of the n-th channel purification weight $\alpha_n$ obtained with the normalized inner product value $r_n$ are small.

Sixth Example

For example, in a case where sound of voice, music, or the like included in the first channel input sound signal is different from sound of voice, music, or the like included in the second channel input sound signal, the monaural decoded sound signal includes both components of the first channel input sound signal and components of the second channel input sound signal. For this reason, there is a problem that, as a value used as the first channel purification weight $\alpha_1$ is larger, a sound derived from the input sound signal of the second channel that should not be originally heard is included in the first channel purified decoded sound signal. Similarly, there is a problem that, as a value used as the second channel purification weight $\alpha_2$ is larger, a sound derived from the input sound signal of the first channel that should not be originally heard is included in the second channel purified decoded sound signal. Accordingly, in consideration of auditory quality, the n-th channel purification weight estimation unit 1111-*n* of a sixth example obtains a value smaller than the n-th channel purification weight $\alpha_n$ of the each channel obtained by each example described above as the n-th channel purification weight $\alpha_n$. For example, the n-th channel purification weight estimation unit 1111-*n* of the sixth example based on the third example or the fifth example obtains a value $\lambda \times c_n \times r_n$ obtained by multiplying the normalized inner product value $r_n$ and the correction coefficient $c_n$ described in the third example or the normalized inner product value $r_n$ and the correction coefficient $c_n$ described in the fifth example by $\lambda$ that is a predetermined value larger than 0 and smaller than 1, as the n-th channel purification weight $\alpha_n$.

Seventh Example

The auditory quality problem described in the sixth example occurs when the correlation between the first channel input sound signal and the second channel input sound signal is small, and this problem is unlikely to occur when the correlation between the first channel input sound signal and the second channel input sound signal is large. Thus, the n-th channel purification weight estimation unit 1111-*n* of a seventh example uses the inter-channel correlation coefficient $\gamma$, which is a correlation coefficient between the first channel decoded sound signal and the second channel decoded sound signal, instead of the predetermined value of the sixth example, and gives priority to reducing the energy of the quantization error included in the purified decoded sound signal as the correlation between the first channel decoded sound signal and the second channel decoded sound signal is larger, and gives priority to suppressing deterioration of the auditory quality as the correlation between the first channel decoded sound signal and the second channel decoded sound signal is smaller. Hereinafter, differences of the seventh example from the third and fifth examples will be described.

[[[Inter-Channel Relationship Information Estimation Unit 1131 of Seventh Example]]]

The sound signal purification device 1101 of the seventh example also includes an inter-channel relationship information estimation unit 1131 as indicated by a broken line in FIG. 1. At least the first channel decoded sound signal input to the sound signal purification device 1101 and the second channel decoded sound signal input to the sound signal purification device 1101 are input to the inter-channel relationship information estimation unit 1131. The inter-channel relationship information estimation unit 1131 of the seventh example obtains and outputs the inter-channel correlation coefficient $\gamma$ by using at least the first channel decoded sound signal and the second channel decoded sound signal (step S1131). The inter-channel correlation coefficient $\gamma$ is a correlation coefficient between the first channel decoded sound signal and the second channel decoded sound signal, and may be a correlation coefficient $\gamma_0$ between a sample sequence $\{\hat{x}_1(1), \hat{x}_1(2), \ldots, \hat{x}_1(T)\}$ of the first channel decoded sound signal and a sample sequence $\{\hat{x}_2(1), \hat{x}_2(2), \ldots, \hat{x}_2(T)\}$ of the second channel decoded sound signal, or may be a correlation coefficient considering a time difference, for example, a correlation coefficient $\gamma_\tau$ between a sample sequence of the first channel decoded sound signal and a sample sequence of the second channel decoded sound signal at a position shifted backward from the sample sequence by T samples. Note that the inter-channel relationship information estimation unit 1131 may obtain the inter-channel correlation coefficient $\gamma$ by any known method or by a method described with the inter-channel relationship information estimation unit 1132 of the second embodiment described later. Note that, depending on the method of obtaining the inter-channel correlation coefficient $\gamma$, as indicated by a two-dot chain line in FIG. 1, the monaural decoded sound signal input to the sound signal purification device 1101 is also input to the inter-channel relationship information estimation unit 1131.

This $\tau$ is information corresponding to a difference (what is called an arrival time difference) between an arrival time from a sound source mainly emitting a sound in a certain space to the microphone for the first channel and an arrival time from the sound source to the microphone for the second channel when it is assumed that a sound signal obtained by performing AD conversion on a sound collected by the microphone for the first channel arranged in the certain space is the first channel input sound signal $X_1$ and a sound signal obtained by performing AD conversion on a sound collected by the microphone for the second channel arranged in the certain space is the second channel input sound signal $X_2$. Hereinafter, this $\tau$ is referred to as an inter-channel time difference. The inter-channel relationship information estimation unit 1131 may obtain the inter-channel time difference $\tau$ from the first channel decoded sound signal $\hat{X}_1$ that is a decoded sound signal corresponding to the first channel input sound signal $X_1$ and the second channel decoded sound signal $\hat{X}_2$ that is a decoded sound signal corresponding to the second channel input sound signal $X_2$ by any known method, and is only required to obtain the inter-channel time difference $\tau$ by the method described with the inter-channel relationship information estimation unit 1132 of the second embodiment or the like. That is, the correlation coefficient $\gamma^{\tau}$ described above is information corresponding to a correlation coefficient between a sound signal obtained by reaching the microphone for the first channel from a sound source and being collected and a sound signal obtained by reaching the microphone for the second channel from the sound source and being collected.

[[[n-th Channel Purification Weight Estimation Unit 1111-*n* of Seventh Example]]]

Instead of step S1111-3-*n* of the third example and the fifth example, the n-th channel purification weight estimation unit 1111-*n* of the seventh example obtains a value $\gamma \times c_n \times r_n$ obtained by multiplying the normalized inner product value $r_n$ obtained in step S1111-1-*n* of the third example or step SS1111-13-*n* of the fifth example, the correction coefficient $c_n$ obtained in step S1111-2-*n*, and the inter-channel correlation coefficient $\gamma$ obtained in step S1131 as the n-th channel purification weight $\alpha_n$ (step S1111-3'-n). That is, the n-th channel purification weight estimation unit 1111-*n* of the seventh example obtains the value $\gamma \times c_n \times r_n$ obtained by multiplying the normalized inner product value $r_n$ and the correction coefficient $c_n$ described in the third example, or the normalized inner product value $r_n$ and the correction coefficient $c_n$ described in the fifth example by the inter-channel correlation coefficient $\gamma$ that is the correlation coefficient between the first channel decoded sound signal and the second channel decoded sound signal as the n-th channel purification weight $\alpha_n$.

Note that, when obtaining the n-th channel purification weight $\alpha_n$ in the third example to the seventh example, the n-th channel purification weight estimation unit 1111-*n* may use a signal obtained by filtering for each of the n-th channel decoded sound signal $\hat{X}_n$ and the monaural decoded sound signal $\hat{X}_M$ instead of the n-th channel decoded sound signal $\hat{X}_n$ and the monaural decoded sound signal $\hat{X}_M$. The filter may be, for example, a predetermined low-pass filter or a linear prediction filter using a linear prediction coefficient obtained by analyzing the n-th channel decoded sound signal $\hat{X}_n$ or the monaural decoded sound signal $\hat{X}_M$. By performing the filtering, it is possible to weight each frequency component of the n-th channel decoded sound signal $\hat{X}_n$ and the monaural decoded sound signal $\hat{X}_M$, and it is possible to increase the contribution of an audibly important frequency component when obtaining the n-th channel purification weight $\alpha_n$.

[Method for Specifying Number of Bits $b_M$ of Monaural Code CM]

In a case where the number of bits $b_M$ of the monaural code CM in the decoding method used by the monaural decoding unit 610 is the same in all the frames (that is, in a case where the decoding method used by the monaural decoding unit 610 is a decoding method of a fixed bit rate), it is only required that the number of bits $b_M$ of the monaural code CM is stored in a storage unit, which is not illustrated, in the n-th channel purification weight estimation unit 1111-*n*. In a case where the number of bits $b_M$ of the monaural code CM in the decoding method used by the monaural decoding unit 610 is different depending on the frame (that is, in a case where the decoding method used by the monaural decoding unit 610 is a decoding method of a variable bit rate), it is only required that the monaural decoding unit 610 outputs the number of bits $b_M$ of the monaural code CM, and that the number of bits $b_M$ is input to the n-th channel purification weight estimation unit 1111-*n*.

[Method for Specifying Number of Bits $b_n$ in Number of Bits of Stereo Code CS]

In a case where the number of bits $b_n$ corresponding to the n-th channel in the number of bits of the stereo code CS in the decoding method used by the stereo decoding unit 620 is the same in all the frames, it is only required that the number of bits $b_n$ corresponding to the n-th channel in the number of bits of the stereo code CS is stored in the storage unit, which is not illustrated, in the n-th channel purification weight estimation unit 1111-*n*. In a case where the number of bits $b_n$ corresponding to the n-th channel in the number of bits of the stereo code CS in the decoding method used by the stereo decoding unit 620 is different depending on the frame, it is only required that the stereo decoding unit 620 outputs the number of bits $b_n$, and the number of bits $b_n$ is input to the n-th channel purification weight estimation unit 1111-*n*. In a case where the number of bits $b_n$ corresponding to the n-th channel in the number of bits of the stereo code CS in the decoding method used by the stereo decoding unit 620 is not determined positively, the n-th channel purification weight estimation unit 1111-*n* is only required to use, for example, a value obtained by the following first method or second method as $b_n$. Note that, in both the first method and the second method, in a case where the number of bits $b_s$ of the stereo code CS in the decoding method used by the stereo decoding unit 620 is the same in all the frames, it is only required that the number of bits $b_s$ of the stereo code CS is stored in the storage unit, which is not illustrated, in the n-th channel purification weight estimation unit 1111-*n*, and in a case where the number of bits $b_s$ of the stereo code CS in the decoding method used by the stereo decoding unit 620 is different depending on the frames, it is only required that the stereo decoding unit 620 outputs the number of bits $b_s$, and the number of bits $b_s$ is input to the n-th channel purification weight estimation unit 1111-*n*.

[[First Method for Specifying Number of Bits $b_n$ in Number of Bits of Stereo Code CS]]

The n-th channel purification weight estimation unit 1111-*n* uses a value (that is, in a case of two-channel stereo, $b_s/2$ or one half of $b_s$) obtained by dividing the number of bits $b_s$ of the stereo code CS by the number of channels as $b_n$. That is, in a case where the number of bits $b_s$ of the stereo code CS in the decoding method used by the stereo decoding unit 620 is the same in all the frames, it is only required that a value obtained by dividing the number of bits $b_s$ of the stereo code CS by the number of channels is stored as the number of bits $b_n$ in the storage unit, which is not illustrated, in the n-th channel purification weight estimation unit 1111-*n*. In a case where the number of bits $b_s$ of the stereo code CS in the decoding method used by the stereo decoding unit 620 is different depending on the frame, it is only required that the n-th channel purification weight estimation unit 1111-$n$ obtains a value obtained by dividing the number of bits $b_s$ by the number of channels as $b_n$.

[[Second Method for Specifying Number of Bits $b_n$ in Number of Bits of Stereo Code CS]]

The n-th channel purification weight estimation unit 1111-$n$ obtains, using the decoded sound signals of all channels input to the sound signal purification device 1101, a value obtained by adding a value obtained by dividing the number of bits $b_s$ of the stereo code CS by the number of channels and a value proportional to a logarithmic value of a ratio of the energy of the decoded sound signal $\hat{X}_n$ of the n-th channel and a geometrical mean of the energy of the decoded sound signals of all the channels as $b_n$. In general, in stereo encoding, compression can be efficiently performed by assigning the number of bits proportional to a logarithmic value of energy of each signal to the input sound signal of the each channel. Therefore, the second method is to estimate the number of bits $b_n$ on the assumption that the above-described number of bits is allocated in the stereo code CS also in the encoding method used by the stereo encoding unit 530 and the decoding method used by the stereo decoding unit 620. More specifically, for example, the n-th channel purification weight estimation unit 1111-$n$ is only required to obtain the number of bits $b_n$ by the following Expression (12) using energy $e_1$ of the first channel decoded sound signal $\hat{X}_1$ and energy $e_2$ of the second channel decoded sound signal $\hat{X}_2$.

[Math. 12]

$$b_n = \frac{b_s}{2} + \frac{1}{2}\log_2\frac{e_n}{\sqrt{e_1 e_2}} \tag{12}$$

Modification Example of First Embodiment

Even in a case where the sound signal purification device 1101 uses the inter-channel correlation coefficient $\gamma$, in a case where the stereo decoding unit 620 of the decoding device 600 obtains the inter-channel correlation coefficient $\gamma$, the sound signal purification device 1101 may not include the inter-channel relationship information estimation unit 1131, and the inter-channel correlation coefficient $\gamma$ obtained by the stereo decoding unit 620 of the decoding device 600 may be input to the sound signal purification device 1101, so that the sound signal purification device 1101 uses the input inter-channel correlation coefficient $\gamma$.

In addition, even in a case where the sound signal purification device 1101 uses the inter-channel correlation coefficient $\gamma$, when an inter-channel relationship information code CC obtained and output by an inter-channel relationship information encoding unit, which is not illustrated, included in the encoding device 500 described above includes a code representing the inter-channel correlation coefficient $\gamma$, the sound signal purification device 1101 may not include the inter-channel relationship information estimation unit 1131, the code representing the inter-channel correlation coefficient $\gamma$ included in the inter-channel relationship information code CC may be input to the sound signal purification device 1101, the sound signal purification device 1101 may include an inter-channel relationship information decoding unit, which is not illustrated, and the inter-channel relationship information decoding unit may decode the code representing the inter-channel correlation coefficient $\gamma$ to obtain and output the inter-channel correlation coefficient $\gamma$.

Second Embodiment

Similarly to the sound signal purification device of the first embodiment, a sound signal purification device of a second embodiment also improves the decoded sound signal of the each channel of the stereo by using a monaural decoded sound signal obtained from a code different from the code from which the decoded sound signal is obtained. The sound signal purification device of the second embodiment is different from the sound signal purification device of the first embodiment in that a signal obtained by upmixing the monaural decoded sound signal for the each channel is used instead of the monaural decoded sound signal itself. Hereinafter, regarding the sound signal purification device of the second embodiment, differences from the sound signal purification device of the first embodiment will be mainly described using an example in a case where the number of channels of the stereo is two.

<<Sound Signal Purification Device 1102>>

Figure 5:
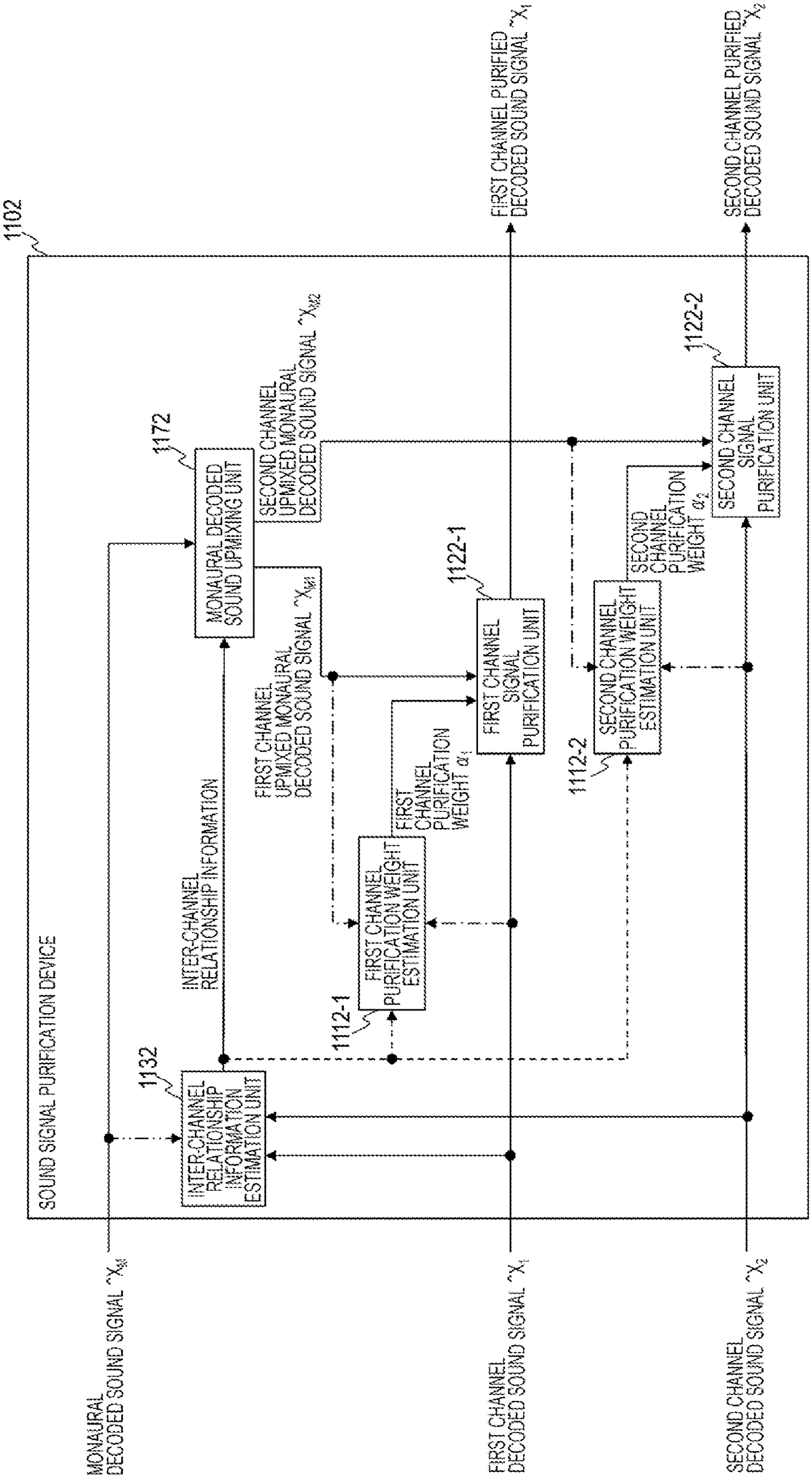
FIG. 5 is a block diagram illustrating an example of a sound signal purification device 1102.
Figure 6:
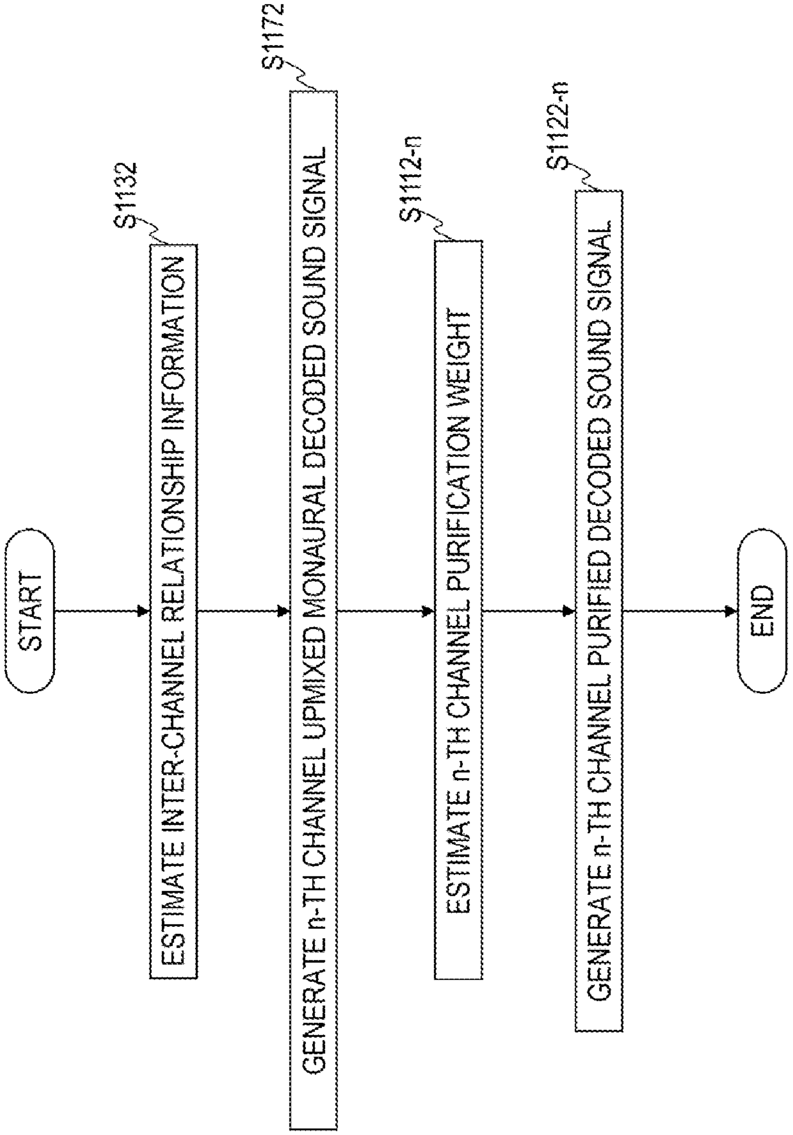
FIG. 6 is a flowchart illustrating an example of processing of the sound signal purification device 1102.

As illustrated in FIG. 5, the sound signal purification device 1102 of the second embodiment includes the inter-channel relationship information estimation unit 1132, a monaural decoded sound upmixing unit 1172, a first channel purification weight estimation unit 1112-1, a first channel signal purification unit 1122-1, a second channel purification weight estimation unit 1112-2, and a second channel signal purification unit 1122-2. For the each frame, as illustrated in FIG. 6, the sound signal purification device 1102 performs steps S1132 and S1172, and steps S1112-$n$ and S1122-$n$ for the each channel.

[Inter-Channel Relationship Information Estimation Unit 1132]

At least the first channel decoded sound signal $\hat{X}_1$ input to the sound signal purification device 1102 and the second channel decoded sound signal $\hat{X}_2$ input to the sound signal purification device 1102 are input to the inter-channel relationship information estimation unit 1132. The inter-channel relationship information estimation unit 1132 obtains and outputs inter-channel relationship information by using at least the first channel decoded sound signal $\hat{X}_1$ and the second channel decoded sound signal $\hat{X}_2$ (step S1132). The inter-channel relationship information is information indicating a relationship between the channels of the stereo. Examples of the inter-channel relationship information are an inter-channel time difference $\tau$ and an inter-channel correlation coefficient $\gamma$. The inter-channel relationship information estimation unit 1132 may obtain a plurality of types of inter-channel relationship information and, for example, may obtain the inter-channel time difference $\tau$ and the inter-channel correlation coefficient $\gamma$.

The inter-channel time difference $\tau$ is information corresponding to a difference (what is called an arrival time difference) between an arrival time from a sound source mainly emitting a sound in a certain space to the microphone for the first channel and an arrival time from the sound source to the microphone for the second channel when it is assumed that a sound signal obtained by performing AD conversion on a sound collected by the microphone for the first channel arranged in the certain space is the first channel input sound signal $X_1$ and a sound signal obtained by performing AD conversion on a sound collected by the microphone for the second channel arranged in the certain space is the second channel input sound signal $X_2$. Note that, in order to include not only the arrival time difference but also information corresponding to which microphone is reached earlier in the inter-channel time difference $\tau$, it is assumed that the inter-channel time difference $\tau$ can take a positive value or a negative value with any one of the sound signals as a reference. The inter-channel relationship information estimation unit 1132 obtains the inter-channel time difference $\tau$ from the first channel decoded sound signal $\hat{X}_1$ that is a decoded sound signal corresponding to the first channel input sound signal $X_1$ and the second channel decoded sound signal $\hat{X}_2$ that is a decoded sound signal corresponding to the second channel input sound signal $X_2$. That is, the inter-channel time difference $\tau$ obtained by the inter-channel relationship information estimation unit 1132 is information indicating how far ahead the same sound signal is included in the first channel decoded sound signal $\hat{X}_1$ or the second channel decoded sound signal $\hat{X}_2$. Hereinafter, in a case where the same sound signal is included in the first channel decoded sound signal $\hat{X}_1$ earlier than the second channel decoded sound signal $\hat{X}_2$, the first channel is also described as preceding, and in a case where the same sound signal is included earlier in the second channel decoded sound signal $\hat{X}_2$ than in the first channel decoded sound signal $\hat{X}_1$, the second channel is also referred to as preceding.

The inter-channel relationship information estimation unit 1132 may obtain the inter-channel time difference $\tau$ by any known method. For example, the inter-channel relationship information estimation unit 1132 calculates a value (hereinafter, referred to as a correlation value) $\gamma_{cand}$ representing the magnitude of a correlation between the sample sequence of the first channel decoded sound signal $\hat{X}_1$ and the sample sequence of the second channel decoded sound signal $\hat{X}_2$ at a position shifted backward from the sample sequence by the number of possible samples $\tau_{cand}$ for each number of possible samples $\tau_{cand}$ from $\tau_{max}$ to $\tau_{min}$ determined in advance (for example, $\tau_{max}$ is a positive number, and $\tau_{min}$ is a negative number), and obtains the number of possible samples $\tau_{cand}$ with which the correlation value $\gamma_{cand}$ is maximized as the inter-channel time difference $\tau$. That is, in this example, the inter-channel time difference $\tau$ is a positive value in a case where the first channel is preceding, and the inter-channel time difference $\tau$ is a negative value when the second channel is preceding. That is, the absolute value $|\tau|$ of the inter-channel time difference $\tau$ is the number of samples $|\tau|$ corresponding to the time difference between the first channel and the second channel, and is a value (the number of preceding samples) indicating how much the preceding channel is preceding the other channel. Further, whether the inter-channel time difference $\tau$ is a positive value or a negative value is information indicating which channel of the first channel and the second channel is preceding. Therefore, the inter-channel relationship information estimation unit 1132 may obtain information indicating the number of samples $|\tau|$ corresponding to the time difference between the first channel and the second channel and information indicating which channel of the first channel and the second channel is preceding, instead of the inter-channel time difference $\tau$.

For example, in a case where the inter-channel relationship information estimation unit 1132 calculates the correlation value $\gamma_{cand}$ using only the samples in the frame, in a case where $\tau_{cand}$ is a positive value, it is only required to calculate, as the correlation value $\gamma_{cand}$, an absolute value of a correlation coefficient between a partial sample sequence $\{\hat{x}_2(1+\tau_{cand}), \hat{x}_2(2+\tau_{cand}), \ldots, \hat{x}_2(T)\}$ of the second channel decoded sound signal $\hat{X}_2$ and a partial sample sequence $\{\hat{x}_1(1), \hat{x}_1(2), \ldots, \hat{x}_1(T-\tau_{cand})\}$ of the first channel decoded sound signal $\hat{X}_1$ at a position shifted forward from the partial sample sequence by the number of possible samples $\tau_{cand}$, and in a case where $\tau_{cand}$ is a negative value, it is only required to calculate, as the correlation value $\gamma_{cand}$ an absolute value of a correlation coefficient between a partial sample sequence $\{\hat{x}_1(1-\tau_{cand}), \hat{x}_1(2-\tau_{cand}), \ldots, \hat{x}_1(T)\}$ of the first channel decoded sound signal $\hat{X}_1$ and a partial sample sequence $\{\hat{x}_2(1), \hat{x}_2(2), \ldots, \hat{x}_2(T+\tau_{cand})\}$ of the second channel decoded sound signal $\hat{X}_2$ at a position shifted forward from the partial sample sequence by the number of possible samples $(-\tau_{cand})$. Of course, one or more samples of the past decoded sound signals continuous with the sample sequence of the decoded sound signal of the current frame may also be used in order to calculate the correlation value $\gamma_{cand}$, and in this case, the inter-channel relationship information estimation unit 1132 is only required to store the sample sequence of the decoded sound signal of a past frame for a predetermined number of frames in the storage unit, which is not illustrated, in the inter-channel relationship information estimation unit 1132.

Furthermore, for example, instead of the absolute value of the correlation coefficient, the correlation value $\gamma_{cand}$ may be calculated using the phase information of the signal as follows. In this example, the inter-channel relationship information estimation unit 1132 first performs Fourier transform on the first channel decoded sound signal $\hat{X}_1=\{\hat{x}_1(1), \hat{x}_1(2), \ldots, \hat{x}_1(T)\}$ as the following Expression (21), to thereby obtain a frequency spectrum $f_1(k)$ at each frequency k from zero to T−1.

[Math. 13]

$$f_1(k) = \frac{1}{\sqrt{T}} \sum_{t=0}^{T-1} \hat{x}_1(t+1) e^{-j\frac{2\pi kt}{T}} \tag{21}$$

The inter-channel relationship information estimation unit 1132 also performs Fourier transform on the second channel decoded sound signal $\hat{X}_2=\{\hat{x}_2(1), \hat{x}_2(2), \ldots, \hat{x}_2(T)\}$ as the following Expression (22), to thereby obtain a frequency spectrum $f_2(k)$ at each frequency k from zero to T−1.

[Math. 14]

$$f_2(k) = \frac{1}{\sqrt{T}} \sum_{t=0}^{T-1} \hat{x}_2(t+1) e^{-j\frac{2\pi kt}{T}} \tag{22}$$

Next, the inter-channel relationship information estimation unit 1132 obtains the spectrum $\varphi(k)$ of the phase difference at each frequency k by the following Expression (23) using the frequency spectra $f_1(k)$ and $f_2(k)$ of each frequency k from zero to T−1.

[Math. 15]

$$\phi(k) = \frac{f_1(k)/|f_1(k)|}{f_2(k)/|f_2(k)|} \tag{23}$$

Next, the inter-channel relationship information estimation unit 1132 performs inverse Fourier transform on the spectrum of the phase difference from zero to T−1, to thereby obtain a phase difference signal $\psi(\tau_{cand})$ for each number of possible samples $\tau_{cand}$ from $\tau_{max}$ to $\tau_{min}$ as the following Expression (24).

[Math. 16]

$$\psi(\tau_{cand}) = \frac{1}{\sqrt{T}}\sum_{k=0}^{T-1}\phi(k)e^{j\frac{2\pi k\tau_{cand}}{T}} \quad (24)$$

The absolute value of the phase difference signal $\psi(\tau_{cand})$ obtained here represents a kind of correlation corresponding to the likelihood of the time difference between the first channel decoded sound signal $\hat{X}_1=\{\hat{x}_1(1), \hat{x}_1(2), \ldots, \hat{x}_1(T)\}$ and the second channel decoded sound signal $\hat{X}_2=\{x_2(1), \hat{x}_2(2), \ldots, \hat{x}_2(T)\}$. Accordingly, next, the inter-channel relationship information estimation unit 1132 obtains an absolute value of the phase difference signal $\psi(\tau_{cand})$ with respect to each number of possible samples $\tau_{cand}$ as a correlation value $\gamma_{cand}$. Next, the inter-channel relationship information estimation unit 1132 obtains the number of possible samples $\tau_{cand}$ with which the correlation value $\gamma_{cand}$ which is the absolute value of the phase difference signal $\psi(\tau_{cand})$, is maximized as the inter-channel time difference $\tau$.

Note that, instead of using the absolute value of the phase difference signal $\psi(\tau_{cand})$ without change as the correlation value $\gamma_{cand}$, the inter-channel relationship information estimation unit 1132 may use a normalized value such as a relative difference of the average of absolute values of the phase difference signals obtained respectively for the plurality of the numbers of possible samples, for example, before and after $\tau_{cand}$ with respect to the absolute value of the phase difference signal $\psi(\tau_{cand})$ for each $\tau_{cand}$. Specifically, the inter-channel relationship information estimation unit 1132 may obtain an average value by the following Expression (25) for each $\tau_{cand}$ by using a predetermined positive number $\tau_{range}$, and obtain a normalized correlation value obtained by the following Expression (26) using the obtained average value $\psi_c(\tau_{cand})$ and the phase difference signal $\psi(\tau_{cand})$ as $\gamma_{cand}$.

[Math. 17]

$$\psi_c(\tau_{cand}) = \frac{1}{2\tau_{range}+1}\sum_{\tau'=\tau_{cand}-\tau_{range}}^{\tau_{cand}+\tau_{range}}|\psi(\tau')| \quad (25)$$

[Math. 18]

$$1 - \frac{\psi_c(\tau_{cand})}{|\psi(\tau_{cand})|} \quad (26)$$

Note that the normalized correlation value obtained by Expression (26) is a value of 0 or more and 1 or less, and is a value having properties of being close to one as $\tau_{cand}$ is likely to be the inter-channel time difference, and being close to zero as $\tau_{cand}$ is not likely to be the inter-channel time difference.

Each number of possible samples determined in advance may be each integer value from $\tau_{max}$ to $\tau_{min}$, may include a fractional value or a decimal value between $\tau_{max}$ and $\tau_{min}$, and may not include any integer value between $\tau_{max}$ and $\tau_{min}$. In addition, $\tau_{max}-\tau_{min}$ may be satisfied or may not be satisfied. In addition, in a case where a special decoded sound signal in which one of the channels is always preceding is targeted, $\tau_{max}$ and $\tau_{min}$ may be positive numbers, or $\tau_{max}$ and $\tau_{min}$ may be negative numbers.

Note that, in a case where the sound signal purification device 1102 obtains the n-th channel purification weight $\alpha_n$ in the seventh example described in the first embodiment, the inter-channel relationship information estimation unit 1132 further outputs a maximum value among correlation values between the sample sequence of the first channel decoded sound signal and the sample sequence of the second channel decoded sound signal at a position shifted backward from the sample sequence by the inter-channel time difference $\tau$, that is, correlation values $\gamma_{cand}$ calculated for each number of possible samples $\tau_{cand}$ from $\tau_{max}$ to $\tau_{min}$, as the inter-channel correlation coefficient $\gamma$.

Further, for example, the inter-channel relationship information estimation unit 1132 may obtain the inter-channel correlation coefficient $\gamma$ by also using the monaural decoded sound signal. In this case, as indicated by a two-dot chain line in FIG. 5, the monaural decoded sound signal input to the sound signal purification device 1102 is also input to the inter-channel relationship information estimation unit 1132. The inter-channel relationship information estimation unit 1132 may use the first channel decoded sound signal $\hat{X}_1=\{x_1(1), \hat{x}_1(2), \ldots, \hat{x}_1(T)\}$, the second channel decoded sound signal $\hat{X}_2=\{\hat{x}_2(1), \hat{x}_2(2), \ldots, \hat{x}_2(T)\}$, and the monaural decoded sound signal $\hat{X}_M=\{\hat{x}_M(1), \hat{x}_M(2), \ldots, \hat{x}_M(T)\}$ to obtain a most appropriate weight when it is assumed that the monaural decoded sound signal $\hat{X}_M$ is approximated by the weighted sum of the first channel decoded sound signal $\hat{X}_1$ and the second channel decoded sound signal $\hat{X}_2$ as the inter-channel correlation coefficient $\gamma$. That is, the inter-channel relationship information estimation unit 1132 may obtain a weight $w_{cand}$ having a minimum value obtained by the following Expression (27) among $w_{cand}$ of −1 or more and 1 or less, as the inter-channel correlation coefficient $\gamma$.

[Math. 19]

$$\sum_{t=1}^{T}\left|\left(\frac{1+w_{cand}}{2}\hat{x}_1(t)+\frac{1-w_{cand}}{2}\hat{x}_2(t)\right)-\hat{x}_M(t)\right|^2 \quad (27)$$

In a case where the correlation between the channels is high, that is, in a case where the first channel input sound signal input to the encoding device 500 and the second channel input sound signal input to the encoding device 500 have similar waveforms when the time differences are combined, assuming that downmixing is efficiently performed in the downmixing unit 510 of the encoding device 500, the monaural decoded sound signal includes many signals that are temporally synchronized with the decoded sound signal of the preceding channel out of the first channel decoded sound signal and the second channel decoded sound signal. Therefore, the inter-channel correlation coefficient $\gamma$ obtained by Expression (27) is a value close to one in a case where the sound signal included in the first channel decoded sound signal is preceding, and is a value close to −1 in a case where the sound signal included in the second channel decoded sound signal is preceding, and the absolute value decreases as the correlation between the channels decreases. Therefore, the weight $w_{cand}$ with which the value obtained by Expression (27) is the smallest can be used as the inter-channel correlation coefficient $\gamma$. Note that, in this method, the inter-channel relationship information estimation unit 1132 can obtain the inter-channel correlation coefficient $\gamma$ without obtaining the inter-channel time difference $\tau$.

[Monaural Decoded Sound Upmixing Unit 1172]

The monaural decoded sound signal $\hat{X}_M=\{\hat{x}_M(1), \hat{x}_M(2), \ldots, \hat{x}_M(T)\}$ input to the sound signal purification device 1102 and the inter-channel relationship information output by the inter-channel relationship information estimation unit 1132 are input to the monaural decoded sound upmixing unit 1172. The monaural decoded sound upmixing unit 1172 performs an upmixing process using the monaural decoded sound signal $\hat{X}_M=\{x_M(1), \hat{x}_M(2), \ldots, \hat{x}_M(T)\}$ and the inter-channel relationship information, to thereby obtain and output an n-th channel upmixed monaural decoded sound signal $\hat{X}_{Mn}=\{\hat{x}_{Mn}(1), \hat{x}_{Mn}(2), \ldots, \hat{x}_{Mn}(T)\}$ that is a signal obtained by upmixing the monaural decoded sound signal for the each channel (step S1172). The inter-channel relationship information used by the monaural decoded sound upmixing unit 1172 is information indicating a relationship between the channels of the stereo, and may be one type or a plurality of types. The monaural decoded sound upmixing unit 1172 is only required to perform the upmixing process using, for example, information indicating the inter-channel time difference $\tau$ or the number of samples $|\tau|$ corresponding to the time difference between the first channel and the second channel and information indicating which channel of the first channel and the second channel is preceding as follows.

[[Example of Upmixing Process Using Inter-Channel Time Difference $\tau$]]

In a case where the first channel is preceding (that is, in a case where the inter-channel time difference $\tau$ is a positive value, or in a case where the information indicating which channel of the first channel and the second channel is preceding indicates that the first channel is preceding), the monaural decoded sound upmixing unit 1172 outputs the monaural decoded sound signal $\hat{X}_M=\{\hat{x}_M(1), \hat{x}_M(2), \ldots, \hat{x}_M(T)\}$ without change as the first channel upmixed monaural decoded sound signal $\hat{X}_{M1}=\{\hat{x}_{M1}(1), \hat{x}_{M1}(2), \ldots, \hat{x}_{M1}(T)\}$, and outputs a signal $\{\hat{x}_M(1-|\tau|), \hat{x}_M(2-|\tau|), \ldots, \hat{x}_M(T-|\tau|)\}$ obtained by delaying the monaural decoded sound signal by $|\tau|$ samples (the number of samples corresponding to the absolute value of the inter-channel time difference $\tau$ and the number of samples corresponding to the magnitude represented by the inter-channel time difference $\tau$) as the second channel upmixed monaural decoded sound signal $\hat{X}_{M2}=\{\hat{x}_{M2}(1), \hat{x}_{M2}(2), \ldots, \hat{x}_{M2}(T)\}$. In a case where the second channel is preceding (that is, in a case where the inter-channel time difference $\tau$ is a negative value, or in a case where the information indicating which channel of the first channel and the second channel is preceding indicates that the second channel is preceding), the monaural decoded sound upmixing unit 1172 outputs a signal $\{\hat{x}_M(1-|\tau|), \hat{x}_M(2-|\tau|), \ldots, \hat{x}_M(T-|\tau|)\}$ obtained by delaying the monaural decoded sound signal by $|\tau|$ samples as the first channel upmixed monaural decoded sound signal $\hat{X}_{M1}=\{x_{M1}(1), \hat{x}_{M1}(2), \ldots, \hat{x}_{M1}(T)\}$, and outputs the monaural decoded sound signal $\hat{X}_M=\{\hat{x}_M(1), \hat{x}_M(2), \ldots, \hat{x}_M(T)\}$ without change as the second channel upmixed monaural decoded sound signal $\hat{X}_{M2}=\{\hat{x}_{M2}(1), \hat{x}_{M2}(2), \ldots, \hat{x}_{M2}(T)\}$. In a case where no channel is preceding (that is, in a case where the inter-channel time difference $\tau$ is zero, or in a case where the information indicating which channel of the first channel and the second channel is preceding indicates that none of the channels is preceding), the monaural decoded sound upmixing unit 1172 outputs the monaural decoded sound signal $\hat{X}_M=\{x_M(1), \hat{x}_M(2), \ldots, \hat{x}_M(T)\}$ without change as the first channel upmixed monaural decoded sound signal $\hat{X}_{M1}=\{\hat{x}_{M1}(1), \hat{x}_{M1}(2), \ldots, \hat{x}_{M1}(T)\}$ and the second channel upmixed monaural decoded sound signal $\hat{X}_{M2}=\{\hat{x}_{M2}(1), \hat{x}_{M2}(2), \ldots, \hat{x}_{M2}(T)\}$. That is, the monaural decoded sound upmixing unit 1172 outputs, for a channel in which the above-described arrival time is shorter out of the first channel and the second channel, the input monaural decoded sound signal without change as the upmixed monaural decoded sound signal of the channel, and outputs, for a channel in which the above-described arrival time is longer out of the first channel and the second channel, a signal obtained by delaying the input monaural decoded sound signal by the absolute value $|\tau|$ of the inter-channel time difference $\tau$ as the upmixed monaural decoded sound signal of the channel. Note that, since the monaural decoded sound signal of a past frame is used in the monaural decoded sound upmixing unit 1172 to obtain a signal obtained by delaying the monaural decoded sound signal, the monaural decoded sound signal input in the past frame is stored for a predetermined number of frames in the storage unit, which is not illustrated, in the monaural decoded sound upmixing unit 1172.

[n-th Channel Purification Weight Estimation Unit 1112-*n*]

The n-th channel purification weight estimation unit 1112-*n* obtains and outputs the n-th channel purification weight $\alpha_n$ (step S1112-*n*). The n-th channel purification weight estimation unit 1112-*n* obtains the n-th channel purification weight $\alpha_n$ by a method similar to the method based on the principle of minimizing the quantization error described in the first embodiment. The n-th channel purification weight $\alpha_n$ obtained by the n-th channel purification weight estimation unit 1112-*n* is a value of 0 or more and 1 or less. However, since the n-th channel purification weight estimation unit 1112-*n* obtains the n-th channel purification weight $\alpha_n$ for the each frame by the method to be described later, the n-th channel purification weight $\alpha_n$ does not become zero or one in all the frames. That is, there is a frame in which the n-th channel purification weight $\alpha_n$ is a value larger than 0 and smaller than 1. In other words, in at least any one of all the frames, the n-th channel purification weight $\alpha_n$ is a value larger than 0 and smaller than 1.

Specifically, as in the following first to seventh examples, the n-th channel purification weight estimation unit 1112-*n* obtains the n-th channel purification weight $\alpha_n$ using the n-th channel upmixed monaural decoded sound signal $\hat{X}_{Mn}$ instead of the monaural decoded sound signal $\hat{X}_M$ at a position where the monaural decoded sound signal $\hat{X}_M$ is used in the method based on the principle of minimizing the quantization error described in the first embodiment. As a matter of course, the n-th channel purification weight estimation unit 1112-*n* uses the value obtained on the basis of the n-th channel upmixed monaural decoded sound signal $\hat{X}_{Mn}$ instead of the value obtained on the basis of the monaural decoded sound signal $\hat{X}_M$ at a position where the value obtained on the basis of the monaural decoded sound signal $\hat{X}_M$ is used in the method based on the principle of minimizing the quantization error described in the first embodiment. For example, the n-th channel purification weight estimation unit 1112-*n* uses the energy $E_{Mn}(0)$ of the n-th channel upmixed monaural decoded sound signal of the current frame instead of the energy $E_M(0)$ of the monaural decoded sound signal of the current frame, and uses the energy $E_{Mn}(-1)$ of the n-th channel upmixed monaural decoded sound signal of the previous frame instead of the energy $E_M(-1)$ of the monaural decoded sound signal of the previous frame.

First Example

The n-th channel purification weight estimation unit 1112-*n* of the first example obtains the n-th channel purification weight $\alpha_n$ by the following Expression (2-5) using the number of samples T per frame, the number of bits $b_n$ corresponding to the n-th channel in the number of bits of the stereo code CS, and the number of bits $b_M$ of the monaural code CM.

[Math. 20]

$$\alpha_n = \frac{2^{-\frac{2b_n}{T}}}{2^{-\frac{2b_n}{T}} + 2^{-\frac{2b_M}{T}}} \tag{2-5}$$

Second Example

The n-th channel purification weight estimation unit 1112-*n* of the second example uses at least the number of bits $b_n$ corresponding to the n-th channel in the number of bits of the stereo code CS and the number of bits $b_M$ of the monaural code CM to obtain a value that is larger than 0 and smaller than 1, 0.5 when $b_n$ and $b_M$ are equal, closer to 0 than 0.5 as $b_n$ is larger than $b_M$, and closer to 1 than 0.5 as $b_M$ is larger than $b_n$ as the n-th channel purification weight $\alpha_n$.

Third Example

The n-th channel purification weight estimation unit 1112-*n* of the third example obtains a value $c_n \times r_n$ obtained by multiplying a correction coefficient $c_n$ obtained by

[Math. 21]

$$c_n = \frac{2^{-\frac{2b_n}{T}}}{2^{-\frac{2b_n}{T}} + 2^{-\frac{2b_M}{T}}} \tag{2-8}$$

using the number of samples T per frame, the number of bits $b_n$ corresponding to the n-th channel in the number of bits of the stereo code CS, and the number of bits $b_M$ of the monaural code CM, and the normalized inner product value $r_n$ for the n-th channel upmixed monaural decoded sound signal $\hat{X}_{Mn}$ of the n-th channel decoded sound signal $\hat{X}_n$ as the n-th channel purification weight $\alpha_n$.

The n-th channel purification weight estimation unit 1112-*n* of the third example obtains the n-th channel purification weight $\alpha_n$, for example, by performing the following steps S1112-31-*n* to S1112-33-*n*. The n-th channel purification weight estimation unit 1112-*n* first obtains the normalized inner product value $r_n$ for the n-th channel upmixed monaural decoded sound signal $\hat{X}_{Mn}$ of the n-th channel decoded sound signal $\hat{X}_n$ by the following Expression (2-6) from the n-th channel decoded sound signal $\hat{X}_n=\{\hat{x}_n(1), \hat{x}_n(2), \ldots, \hat{x}_n(T)\}$ and the n-th channel upmixed monaural decoded sound signal $\hat{X}_{Mn}=\{\hat{x}_{Mn}(1), \hat{x}_{Mn}(2), \ldots, \hat{x}_{Mn}(T)\}$ (step S1112-31-*n*).

[Math. 22]

$$r_n = \frac{\sum_{t=1}^{T} \hat{x}_n(t)\hat{x}_{Mn}(t)}{\sum_{t=1}^{T} \hat{x}_{Mn}(t)\hat{x}_{Mn}(t)} \tag{2-6}$$

The n-th channel purification weight estimation unit 1112-*n* also obtains the correction coefficient $c_n$ by Expression (2-8) using the number of samples T per frame, the number of bits $b_n$ corresponding to the n-th channel in the number of bits of the stereo code CS, and the number of bits $b_M$ of the monaural code CM (step S1112-32-*n*). Next, the n-th channel purification weight estimation unit 1112-*n* obtains the value $c_n \times r_n$ obtained by multiplying the normalized inner product value $r_n$ obtained in step S1112-31-*n* by the correction coefficient $c_n$ obtained in step S1112-32-*n* as the n-th channel purification weight $\alpha_n$ (step S1112-33-*n*).

Fourth Example

The n-th channel purification weight estimation unit 1112-*n* of the fourth example uses the number of bits corresponding to the n-th channel in the number of bits of the stereo code CS as $b_n$ and the number of bits of the monaural code CM as $b_M$ to obtain the value $c_n \times r_n$ obtained by multiplying $r_n$ that is a value of 0 or more and 1 or less, closer to 1 as the correlation between the n-th channel decoded sound signal $\hat{X}_n$ and the n-th channel upmixed monaural decoded sound signal $\hat{X}_{Mn}$ is higher, and closer to 0 as the correlation is lower by the correction coefficient $c_n$ that is a value larger than 0 and smaller than 1, 0.5 when $b_n$ and $b_M$ are equal, closer to 0 than 0.5 as $b_n$ is larger than $b_M$, and closer to 1 than 0.5 as $b_n$ is smaller than $b_M$, as the n-th channel purification weight $\alpha_n$.

Fifth Example

The n-th channel purification weight estimation unit 1112-*n* of the fifth example obtains the n-th channel purification weight $\alpha_n$ by, for example, performing the following steps S1112-51-*n* to S1112-55-*n*.

The n-th channel purification weight estimation unit 1112-*n* first obtains the inner product value $E_n(0)$ to be used in the current frame by the following Expression (2-9) using the n-th channel decoded sound signal $\hat{X}_n=\{\hat{x}_n(1), \hat{x}_n(2), \ldots, \hat{x}_n(T)\}$, the n-th channel upmixed monaural decoded sound signal $\hat{X}_{Mn}=\{\hat{x}_{Mn}(1), \hat{x}_{Mn}(2), \ldots, \hat{x}_{Mn}(T)\}$, and the inner product value $E_n(-1)$ that has been used in the previous frame (step S1112-51-*n*).

[Math. 23]

$$E_n(0) = \epsilon_n E_n(-1) + \frac{(1-\epsilon_n)}{T}\sum_{t=1}^{T} \hat{x}_n(t)\hat{x}_{Mn}(t) \tag{2-9}$$

Here, $\varepsilon_n$ is a predetermined value larger than 0 and smaller than 1, and is stored in advance in the n-th channel purification weight estimation unit 1112-*n*. Note that the n-th channel purification weight estimation unit 1112-*n* stores the obtained inner product value $E_n(0)$ in the n-th channel purification weight estimation unit 1112-*n* in order to use this inner product value $E_n(0)$ as the "inner product value $E_n(-1)$ that has been used in the previous frame" in the next frame.

The n-th channel purification weight estimation unit 1112-*n* also obtains the energy $E_{Mn}(0)$ of the n-th channel upmixed monaural decoded sound signal to be used in the current frame by the following Expression (2-10) using the n-th channel upmixed monaural decoded sound signal $\hat{X}_{Mn}=\{\hat{x}_{Mn}(1), \hat{x}_{Mn}(2), \ldots, \hat{x}_{Mn}(T)\}$ and the energy $E_{Mn}(-1)$ of the n-th channel upmixed monaural decoded sound signal that has been used in the previous frame (step S1112-52-*n*).

[Math. 24]

$$E_{Mn}(0)=\epsilon_{Mn}E_{Mn}(-1)+\frac{(1-\epsilon_{Mn})}{T}\sum_{t=1}^{T}\hat{x}_{Mn}(t)\hat{x}_{Mn}(t) \tag{2-10}$$

Here, $\epsilon_{Mn}$ is a predetermined value larger than 0 and smaller than 1, and is stored in advance in the n-th channel purification weight estimation unit 1112-*n*. Note that the n-th channel purification weight estimation unit 1112-*n* stores the energy $E_{Mn}(0)$ of the obtained n-th channel upmixed monaural decoded sound signal in the n-th channel purification weight estimation unit 1112-*n* in order to use this energy $E_{Mn}(0)$ as the "energy $E_{Mn}(-1)$ of the n-th channel upmixed monaural decoded sound signal that has been used in the previous frame" in the next frame.

Next, the n-th channel purification weight estimation unit 1112-*n* obtains the normalized inner product value $r_n$ by the following Expression (2-11) using the inner product value $E_n(0)$ to be used in the current frame obtained in step S1112-51-*n* and the energy $E_{Mn}(0)$ of the n-th channel upmixed monaural decoded sound signal to be used in the current frame obtained in step S1112-52-*n* (step S1112-53-*n*).

[Math. 25]

$$r_n=E_n(0)/E_{Mn}(0) \tag{2-11}$$

The n-th channel purification weight estimation unit 1112-*n* also obtains the correction coefficient $c_M$ by Expression (2-8) (step S1112-54-*n*). Next, the n-th channel purification weight estimation unit 1112-*n* obtains the value $c_n \times r_n$ obtained by multiplying the normalized inner product value $r_n$ obtained in step S1112-53-*n* by the correction coefficient $c_n$ obtained in step S1112-54-*n* as the n-th channel purification weight $\alpha_n$ (step S1112-55-*n*).

That is, the n-th channel purification weight estimation unit 1112-*n* of the fifth example obtains the value $c_n \times r_n$ obtained by multiplying the normalized inner product value $r_n$ obtained by Expression (2-11) using the inner product value $E_n(0)$ obtained by Expression (2-9) using each sample value $\hat{x}_n(t)$ of the n-th channel decoded sound signal $\hat{X}_n$, each sample value $\hat{x}_{Mn}(t)$ of the n-th channel upmixed monaural decoded sound signal $\hat{X}_{Mn}$, and the inner product value $E_n(-1)$ of the previous frame, and the energy $E_{Mn}(0)$ of the n-th channel upmixed monaural decoded sound signal obtained by Expression (2-10) using each sample value $\hat{x}_{Mn}(t)$ of the n-th channel upmixed monaural decoded sound signal $\hat{X}_{Mn}$ and the energy $E_{Mn}(-1)$ of the n-th channel upmixed monaural decoded sound signal of the previous frame, by the correction coefficient $c_n$ obtained by Expression (2-8) using the number of samples T per frame, the number of bits $b_n$ corresponding to the n-th channel in the number of bits of the stereo code CS, and the number of bits $b_M$ of the monaural code CM, as the n-th channel purification weight $\alpha_n$.

Sixth Example

The n-th channel purification weight estimation unit 1112-*n* of the sixth example obtains a value $\lambda \times c_n \times r_n$ obtained by multiplying the normalized inner product value $r_n$ and the correction coefficient $c_n$ described in the third example or the normalized inner product value $r_n$ and the correction coefficient $c_n$ described in the fifth example by $\lambda$ that is a predetermined value larger than 0 and smaller than 1 as the n-th channel purification weight $\alpha_n$.

Seventh Example

The n-th channel purification weight estimation unit 1112-*n* of the seventh example obtains the value $\gamma \times c_n \times r_n$ obtained by multiplying the normalized inner product value $r_n$ and the correction coefficient $c_n$ described in the third example or the normalized inner product value $r_n$ and the correction coefficient $c_n$ described in the fifth example by the inter-channel correlation coefficient $\gamma$ which is the correlation coefficient between the first channel decoded sound signal and the second channel decoded sound signal, as the n-th channel purification weight $\alpha_n$.

[n-th Channel Signal Purification Unit 1122-*n*]

The n-th channel decoded sound signal $\hat{X}_n=\{\hat{x}_n(1), x_n(2), \ldots, \hat{x}_n(T)\}$ input to the sound signal purification device 1102, the n-th channel upmixed monaural decoded sound signal $\hat{X}_{Mn}=\{\hat{x}_{Mn}(1), \hat{x}_{Mn}(2), \ldots, \hat{X}_{Mn}(T)\}$ output by the monaural decoded sound upmixing unit 1172, and the n-th channel purification weight $\alpha_n$ output by the n-th channel purification weight estimation unit 1112-*n* are input to the n-th channel signal purification unit 1122-*n*. For each corresponding sample t, the n-th channel signal purification unit 1122-*n* obtains and outputs a sequence based on a value $\tilde{x}_n(t)$ obtained by adding a value $\alpha n \times \hat{x}_{Mn}(t)$ obtained by multiplying the n-th channel purification weight $\alpha_n$ by the sample value $\hat{x}_{Mn}(t)$ of the n-th channel upmixed monaural decoded sound signal $\hat{X}_{Mn}$ and a value $(1-\alpha_n)\times\hat{x}_n(t)$ obtained by multiplying a value $(1-\alpha_n)$ obtained by subtracting the n-th channel purification weight $\alpha_n$ from 1 by the sample value $\hat{x}_n(t)$ of the n-th channel decoded sound signal $\hat{X}_n$, as the n-th channel purified decoded sound signal $\tilde{X}_n=\{\tilde{x}_n(1), \tilde{x}_n(2), \ldots, \tilde{x}_n(T)\}$ (step S1122-*n*). That is, $\tilde{x}_n(t)=(1-\alpha_n)\times\hat{x}_n(t)+\alpha_n\times\hat{x}_{Mn}(t)$.

Third Embodiment

Similarly to the sound signal purification device of the first embodiment and the second embodiment, a sound signal purification device of a third embodiment also improves the decoded sound signal of the each channel of the stereo by using a monaural decoded sound signal obtained from a code different from the code from which the decoded sound signal is obtained. The sound signal purification device of the third embodiment is different from the sound signal purification device of the second embodiment in that the inter-channel relationship information is obtained not from a decoded sound signal but from a code. Hereinafter, regarding the sound signal purification device of the third embodiment, differences from the sound signal purification device of the second embodiment will be described using an example in a case where the number of channels of the stereo is two.

<<Sound Signal Purification Device 1103>>

Figure 7:
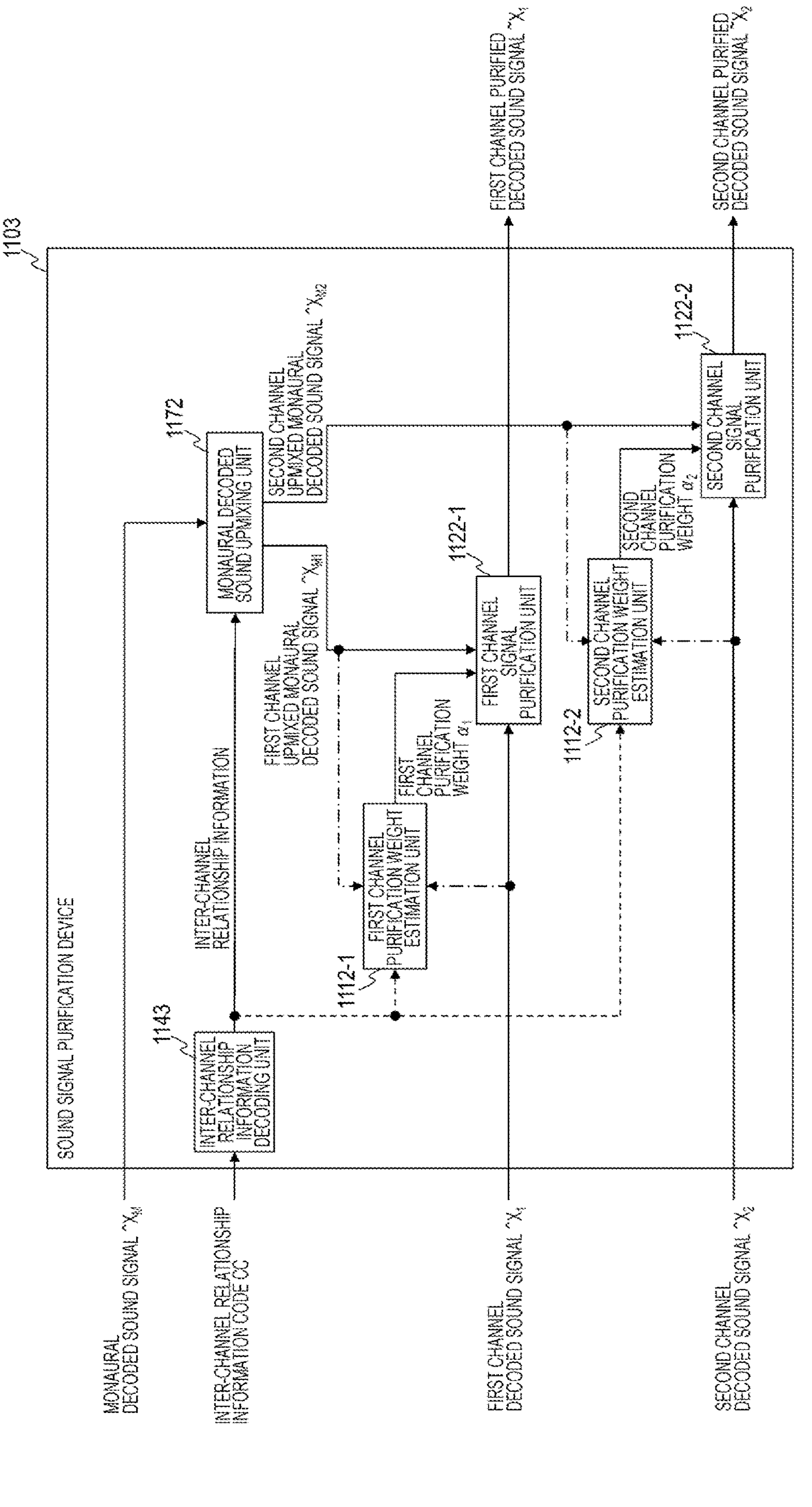
FIG. 7 is a block diagram illustrating an example of a sound signal purification device 1103.
Figure 8:
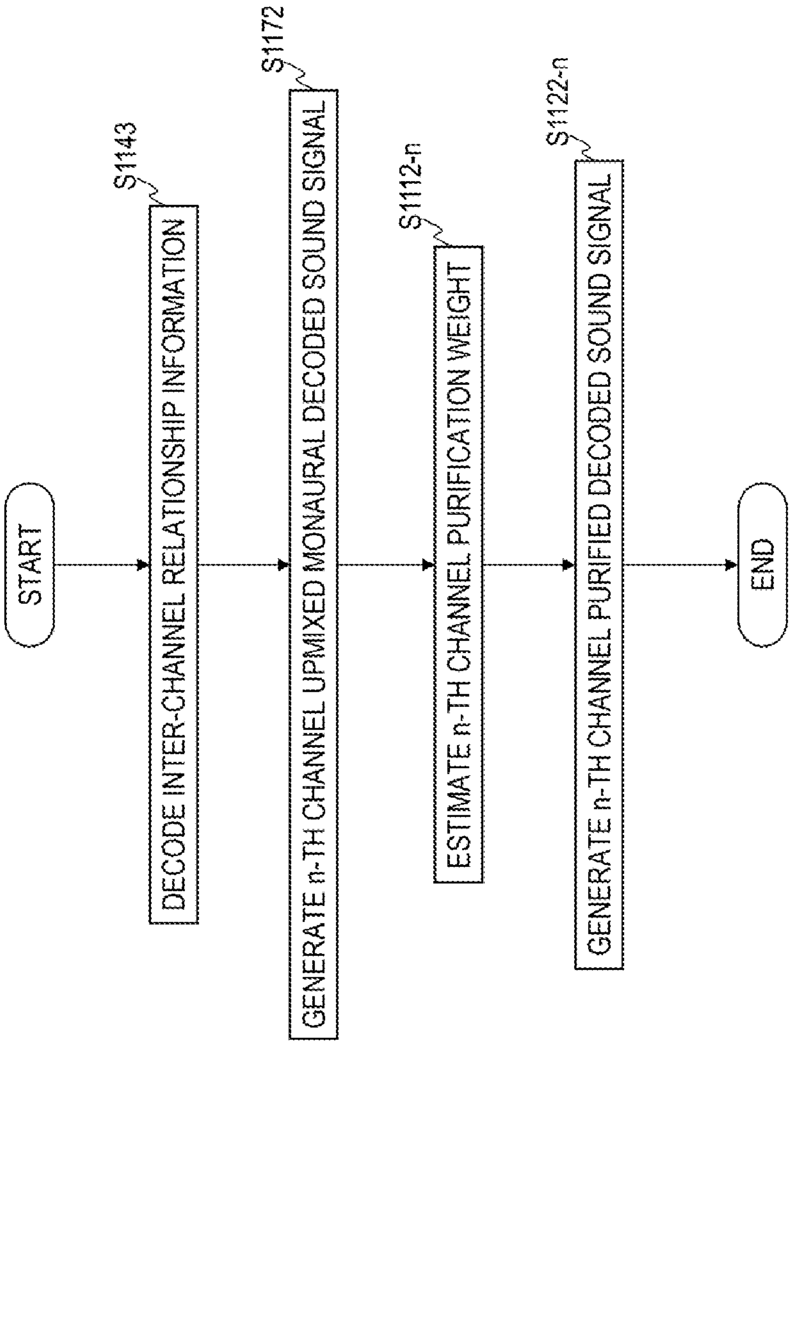
FIG. 8 is a flowchart illustrating an example of processing of the sound signal purification device 1103.

As illustrated in FIG. 7, the sound signal purification device 1103 of the third embodiment includes an inter-channel relationship information decoding unit 1143, the monaural decoded sound upmixing unit 1172, the first channel purification weight estimation unit 1112-1, the first channel signal purification unit 1122-1, the second channel purification weight estimation unit 1112-2, and the second channel signal purification unit 1122-2. For the each frame, as illustrated in FIG. 8, the sound signal purification device 1103 performs steps S1143 and S1172, and steps S1112-*n* and S1122-*n* for the each channel. The sound signal purification device 1103 of the third embodiment is different from the sound signal purification device 1102 of the second embodiment in that the inter-channel relationship information decoding unit 1143 is provided instead of the inter-channel relationship information estimation unit 1132, and step S1143 is performed instead of step S1132. Further, the inter-channel relationship information code CC of the each frame is also input to the sound signal purification device 1103 of the third embodiment. The inter-channel relationship information code CC may be a code obtained and output by the inter-channel relationship information encoding unit, which is not illustrated, included in the above-described encoding device 500, or may be a code included in the stereo code CS obtained and output by the stereo encoding unit 530 of the above-described encoding device 500. Hereinafter, differences between the sound signal purification device 1103 of the third embodiment and the sound signal purification device 1102 of the second embodiment will be described.

[Inter-Channel Relationship Information Decoding Unit 1143]

The inter-channel relationship information code CC input to the sound signal purification device 1103 is input to the inter-channel relationship information decoding unit 1143. The inter-channel relationship information decoding unit 1143 decodes the inter-channel relationship information code CC to obtain and output the inter-channel relationship information (step S1143). The inter-channel relationship information obtained by the inter-channel relationship information decoding unit 1143 is the same as the inter-channel relationship information obtained by the inter-channel relationship information estimation unit 1132 of the second embodiment.

Modification Example of Third Embodiment

In a case where the inter-channel relationship information code CC is a code included in the stereo code CS, the same inter-channel relationship information obtained in step S1143 is obtained by decoding in the stereo decoding unit 620 of the decoding device 600. Therefore, in a case where the inter-channel relationship information code CC is a code included in the stereo code CS, the inter-channel relationship information obtained by the stereo decoding unit 620 of the decoding device 600 may be input to the sound signal purification device 1103 of the third embodiment, and the sound signal purification device 1103 of the third embodiment may not include the inter-channel relationship information decoding unit 1143 and may not perform step S1143.

Further, in a case where only a part of the inter-channel relationship information code CC is a code included in the stereo code CS, it is only required that the inter-channel relationship information obtained by decoding the code included in the stereo code CS in the inter-channel relationship information code CC by the stereo decoding unit 620 of the decoding device 600 is input to the sound signal purification device 1103 of the third embodiment, and that the inter-channel relationship information decoding unit 1143 of the sound signal purification device 1103 of the third embodiment decodes, as step S1143, a code not included in the stereo code CS in the inter-channel relationship information code CC to obtain and output the inter-channel relationship information that has not been input to the sound signal purification device 1103.

Further, in a case where a code corresponding to a part of the inter-channel relationship information used by each unit of the sound signal purification device 1103 is not included in the inter-channel relationship information code CC, the sound signal purification device 1103 of the third embodiment is only required to also include the inter-channel relationship information estimation unit 1132, so that the inter-channel relationship information estimation unit 1132 also performs step S1132. In this case, in step S1132, the inter-channel relationship information estimation unit 1132 is only required to obtain and output the inter-channel relationship information that cannot be obtained by decoding the inter-channel relationship information code CC among pieces of the inter-channel relationship information used by respective units of the sound signal purification device 1103, similarly to step S1132 of the second embodiment.

Fourth Embodiment

Similarly to the sound signal purification device of the first to third embodiments, a sound signal purification device of a fourth embodiment also improves the decoded sound signal of the each channel of the stereo by using a monaural decoded sound signal obtained from a code different from the code from which the decoded sound signal is obtained. Hereinafter, the sound signal purification device of the fourth embodiment will be described with reference to the sound signal purification devices of the above-described embodiments as appropriate using an example in a case where the number of channels of the stereo is two.

Figure 9:
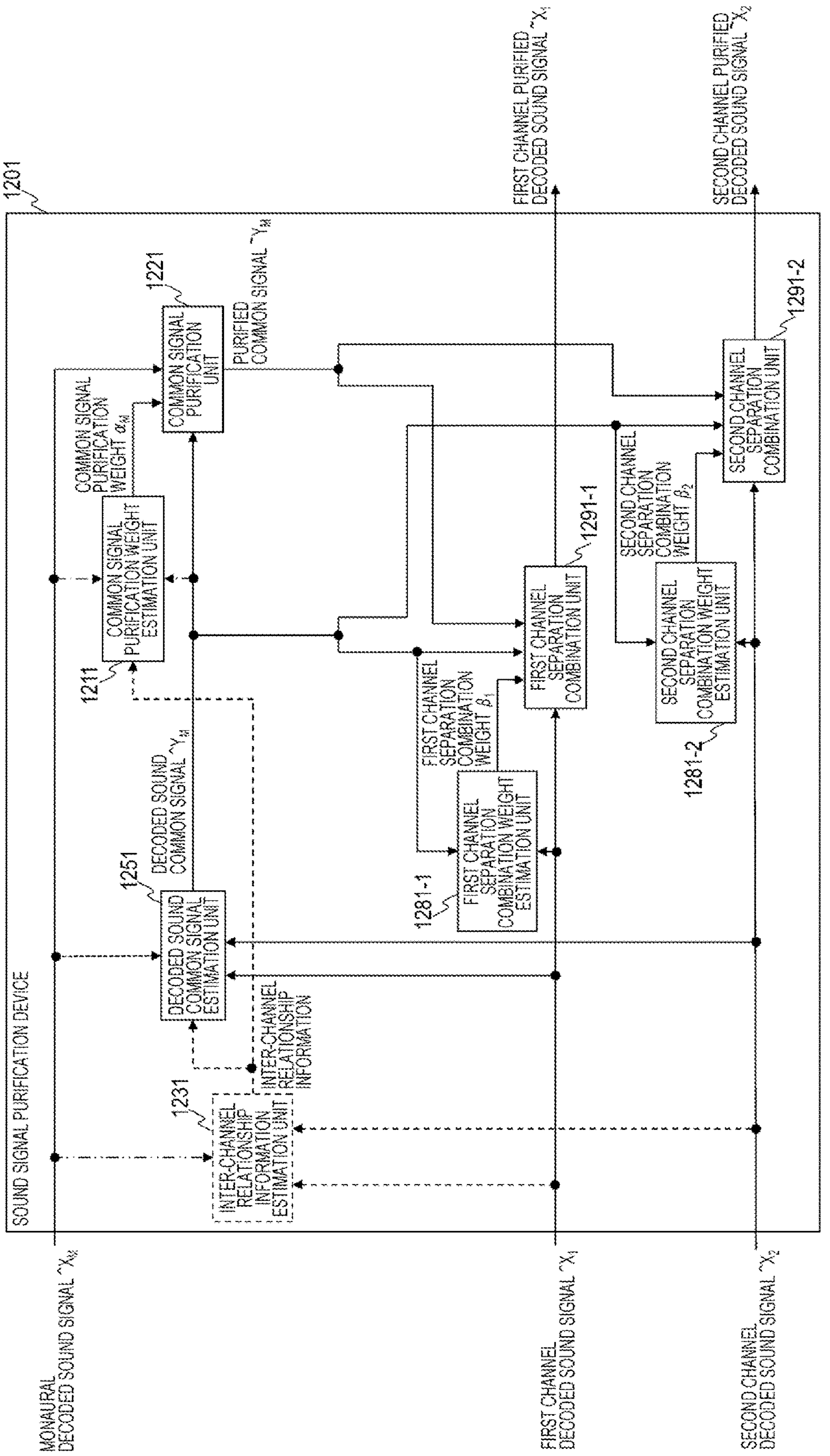
FIG. 9 is a block diagram illustrating an example of a sound signal purification device 1201.
Figure 10:
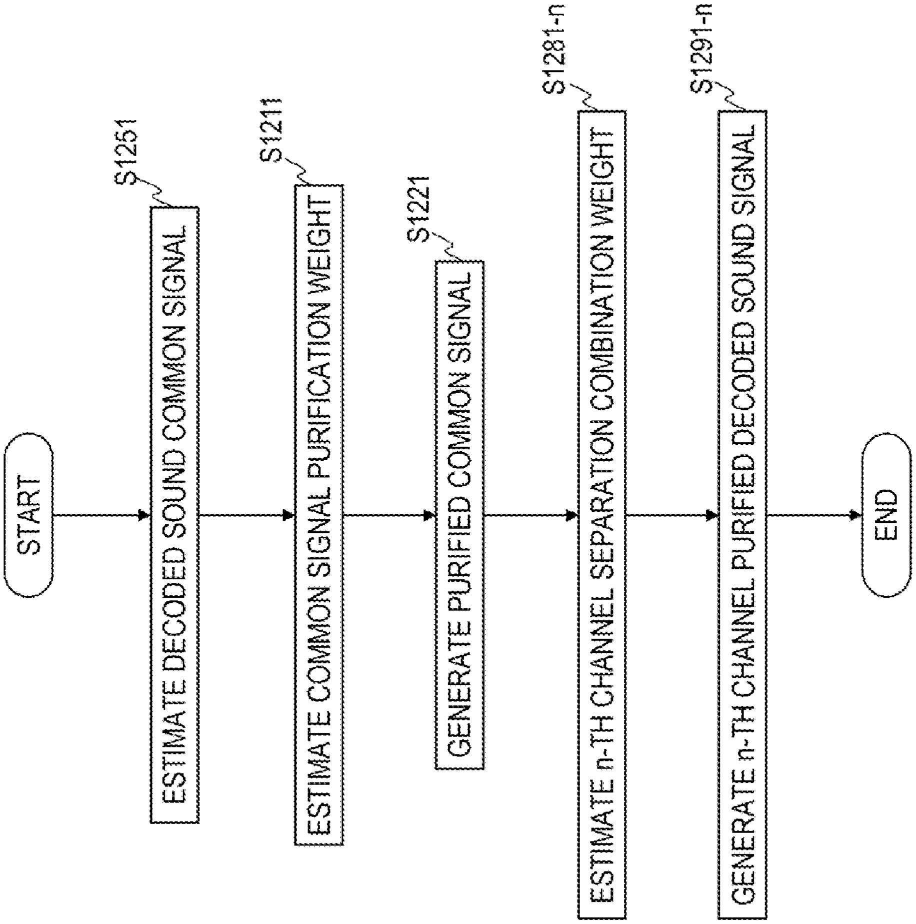
FIG. 10 is a flowchart illustrating an example of processing of the sound signal purification device 1201.

As illustrated in FIG. 9, the sound signal purification device 1201 of the fourth embodiment includes a decoded sound common signal estimation unit 1251, a common signal purification weight estimation unit 1211, a common signal purification unit 1221, a first channel separation combination weight estimation unit 1281-1, a first channel separation combination unit 1291-1, a second channel separation combination weight estimation unit 1281-2, and a second channel separation combination unit 1291-2. The sound signal purification device 1201 obtains a purified common signal, which is a sound signal obtained by improving a decoded sound common signal, from the decoded sound common signal and the monaural decoded sound signal for the decoded sound common signal that is a signal common to all channels of the decoded sound of the stereo, for example, in units of frames having a predetermined time length of 20 ms, to obtain and output, for the each channel of the stereo, a purified decoded sound signal which is a sound signal obtained by improving the decoded sound signal of the channel from the decoded sound common signal, the purified common signal, and the decoded sound signal of the channel. The decoded sound signals of the respective channels input in units of frames to the sound signal purification device 1201 are, for example, the first channel decoded sound signal $\hat{X}_1=\{\hat{x}_1(1), \hat{x}_1(2), \ldots, \hat{x}_1(T)\}$ of the T samples and the second channel decoded sound signal $\hat{X}_2=\{\hat{x}_2(1), \hat{x}_2(2), \ldots, \hat{x}_2(T)\}$ of the T samples obtained by the stereo decoding unit 620 of the decoding device 600 described above decoding the $b_s$-bit stereo code CS that is a code different from the monaural code CM without using the information obtained by decoding the monaural code CM or the monaural code CM. The monaural decoded sound signal input in units of frames to the sound signal purification device 1201 is, for example, the monaural decoded sound signal $\hat{X}_M=\{\hat{x}_M(1), \hat{x}_M(2), \ldots, \hat{x}_M(T)\}$ of the T samples obtained by the monaural decoding unit 610 of the decoding device 600 described above decoding the $b_M$-bit monaural code CM that is a code different from the stereo code CS without using the information obtained by decoding the stereo code CS or the stereo code CS. The monaural code CM is a code derived from the same sound signal as the sound signal from which the stereo code CS is derived (that is, the first channel input sound signal $X_1$ and the second channel input sound signal $X_2$ input to the encoding device 500), but is a code different from the code from which the first channel decoded sound signal $\hat{X}_1$ and the second channel decoded sound signal $\hat{X}_2$ are obtained (that is, the stereo code CS). Assuming that the channel number n of the first channel is 1 and the channel number n of the second channel is 2, the sound signal purification device 1201 performs steps S1251, S1211, and S1221 and steps S1281-*n* and S1291-*n* for the each channel as illustrated in FIG. 10 for the each frame.

[Decoded Sound Common Signal Estimation Unit 1251]

At least the first channel decoded sound signal $\hat{X}_1=\{x_1(1), \hat{x}_1(2), \ldots, \hat{x}_1(T)\}$ and the second channel decoded sound signal $\hat{X}_2=\{\hat{x}_2(1), \hat{x}_2(2), \ldots, \hat{x}_2(T)\}$ input to the sound signal purification device 1201 are input to the decoded sound common signal estimation unit 1251. The decoded sound common signal estimation unit 1251 obtains and outputs a decoded sound common signal $\hat{Y}_M=\{\hat{y}_M(1), \hat{y}_M(2), \ldots, \hat{y}_M(T)\}$ by using at least the first channel decoded sound signal $\hat{X}_1$ and the second channel decoded sound signal $\hat{X}_2$ (step S1251). The decoded sound common signal estimation unit 1251 is only required to use, for example, any of the following methods.

[[First Method for Obtaining Decoded Sound Common Signal]]

In a first method, the decoded sound common signal estimation unit 1251 also uses the monaural decoded sound signal $\hat{X}_M$ input to the sound signal purification device 1201 to obtain and output the decoded sound common signal $\hat{Y}_M$. That is, in the case of using the first method, the first channel decoded sound signal $\hat{X}_1=\{\hat{x}_1(1), \hat{x}_1(2), \ldots, \hat{x}_1(T)\}$, the second channel decoded sound signal $\hat{X}_2=\{x_2(1), \hat{x}_2(2), \ldots, \hat{x}_2(T)\}$, and the monaural decoded sound signal $\hat{X}_M=\{\hat{x}_M(1), \hat{x}_M(2), \ldots, \hat{x}_M(T)\}$ input to the sound signal purification device 1201 are input to the decoded sound common signal estimation unit 1251. First, the decoded sound common signal estimation unit 1251 obtains a weighting coefficient that minimizes the difference between the weighted average of the decoded sound signals of all channels of the stereo (weighted average of decoded sound signals $\hat{X}_1, \ldots, \hat{X}_N$ of all channels from the first to the N-th channel) and the monaural decoded sound signal (step S1251A-1). For example, the decoded sound common signal estimation unit 1251 obtains $w_{cand}$ having a minimum value obtained by the following Expression (41) among $w_{cand}$ of −1 or more and 1 or less as the weighting coefficient w.

[Math. 26]

$$\sum_{t=1}^{T}\left|\left(\frac{1+w_{cand}}{2}\hat{x}_1(t)+\frac{1-w_{cand}}{2}\hat{x}_2(t)\right)-\hat{x}_M(t)\right|^2 \quad (41)$$

Next, the decoded sound common signal estimation unit 1251 obtains a weighted average of the decoded sound signals of all channels of the stereo using the weighting coefficients (weighted average of the decoded sound signals $\hat{X}_1, \ldots, \hat{X}_N$ of all the channels from the first to the N-th channel) obtained in step S1251A-1, as the decoded sound common signal (step S1251A-2). For example, the decoded sound common signal estimation unit 1251 obtains the decoded sound common signal $\hat{y}_M(t)$ for each sample number t by the following Expression (42).

[Math. 27]

$$\hat{y}_M(t)=\frac{1+w}{2}\hat{x}_1(t)+\frac{1-w}{2}\hat{x}_2(t) \quad (42)$$

[[Second Method for Obtaining Decoded Sound Common Signal]]

A second method is a method corresponding to a case where the downmixing unit 510 of the encoding device 500 obtains the downmixed signal by the [[Second Method for Obtaining Downmixed Signal]]. In the second method, the decoded sound common signal estimation unit 1251 obtains the decoded sound common signal $\hat{Y}_M$ by performing step S1251B described later. In a case of using the second method, the sound signal purification device 1201 also includes an inter-channel relationship information estimation unit 1231 as indicated by a broken line in FIG. 9 in order to obtain the inter-channel correlation coefficient γ and preceding channel information used in step S1251B to be described later, and the inter-channel relationship information estimation unit 1231 performs the following step S1231 before the decoded sound common signal estimation unit 1251 performs step S1251B.

[[[Inter-channel Relationship Information Estimation Unit 123]]]

At least the first channel decoded sound signal $\hat{X}_1$ input to the sound signal purification device 1201 and the second channel decoded sound signal $\hat{X}_2$ input to the sound signal purification device 1201 are input to the inter-channel relationship information estimation unit 1231. The inter-channel relationship information estimation unit 1231 obtains and outputs the inter-channel correlation coefficient γ and the preceding channel information as the inter-channel relationship information by using at least the first channel decoded sound signal $\hat{X}_1$ and the second channel decoded sound signal $\hat{X}_2$ (step S1231). The inter-channel correlation coefficient γ is a correlation coefficient of the first channel decoded sound signal and the second channel decoded sound signal. The preceding channel information is information indicating which of the first channel and the second channel is preceding. For example, the inter-channel relationship information estimation unit 1231 performs the following steps S1231-1 to S1231-3.

The inter-channel relationship information estimation unit 1231 first obtains the inter-channel time difference τ by the method exemplified in the description of the inter-channel relationship information estimation unit 1132 of the second embodiment (step S1231-1). Next, the inter-channel relationship information estimation unit 1231 obtains and outputs a maximum value among correlation values between the first channel decoded sound signal and the sample sequence of the second channel decoded sound signal at a position shifted backward from the sample sequence by the inter-channel time difference τ, that is, correlation values $\gamma_{cand}$ calculated for each number of possible samples $\tau_{cand}$ from $\tau_{max}$ to $\tau_{min}$, as the inter-channel correlation coefficient $\gamma$ (step S1231-2). In a case where the inter-channel time difference $\tau$ is a positive value, the inter-channel relationship information estimation unit 1231 also obtains and outputs information indicating that the first channel is preceding as the preceding channel information, and in a case where the inter-channel time difference $\tau$ is a negative value, the inter-channel relationship information estimation unit 1231 obtains and outputs information indicating that the second channel is preceding as the preceding channel information (step S1231-3). In a case where the inter-channel time difference $\tau$ is zero, the inter-channel relationship information estimation unit 1231 may obtain and output the information indicating that the first channel is preceding as the preceding channel information, or may obtain and output the information indicating that the second channel is preceding as the preceding channel information but preferably obtains and outputs information indicating that none of the channels is preceding as the preceding channel information.

[[[Decoded Sound Common Signal Estimation Unit 1251]]]

The first channel decoded sound signal $\hat{X}_1$ input to the sound signal purification device 1201, the second channel decoded sound signal $\hat{X}_2$ input to the sound signal purification device 1201, the inter-channel correlation coefficient $\gamma$ output by the inter-channel relationship information estimation unit 1231, and the preceding channel information output by the inter-channel relationship information estimation unit 1231 are input to the decoded sound common signal estimation unit 1251. The decoded sound common signal estimation unit 1251 performs weighted averaging on the first channel decoded sound signal $\hat{X}_1$ and the second channel decoded sound signal $\hat{X}_2$ to obtain the decoded sound common signal $\hat{Y}_M$ such that the decoded sound signal of the preceding channel out of the first channel decoded sound signal $\hat{X}_1$ and the second channel decoded sound signal $\hat{X}_2$ is included to be larger in the decoded sound common signal $\hat{Y}_M$ as the inter-channel correlation coefficient $\gamma$ is larger, and outputs the decoded sound common signal $\hat{Y}_M$ (51251B).

For example, the decoded sound common signal estimation unit 1251 is only required to weight and add the first channel decoded sound signal $\hat{x}_1(t)$ and the second channel decoded sound signal $\hat{x}_2(t)$ to each corresponding sample number t by using the weight determined by the inter-channel correlation coefficient $\gamma$, to obtain the decoded sound common signal $\hat{y}_M(t)$. Specifically, in a case where the preceding channel information is the information indicating that the first channel is preceding, that is, in a case where the first channel is preceding, the decoded sound common signal estimation unit 1251 is only required to obtain $\hat{y}_M(t)=((1+\gamma)/2)\times\hat{x}_1(t)+((1-\gamma)/2)\times\hat{x}_2(t)$ as the decoded sound common signal $\hat{y}_M(t)$ for each sample number t. That is, in a case where the first channel is preceding, the decoded sound common signal estimation unit 1251 is only required to obtain a sequence based on $\hat{y}_M(t)=((1+\gamma)/2)\times\hat{x}_1(t)+((1-\gamma)/2)\times\hat{x}_2(t)$ as the decoded sound common signal $\hat{Y}_M$. In a case where the preceding channel information is the information indicating that the second channel is preceding, that is, in a case where the second channel is preceding, the decoded sound common signal estimation unit 1251 is only required to obtain $\hat{y}_M(t)=((1-\gamma)/2)\times\hat{x}_1(t)+((1+\gamma)/2)\times\hat{x}_2(t)$ as the decoded sound common signal $\hat{y}_M(t)$ for each sample number t. That is, in a case where the second channel is preceding, the decoded sound common signal estimation unit 1251 is only required to obtain a sequence based on $\hat{y}_M(t)=((1-\gamma)/2)\times\hat{x}_1(t)+((1+\gamma)/2)\times\hat{x}_2(t)$ as the decoded sound common signal $\hat{Y}_M$. Note that, in a case where the preceding channel information indicates that no channel is preceding, the decoded sound common signal estimation unit 1251 is only required to obtain $\hat{y}_M(t)=(\hat{x}_1(t)+\hat{x}_2(t))/2$ obtained by averaging the first channel decoded sound signal $\hat{x}_1(t)$ and the second channel decoded sound signal $\hat{x}_2(t)$ for each sample number t as the decoded sound common signal $\hat{y}_M(t)$. That is, in a case where none of the channels is preceding, the decoded sound common signal estimation unit 1251 is only required to obtain a sequence based on $\hat{y}_M(t)=(\hat{x}_1(t)+\hat{x}_2(t))/2$ as the decoded sound common signal $\hat{Y}_M$.

[Common Signal Purification Weight Estimation Unit 1211]

The common signal purification weight estimation unit 1211 obtains and outputs a common signal purification weight $\alpha_M$ (step 1211). The common signal purification weight estimation unit 1211 obtains the common signal purification weight $\alpha_M$ by a method similar to the method based on the principle of minimizing the quantization error described in the first embodiment. The common signal purification weight $\alpha_M$ obtained by the common signal purification weight estimation unit 1211 is a value of 0 or more and 1 or less. However, since the common signal purification weight estimation unit 1211 obtains the common signal purification weight $\alpha_M$ for the each frame by the method to be described later, the common signal purification weight $\alpha_M$ does not become zero or one in all the frames. That is, there is a frame in which the common signal purification weight $\alpha_M$ is a value larger than 0 and smaller than 1. In other words, in at least any one of all the frames, the common signal purification weight $\alpha_M$ is a value larger than 0 and smaller than 1.

Specifically, as in the following first to seventh examples, the common signal purification weight estimation unit 1211 obtains a common component signal weight $\alpha_M$ by using the decoded sound common signal $\hat{Y}_M$ instead of the n-th channel decoded sound signal $\hat{X}_n$ at a position where the n-th channel decoded sound signal $\hat{X}_n$ is used in the method based on the principle of minimizing the quantization error described in the first embodiment, and by using the number of bits $b_m$ corresponding to the common signal in the number of bits of the stereo code CS instead of the number of bits $b_n$ at a position where the number of bits $b_n$ corresponding to the n-th channel in the number of bits of the stereo code CS is used in the method based on the principle of minimizing the quantization error described in the first embodiment. That is, in the following first to seventh examples, the number of bits $b_M$ of the monaural code CM and the number of bits $b_m$ corresponding to the common signal in the number of bits of the stereo code CS are used. Since the method for specifying the number of bits $b_M$ of the monaural code CM is the same as that of the first embodiment, a method for specifying the number of bits $b_m$ corresponding to the common signal in the number of bits of the stereo code CS will be described before describing the first to seventh examples. The decoded sound common signal $\hat{Y}_M=\{\hat{Y}_M(1), \hat{Y}_M(2), \ldots, \hat{y}_M(T)\}$ output by the decoded sound common signal estimation unit 1251 and the monaural decoded sound signal $\hat{X}_M=\{\hat{x}_M(1), \hat{x}_M(2), \ldots, \hat{x}_M(T)\}$ input to the sound signal purification device 1101 are input to the common signal purification weight estimation unit 1211 as necessary as indicated by a one-dot chain line in FIG. 9.

[Method for Specifying Number of Bits $b_m$ in Number of Bits of Stereo Code CS]

[[First Method for Specifying Number of Bits $b_m$ in Number of Bits of Stereo Code CS]]

The common signal purification weight estimation unit 1211 uses a value obtained by multiplying the number of bits $b_s$ of the stereo code CS by a predetermined value larger than 0 and smaller than 1 as $b_m$. That is, in a case where the number of bits $b_s$ of the stereo code CS in the decoding method used by the stereo decoding unit 620 is the same in all the frames, a value obtained by multiplying the number of bits $b_s$ of the stereo code CS by a predetermined value larger than 0 and smaller than 1 is only required to be stored as the number of bits $b_m$ in the storage unit, which is not illustrated, in the common signal purification weight estimation unit 1211. In a case where the number of bits $b_s$ of the stereo code CS in the decoding method used by the stereo decoding unit 620 is different depending on the frame, the common signal purification weight estimation unit 1211 is only required to obtain a value obtained by multiplying the number of bits $b_s$ by a predetermined value larger than 0 and smaller than 1 as $b_m$. For example, the common signal purification weight estimation unit 1211 is only required to use the reciprocal of the number of channels as the predetermined value larger than 0 and smaller than 1. That is, the common signal purification weight estimation unit 1211 may use a value obtained by dividing the number of bits $b_s$ of the stereo code CS by the number of channels as $b_m$.

[[Second Method for Specifying Number of Bits $b_m$ in Number of Bits of Stereo Code CS]]

The common signal purification weight estimation unit 1211 may estimate $b_m$ for the each frame using the inter-channel correlation coefficient $\gamma$. In a case where the correlation between the channels is high, most of the number of bits $b_s$ of the stereo code CS is used to express a signal component common between the channels, and in a case where the correlation between the channels is low, it is expected that the number of bits close to an equal number with respect to the number of channels is used. Therefore, in the second method, the common signal purification weight estimation unit 1211 is only required to obtain a value closer to the number of bits $b_s$ as $b_m$ as the inter-channel correlation coefficient $\gamma$ is closer to 1, and is only required to obtain a value closer to a value obtained by dividing $b_s$ by the number of channels as $b_m$ as the inter-channel correlation coefficient $\gamma$ is closer to zero. Note that, in a case where the second method is used, the sound signal purification device 1201 also includes the inter-channel relationship information estimation unit 1231 as indicated by a broken line in FIG. 9 in order to obtain the inter-channel correlation coefficient $\gamma$, and the inter-channel relationship information estimation unit 1231 obtains the inter-channel correlation coefficient $\gamma$ as described above in the description of [[Second Method for Obtaining Decoded Sound Common Component Signal]] and the description of the inter-channel relationship information estimation unit 1132 of the second embodiment.

First Example

The common signal purification weight estimation unit 1211 of the first example obtains the common signal purification weight $\alpha_M$ by the following Expression (4-5) using the number of samples T per frame, the number of bits $b_m$ corresponding to the common signal in the number of bits of the stereo code CS, and the number of bits $b_M$ of the monaural code CM.

[Math. 28]

$$\alpha_M = \frac{2^{-\frac{2b_m}{T}}}{2^{-\frac{2b_m}{T}} + 2^{-\frac{2b_M}{T}}} \quad (4\text{-}5)$$

Second Example

The common signal purification weight estimation unit 1211 of the second example uses at least the number of bits $b_m$ corresponding to the common signal in the number of bits of the stereo code CS and the number of bits $b_M$ of the monaural code CM to obtain a value that is larger than 0 and smaller than 1, 0.5 when $b_m$ and $b_M$ are equal, closer to 0 than 0.5 as $b_m$ is larger than $b_M$, and closer to 1 than 0.5 as $b_M$ is larger than $b_m$ as the common signal purification weight $\alpha_M$.

Third Example

The common signal purification weight estimation unit 1211 of the third example obtains a value $c_M \times r_M$ obtained by multiplying the correction coefficient $c_M$ obtained by

[Math. 29]

$$c_M = \frac{2^{-\frac{2b_m}{T}}}{2^{-\frac{2b_m}{T}} + 2^{-\frac{2b_M}{T}}} \quad (4\text{-}8)$$

using the number of samples T per frame, the number of bits $b_m$ corresponding to the common signal in the number of bits of the stereo code CS, and the number of bits $b_M$ of the monaural code CM by a normalized inner product value $r_M$ for the monaural decoded sound signal $\hat{X}_M$ of the decoded sound common signal $\hat{Y}_M$ as the common signal purification weight $\alpha_M$.

The common signal purification weight estimation unit 1211 of the third example obtains the common signal purification weight $\alpha_M$ by performing, for example, the following steps **S1211-31-*n* to S1211-33-*n*. The common signal purification weight estimation unit 1211 first obtains the normalized inner product value $r_M$ for the monaural decoded sound signal $\hat{X}_M$ of the decoded sound common signal $\hat{Y}_M$ by the following Expression (4-6) from the decoded sound common signal $\hat{Y}_M=\{\hat{y}_M(1), \hat{y}_M(2), \ldots, \hat{y}_M(T)\}$ and the monaural decoded sound signal $\hat{X}_M=\{\hat{x}_M(1), \hat{x}_M(2), \ldots, \hat{x}_M(T)\}$ (step S1211-31-*n***).

[Math. 30]

$$r_M = \frac{\sum_{t=1}^{T} \hat{y}_M(t)\hat{x}_M(t)}{\sum_{t=1}^{T} \hat{x}_M(t)\hat{x}_M(t)} \quad (4\text{-}6)$$

The common signal purification weight estimation unit 1211 also obtains the correction coefficient $c_M$ by Expression (4-8) using the number of samples T per frame, the number of bits $b_m$ corresponding to the common signal in the number of bits of the stereo code CS, and the number of bits $b_M$ of the monaural code CM (step **S1211-32-*n*). Next, the common signal purification weight estimation unit 1211 obtains the value $c_M \times r_M$ obtained by multiplying the normalized inner product value $r_M$ obtained in step S1211-31**-*n* by the correction coefficient $c_M$ obtained in step S1211-32-*n* as the common signal purification weight $\alpha_M$ (step S1211-33-*n*).

Fourth Example

The common signal purification weight estimation unit 1211 of the fourth example uses the number of bits corresponding to the common signal in the number of bits of the stereo code CS as $b_m$ and the number of bits of the monaural code CM as $b_M$ to obtain the value $c_M \times r_M$ obtained by multiplying $r_M$ that is a value of 0 or more and 1 or less, closer to 1 as the correlation between the decoded sound common signal $\hat{Y}_M$ and the monaural decoded sound signal $\hat{X}_M$ is higher, and closer to 0 as the correlation is lower by the correction coefficient $c_M$ that is a value larger than 0 and smaller than 1, 0.5 when $b_m$ and $b_M$ are equal, closer to 0 than 0.5 as the $b_m$ is larger than $b_M$, and closer to 1 than 0.5 as the $b_m$ is smaller than $b_M$, as the common signal purification weight $\alpha_M$.

Fifth Example

The common signal purification weight estimation unit 1211 of the fifth example obtains the common signal purification weight $\alpha_M$ by performing the following steps S1211-51 to S1211-55.

The common signal purification weight estimation unit 1211 first obtains the inner product value $E_m(0)$ to be used in the current frame by the following Expression (4-9) using the decoded sound common signal $\hat{Y}_M=\{\hat{y}_M(1), \hat{y}_M(2), \ldots, \hat{y}_M(T)\}$, the monaural decoded sound signal $\hat{X}_M=\{\hat{x}_M(1), \hat{x}_M(2), \ldots, \hat{x}_M(T)\}$, and the inner product value $E_m(-1)$ that has been used in the previous frame (step S1211-51).

[Math. 31]

$$E_m(0) = \epsilon_m E_m(-1) + \frac{(1-\epsilon_m)}{T}\sum_{t=1}^{T}\hat{y}_M(t)\hat{x}_M(t) \qquad (4\text{-}9)$$

Here, $\varepsilon_m$ is a predetermined value larger than 0 and smaller than 1, and is stored in advance in the common signal purification weight estimation unit 1211. Note that the common signal purification weight estimation unit 1211 stores the obtained inner product value $E_m(0)$ in the common signal purification weight estimation unit 1211 in order to use this inner product value $E_m(0)$ as the inner product value $E_m(-1)$ that has been used in the previous frame in the next frame.

The common signal purification weight estimation unit 1211 also obtains the energy $E_M(0)$ of the monaural decoded sound signal to be used in the current frame by the following Expression (4-10) using the monaural decoded sound signal $\hat{X}_M=\{\hat{x}_M(1), \hat{x}_M(2), \ldots, \hat{x}_M(T)\}$ and the energy $E_M(-1)$ of the monaural decoded sound signal that has been used in the previous frame (step S1211-52).

[Math. 32]

$$E_M(0) = \epsilon_M E_M(-1) + \frac{(1-\epsilon_M)}{T}\sum_{t=1}^{T}\hat{x}_M(t)\hat{x}_M(t) \qquad (4\text{-}10)$$

Here, $\varepsilon_M$ is a predetermined value larger than 0 and smaller than 1, and is stored in advance in the common signal purification weight estimation unit 1211. Note that the common signal purification weight estimation unit 1211 stores the obtained energy $E_M(0)$ of the monaural decoded sound signal in the common signal purification weight estimation unit 1211 in order to use this energy $E_M(0)$ as "the energy EM(−1) of the monaural decoded sound signal that has been used in the previous frame" in the next frame.

Next, the common signal purification weight estimation unit 1211 obtains the normalized inner product value $r_M$ by the following Expression (4-11) using the inner product value $E_m(0)$ to be used in the current frame obtained in step S1211-51 and the energy $E_M(0)$ of the monaural decoded sound signal used in the current frame obtained in step S1211-52 (step S1211-53).

[Math. 33]

$$r_M = E_m(0)/E_M(0) \qquad (4\text{-}11)$$

The common signal purification weight estimation unit 1211 also obtains the correction coefficient $c_M$ by Expression (4-8) (step S1211-54). Next, the common signal purification weight estimation unit 1211 obtains the value $c_M \times r_M$ obtained by multiplying the normalized inner product value $r_M$ obtained in step S1211-53 by the correction coefficient $c_M$ obtained in step S1211-54, as the common signal purification weight $\alpha_M$ (step S1211-55).

That is, the common signal purification weight estimation unit 1211 of the fifth example obtains the value $c_M \times r_M$ obtained by multiplying the normalized inner product value $r_M$ obtained by Expression (4-11) using the inner product value $E_m(0)$ obtained by Expression (4-9) using each sample value $\hat{y}_M(t)$ of the decoded sound common signal $\hat{Y}_M$, each sample value $\hat{x}_M(t)$ of the monaural decoded sound signal $\hat{X}_M$, and the inner product value $E_m(-1)$ of the previous frame, and the energy $E_M(0)$ of the monaural decoded sound signal obtained by Expression (4-10) using each sample value $\hat{x}_M(t)$ of the monaural decoded sound signal $\hat{X}_M$ and the energy $E_M(-1)$ of the monaural decoded sound signal of the previous frame by the correction coefficient $c_M$ obtained by Expression (4-8) using the number of samples T per frame, the number of bits $b_m$ corresponding to the common signal in the number of bits of the stereo code CS, and the number of bits $b_M$ of the monaural code CM, as the common signal purification weight $\alpha_M$.

Sixth Example

The common signal purification weight estimation unit 1211 of the sixth example obtains the value $\lambda \times c_M \times r_M$ obtained by multiplying the normalized inner product value $r_M$ and the correction coefficient $c_M$ described in the third example or the normalized inner product value $r_M$ and the correction coefficient $c_M$ described in the fifth example by $\lambda$ that is a predetermined value larger than 0 and smaller than 1 as the common signal purification weight $\alpha_M$.

Seventh Example

The common signal purification weight estimation unit 1211 of the seventh example obtains the value $\gamma \times c_M \times r_M$ obtained by multiplying the normalized inner product value $r_M$ and the correction coefficient $c_M$ described in the third example or the normalized inner product value $r_M$ and the correction coefficient $c_M$ described in the fifth example by the inter-channel correlation coefficient $\gamma$ that is the correlation coefficient between the first channel decoded sound signal and the second channel decoded sound signal, as the common signal purification weight $\alpha_M$. The sound signal purification device 1201 of the seventh example also includes the inter-channel relationship information estimation unit 1231 as indicated by a broken line in FIG. 9 in order to obtain the inter-channel correlation coefficient $\gamma$, and the inter-channel relationship information estimation unit 1231 obtains the inter-channel correlation coefficient $\gamma$ as described above in the description of the [[Second Method for Obtaining Decoded Sound Common Component Signal]] and the description of the inter-channel relationship information estimation unit 1132 of the second embodiment.

[Common Signal Purification Unit 1221]

The decoded sound common signal $\hat{Y}_M=\{\hat{y}_M(1), \hat{y}_M(2), \ldots, \hat{y}_M(T)\}$ output by the decoded sound common signal estimation unit 1251, the monaural decoded sound signal $\hat{X}_M=\{\hat{x}_M(1), \hat{x}_M(2), \ldots, \hat{x}_M(T)\}$ input to the sound signal purification device 1201, and the common signal purification weight $\alpha_M$ output by the common signal purification weight estimation unit 1211 are input to the common signal purification unit 1221. For each corresponding sample t, the common signal purification unit 1221 obtains and outputs a sequence based on a value $\tilde{y}_M(t)$ obtained by adding a value $\alpha_M\times\hat{x}_M(t)$ obtained by multiplying the common signal purification weight $\alpha_M$ by the sample value $\hat{x}_M(t)$ of the monaural decoded sound signal $\hat{X}_M$ and a value $(1-\alpha_M)\times\hat{y}_M(t)$ obtained by multiplying a value $(1-\alpha_M)$ obtained by subtracting the common signal purification weight $\alpha_M$ from 1 by the sample value $\hat{y}_M(t)$ of the decoded sound common signal $\hat{Y}_M$, as a purified common signal $\tilde{Y}_M=\{\tilde{y}_M(1), \tilde{y}_M(2), \ldots, \tilde{y}_M(T)\}$ (step S1221). That is, $\tilde{y}_M(t)=(1-\alpha_M)\times\hat{y}_M(t)+\alpha_M\times\hat{x}_M(t)$.

[n-th Channel Separation Combination Weight Estimation Unit 1281-*n*]

The n-th channel decoded sound signal $\hat{X}_n=\{\hat{x}_n(1), \hat{x}_n(2), \ldots, \hat{x}_n(T)\}$ input to the sound signal purification device 1201 and the decoded sound common signal $\hat{Y}_M=\{\hat{y}_M(1), \hat{y}_M(2), \ldots, \hat{y}_M(T)\}$ output by the decoded sound common signal estimation unit 1251 are input to the n-th channel separation combination weight estimation unit 1281-*n*. The n-th channel separation combination weight estimation unit 1281-*n* obtains a normalized inner product value for the decoded sound common signal $\hat{Y}_M$ of the n-th channel decoded sound signal $\hat{X}_n$ from the n-th channel decoded sound signal $\hat{X}_n$ and the decoded sound common signal $\hat{Y}_M$ as an n-th channel separation combination weight $\beta_n$ (step S1281-*n*). Specifically, the n-th channel separation combination weight $\beta_n$ is as represented by Expression (43).

[Math. 34]

$$\beta_n = \frac{\sum_{t=1}^{T} \hat{x}_n(t)\hat{y}_M(t)}{\sum_{t=1}^{T} \hat{y}_M(t)\hat{y}_M(t)} \tag{43}$$

[n-th Channel Separation Combination Unit 1291-*n*]

The n-th channel decoded sound signal $\hat{X}_n=\{\hat{x}_n(1), \hat{x}_n(2), \ldots, \hat{x}_n(T)\}$ input to the sound signal purification device 1201, the decoded sound common signal $\hat{Y}_M=\{\hat{y}_M(1), \hat{y}_M(2), \ldots, \hat{y}_M(T)\}$ output by the decoded sound common signal estimation unit 1251, the purified common signal $\tilde{Y}_M=\{\tilde{y}_M(1), \tilde{y}_M(2), \ldots, \tilde{y}_M(T)\}$ output by the common signal purification unit 1221, and the n-th channel separation combination weight $\beta_n$ output by the n-th channel separation combination weight estimation unit 1281-*n* are input to the n-th channel separation combination unit 1291-*n*. For each corresponding sample t, the n-th channel separation combination unit 1291-*n* obtains and outputs a sequence based on a value $\tilde{x}_n(t)$ obtained by subtracting a value $\beta_n\times\hat{y}_M(t)$ obtained by multiplying the n-th channel separation combination weight $\beta_n$ by the sample value $\hat{y}_M(t)$ of the decoded sound common signal $\hat{Y}_M$ from the sample value $\hat{x}_n(t)$ of the n-th channel decoded sound signal $\hat{X}_n$, and adding a value $\beta_n\times\tilde{y}_M(t)$ obtained by multiplying the n-th channel separation combination weight $\beta_n$ by a sample value $\tilde{y}_M(t)$ of the purified common signal $\tilde{Y}_M$, as the n-th channel purified decoded sound signal $\tilde{X}_n=\{\tilde{x}_n(1), \tilde{x}_n(2), \ldots, \tilde{x}_n(T)\}$ (step S1291-*n*). That is, $\tilde{x}_n(t)=\hat{x}_n(t)-\beta_n\times\hat{Y}_M(t)+\beta_n\times\tilde{y}_M(t)$.

Modification Example of Fourth Embodiment

In a case where the sound signal purification device 1201 uses the inter-channel relationship information and the stereo decoding unit 620 of the decoding device 600 obtains at least one piece of the inter-channel relationship information used by the sound signal purification device 1201, the inter-channel relationship information obtained by the stereo decoding unit 620 of the decoding device 600 may be input to the sound signal purification device 1201, and the sound signal purification device 1201 may use the input inter-channel relationship information.

In addition, in a case where the sound signal purification device 1201 uses the inter-channel relationship information and at least one piece of the inter-channel relationship information used by the sound signal purification device 1201 is included in the inter-channel relationship information code CC obtained and output by the inter-channel relationship information encoding unit, which is not illustrated, included in the encoding device 500 described above, a code representing the inter-channel relationship information used by the sound signal purification device 1201 included in the inter-channel relationship information code CC may be input to the sound signal purification device 1201, the sound signal purification device 1201 may include an inter-channel relationship information decoding unit, which is not illustrated, and the inter-channel relationship information decoding unit may decode the code representing the inter-channel relationship information to obtain and output the inter-channel relationship information.

That is, in a case where all pieces of the inter-channel relationship information used by the sound signal purification device 1201 are input to the sound signal purification device 1201 or obtained by the inter-channel relationship information decoding unit, the sound signal purification device 1201 does not need to include the inter-channel relationship information estimation unit 1231.

Fifth Embodiment

Similarly to the sound signal purification device of the fourth embodiment, a sound signal purification device of a fifth embodiment also improves the decoded sound signal of the each channel of the stereo by using a monaural decoded sound signal obtained from a code different from the code from which the decoded sound signal is obtained. The sound signal purification device of the fifth embodiment is different from the sound signal purification device of the fourth embodiment in that a signal obtained by upmixing the monaural decoded sound signal for the each channel is used instead of the monaural decoded sound signal itself, and a signal obtained by upmixing the decoded sound common signal for the each channel is used instead of the decoded sound common signal itself. Hereinafter, regarding the sound signal purification device of the fifth embodiment, differences from the sound signal purification device of the fourth embodiment will be mainly described with reference to the sound signal purification devices of the above-described embodiments as appropriate, using an example in a case where the number of channels of the stereo is two.

<<Sound Signal Purification Device 1202>>

Figure 11:
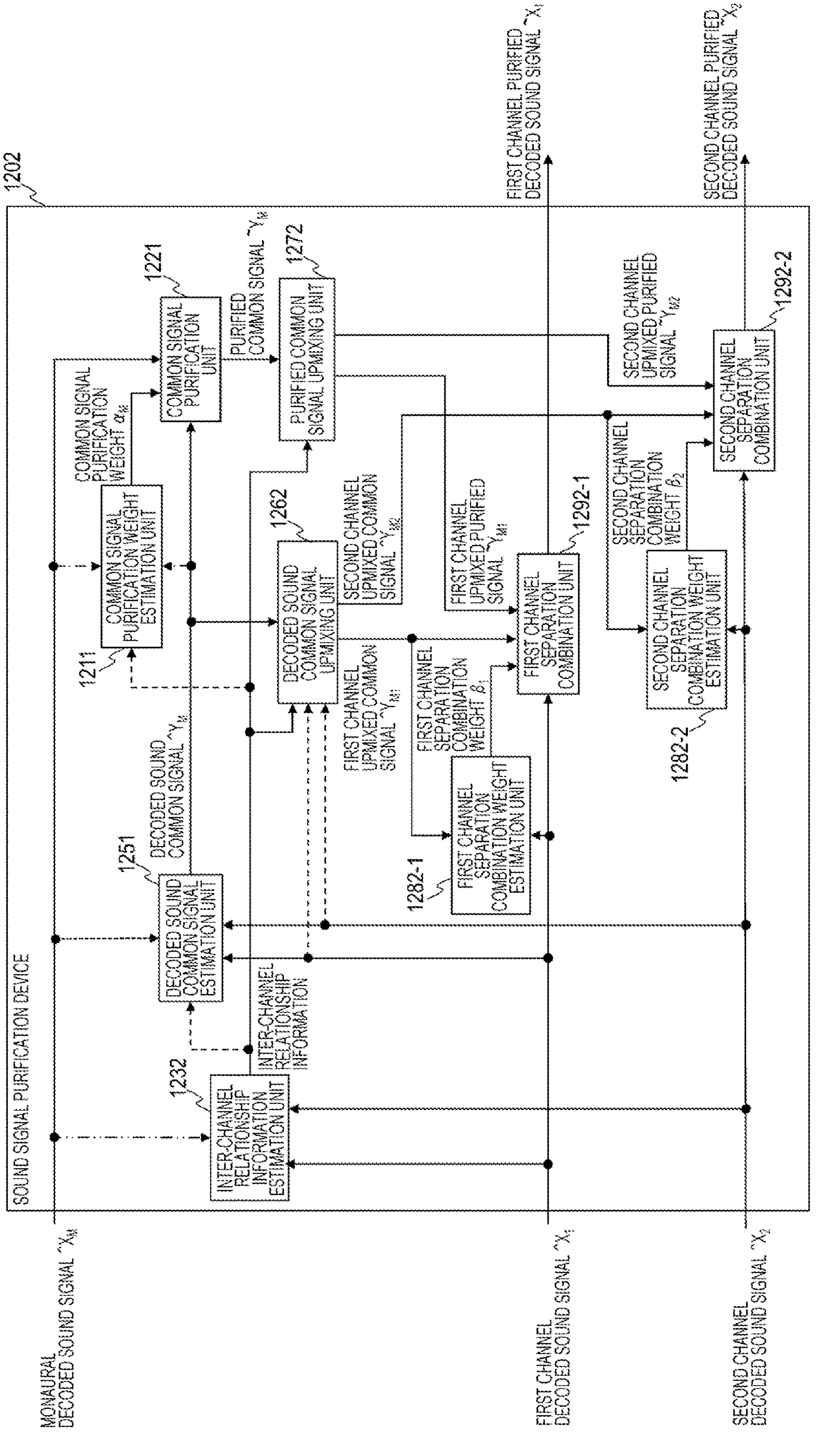
FIG. 11 is a block diagram illustrating an example of a sound signal purification device 1202.
Figure 12:
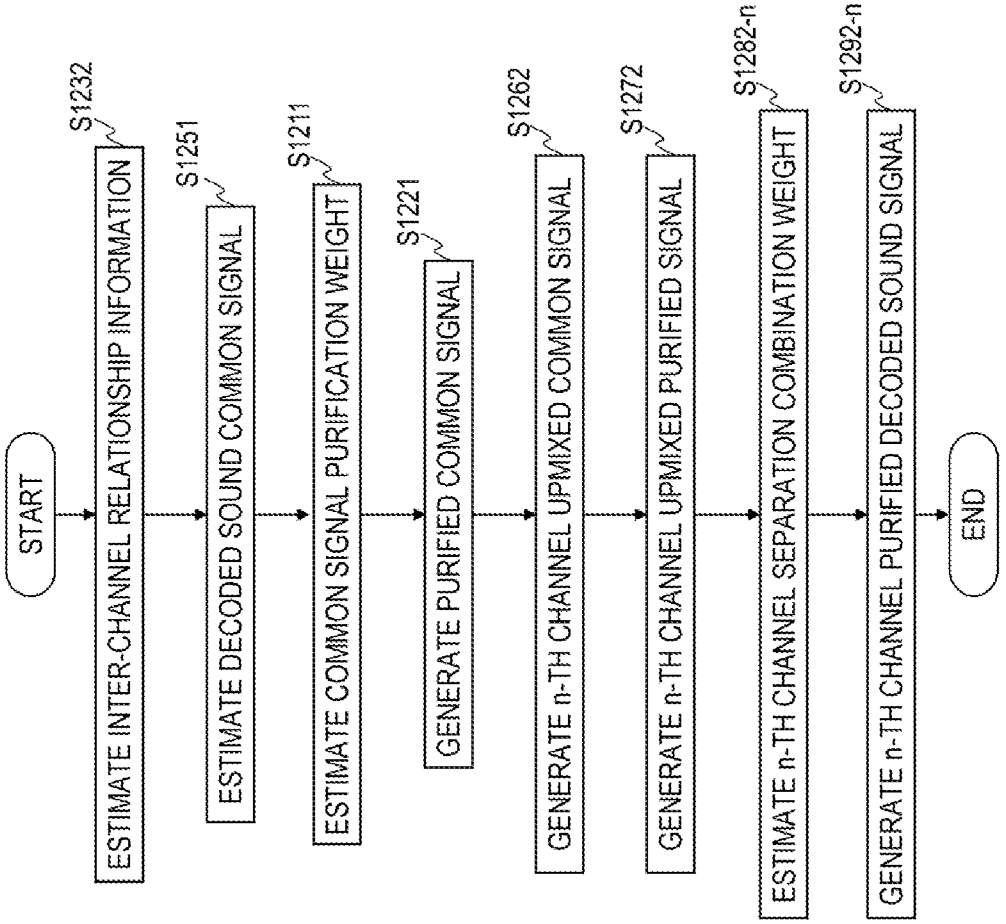
FIG. 12 is a flowchart illustrating an example of processing of the sound signal purification device 1202.

As illustrated in FIG. 11, a sound signal purification device 1202 of the fifth embodiment includes an inter-channel relationship information estimation unit 1232, the decoded sound common signal estimation unit 1251, the common signal purification weight estimation unit 1211, the common signal purification unit 1221, a decoded sound common signal upmixing unit 1262, a purified common signal upmixing unit 1272, a first channel separation combination weight estimation unit 1282-1, a first channel separation combination unit 1292-1, a second channel separation combination weight estimation unit 1282-2, and a second channel separation combination unit 1292-2. For the each frame, as illustrated in FIG. 12, the sound signal purification device 1202 performs steps S1232, S1251, S1211, S1221, S1262, and S1272, and steps S1282-*n* and S1292-*n* for the each channel.

[Inter-Channel Relationship Information Estimation Unit 1232]

At least the first channel decoded sound signal $\hat{X}_1$ input to the sound signal purification device 1202 and the second channel decoded sound signal $\hat{X}_2$ input to the sound signal purification device 1202 are input to the inter-channel relationship information estimation unit 1232. The inter-channel relationship information estimation unit 1232 obtains and outputs the inter-channel relationship information by using at least the first channel decoded sound signal $\hat{X}_1$ and the second channel decoded sound signal $\hat{X}_2$ (step S1232). The inter-channel relationship information is information indicating a relationship between the channels of the stereo. Examples of the inter-channel relationship information are the inter-channel time difference $\tau$, the inter-channel correlation coefficient $\gamma$, and the preceding channel information. The inter-channel relationship information estimation unit 1232 may obtain a plurality of types of the inter-channel relationship information and, for example, may obtain the inter-channel time difference $\tau$, the inter-channel correlation coefficient $\gamma$, and the preceding channel information. As a method of the inter-channel relationship information estimation unit 1232 to obtain the inter-channel time difference $\tau$ and a method thereof to obtain the inter-channel correlation coefficient $\gamma$, for example, it is only required that the methods described above in the description of the inter-channel relationship information estimation unit 1132 of the second embodiment are used. In a case where the decoded sound common signal estimation unit 1251 uses the preceding channel information, the inter-channel relationship information estimation unit 1232 obtains the preceding channel information. As a method of the inter-channel relationship information estimation unit 1232 to obtain the preceding channel information, for example, it is only required that the method described above in the description of the inter-channel relationship information estimation unit 1231 of the fourth embodiment is used. Note that the inter-channel time difference $\tau$ obtained by the method described above in the description of the inter-channel relationship information estimation unit 1132 includes the information indicating the number of samples $|\tau|$ corresponding to the time difference between the first channel and the second channel and the information indicating which channel of the first channel and the second channel is preceding, and thus, in a case where the inter-channel relationship information estimation unit 1232 also obtains and outputs the preceding channel information, information indicating the number of samples $|\tau|$ corresponding to the time difference between the first channel and the second channel may be obtained and output instead of the inter-channel time difference $\tau$.

[Decoded Sound Common Signal Estimation Unit 1251]

The decoded sound common signal estimation unit 1251 obtains and outputs the decoded sound common component signal $\hat{Y}_M$ similarly to the decoded sound common signal estimation unit 1251 of the fourth embodiment (step S1251).

[Common Signal Purification Weight Estimation Unit 1211]

The common signal purification weight estimation unit 1211 obtains and outputs the common signal purification weight $\alpha_M$ similarly to the common signal purification weight estimation unit 1211 of the fourth embodiment (step 1211).

[Common Signal Purification Unit 1221]

The common signal purification unit 1221 obtains and outputs the purified common signal $\tilde{Y}_M$ similarly to the common signal purification unit 1221 of the fourth embodiment (step S1221).

[Decoded Sound Common Signal Upmixing Unit 1262]

At least the decoded sound common signal $\hat{Y}_M=\{\hat{y}_M(1), \hat{y}_M(2), \ldots, \hat{y}_M(T)\}$ output by the decoded sound common signal estimation unit 1251 and the inter-channel relationship information output by the inter-channel relationship information estimation unit 1232 are input to the decoded sound common signal upmixing unit 1262. The decoded sound common signal upmixing unit 1262 performs the upmixing process using at least the decoded sound common signal $\hat{y}_M=\{\hat{y}_M(1), \Delta y_M(2), \ldots, \hat{y}_M(T)\}$ and the inter-channel relationship information, to thereby obtain and output an n-th channel upmixed common signal $\hat{Y}_{Mn}=\{y_{Mn}(1), \hat{Y}_{Mn}(2), \ldots, \hat{Y}_{Mn}(T)\}$ that is a signal obtained by upmixing the decoded sound common signal for the each channel (step S1262). The decoded sound common signal upmixing unit 1262 is only required to obtain the n-th channel upmixed common signal $\hat{Y}_{Mn}$ by, for example, the following first method or second method.

[[First Method for Obtaining n-th Channel Upmixed Common Signal]

The decoded sound common signal upmixing unit 1262 obtains the n-th channel upmixed common signal $\hat{Y}_{Mn}$ by performing the same processing as that of the monaural decoded sound upmixing unit 1172 of the second embodiment by replacing the monaural decoded sound signal $\hat{X}_M$ with the decoded sound common signal $\hat{Y}_M$ and replacing the n-th channel upmixed monaural decoded sound signal $\hat{X}_{Mn}$ with the n-th channel upmixed common signal $\hat{Y}_{Mn}$. That is, in a case where the first channel is preceding, the decoded sound common signal upmixing unit 1262 outputs the decoded sound common signal $\hat{Y}_M=\{\hat{y}_M(1), \hat{y}_M(2), \ldots, \hat{y}_M(T)\}$ without change as the first channel upmixed common signal $\hat{Y}_{M1}=\{\hat{y}_{M1}(1), \hat{y}_{M1}(2), \ldots, \hat{y}_{M1}(T)\}$, and outputs a signal $\{\hat{y}_M(1-|\tau|), \hat{y}_M(2-|\tau|), \ldots, \hat{y}_M(T-|\tau|)\}$ obtained by delaying the decoded sound common signal by $|\tau|$ samples as the second channel upmixed common signal $\hat{Y}_{M2}=\{\hat{y}_{M2}(1), \hat{y}_{M2}(2), \ldots, \hat{y}_{M2}(T)\}$. In a case where the second channel is preceding, the decoded sound common signal upmixing unit 1262 outputs a signal $\{\hat{y}_M(1-|\tau|), \hat{y}_M(2-|\tau|), \ldots, \hat{Y}_M(T-|\tau|)\}$ obtained by delaying the decoded sound common signal by $|\tau|$ samples as the first channel upmixed common signal $\hat{Y}_{M1}=\{\hat{y}_{M1}(1), \hat{y}_{M1}(2), \ldots, \hat{y}_{M1}(T)\}$, and outputs the decoded sound common signal $\hat{Y}_M=\{y_M(1), \hat{y}_M(2), \ldots, \hat{y}_M(T)\}$ without change as the second channel upmixed common signal $\hat{Y}_{M2}=\{y_{M2}(1), \hat{y}_{M2}(2), \ldots, \hat{y}_{M2}(T)\}$. In a case where no channel is preceding, the decoded sound common signal upmixing unit 1262 outputs the decoded sound common signal $\hat{Y}_M=\{\hat{y}_M(1), \hat{y}_M(2), \ldots, \hat{y}_M(T)\}$ without change as the first channel upmixed common signal $\hat{Y}_{M1}=\{\hat{y}_{M1}(1), \hat{y}_{M1}(2), \ldots, \hat{y}_{M1}(T)\}$ and the second channel upmixed common signal $\hat{Y}_{M2}=\{y_{M2}(1), \hat{y}_{M2}(2), \ldots, \hat{y}_{M2}(T)\}$.

[[Second Method for Obtaining n-th Channel Upmixed Common Signal]

In a case where the correlation between the channels is small, the good n-th channel upmixed common signal $\hat{Y}_{Mn}$ may not be obtained only by adding the time difference to the decoded sound common signal $\hat{Y}_M$ as in the first method. Accordingly, the second method is that the decoded sound common signal upmixing unit 1262 obtains the n-th channel upmixed common signal $\hat{Y}_{Mn}$ by taking the weighted average of the decoded sound common signal $\hat{Y}_M$ and the decoded sound signal $\hat{X}_n$ of the each channel in consideration of the correlation between the channels. In the second method, the decoded sound common signal upmixing unit 1262 uses each of the n-th channel upmixed common signals $\hat{Y}_{Mn}=\{\hat{Y}_{Mn}(1), \hat{Y}_{Mn}(2), \ldots, \hat{Y}_{Mn}(T)\}$ obtained by the first method as a temporary n-th channel upmixed common signal $Y'_{Mn}=\{y'_{Mn}(1), y'_{Mn}(2), \ldots, y'_{Mn}(T)\}$ (that is, the same processing as the first method is performed by replacing the n-th channel upmixed common signal $\hat{Y}_{Mn}$ with the temporary n-th channel upmixed common signal $Y'_{Mn}$ to obtain the temporary n-th channel upmixed common signal $Y'_{Mn}=\{y'_{Mn}(1), y'_{Mn}(2), \ldots, y'_{Mn}(T)\}$) to obtain, for each corresponding sample t, a sequence based on $\hat{y}_{Mn}(n)$ obtained by the following Expression (51) using the n-th channel decoded sound $\hat{x}_n(t)$, the temporary n-th channel upmixed common signal $y'_{Mn}(t)$, and the inter-channel correlation coefficient $\gamma$, as the n-th channel upmixed common signal $\hat{Y}_{Mn}=\{\hat{y}_{Mn}(1), \hat{y}_{Mn}(2), \ldots, \hat{y}_{Mn}(T)\}$.

[Math. 35]

$$\hat{y}_{Mn}(t)=(1-\gamma)\hat{x}_n(t)+\gamma y'_{Mn}(t) \qquad (51)$$

Note that, in a case where the decoded sound common signal upmixing unit 1262 performs the second method, the first channel decoded sound signal input to the sound signal purification device 1202 and the second channel decoded sound signal input to the sound signal purification device 1202 are also input to the decoded sound common component upmixing unit 1262 as indicated by a broken line in FIG. 11.

[Purified Common Signal Upmixing Unit 1272]

The purified common signal $\tilde{Y}_M=\{\tilde{y}_M(1), \tilde{y}_M(2), \ldots, \tilde{y}_M(T)\}$ output by the common signal purification unit 1221 and the inter-channel relationship information output by the inter-channel relationship information estimation unit 1232 are input to the purified common signal upmixing unit 1272. The purified common signal upmixing unit 1272 performs the upmixing process using the purified common signal $\tilde{Y}_M=\{\tilde{y}_M(1), \tilde{y}_M(2), \ldots, \tilde{y}_M(T)\}$ and the inter-channel relationship information, to thereby obtain and output an n-th channel upmixed purified signal $\tilde{Y}_{Mn}=\{\tilde{y}_{Mn}(1), \tilde{y}_{Mn}(2), \ldots, \tilde{y}_{Mn}(T)\}$ that is a signal obtained by upmixing the purified common signal for the each channel (step S1272). The purified common signal upmixing unit 1272 is only required to perform the same processing as that of the monaural decoded sound upmixing unit 1172 of the second embodiment by replacing the monaural decoded sound signal $\hat{X}_M$ with the purified common signal $\tilde{Y}_M$ and replacing the n-th channel upmixed monaural decoded sound signal $\hat{X}_{Mn}$ with the n-th channel upmixed purified signal $\tilde{Y}_{Mn}$.

[n-th Channel Separation Combination Weight Estimation Unit 1282-*n*]

The n-th channel decoded sound signal $\hat{X}_n=\{\hat{x}_n(1), \hat{x}_n(2), \ldots, \hat{x}_n(T)\}$ input to the sound signal purification device 1202 and the n-th channel upmixed common signal $\hat{Y}_{Mn}=\{\hat{y}_{Mn}(1), \hat{y}_{Mn}(2), \ldots, \hat{Y}_{Mn}(T)\}$ output by the decoded sound common signal upmixing unit 1262 are input to the n-th channel separation combination weight estimation unit 1282-*n*. The n-th channel separation combination weight estimation unit 1282-*n* obtains and outputs a normalized inner product value for the n-th channel upmixed common signal $\hat{Y}_{Mn}$ of the n-th channel decoded sound signal $\hat{X}_n$ from the n-th channel decoded sound signal $\hat{X}_n$ and the n-th channel upmixed common signal $\hat{Y}_{Mn}$, as the n-th channel separation combination weight $\beta_n$ (step S1282-*n*). Specifically, the n-th channel separation combination weight $\beta_n$ is as represented by Expression (52).

[Math. 36]

$$\beta_n = \frac{\sum_{t=1}^{T} \hat{x}_n(t)\hat{y}_{Mn}(t)}{\sum_{t=1}^{T} \hat{y}_{Mn}(t)\hat{y}_{Mn}(t)} \qquad (52)$$

[n-th Channel Separation Combination Unit 1292-*n*]

The n-th channel decoded sound signal $\hat{X}_n=\{\hat{x}_n(1), \hat{x}_n(2), \ldots, \hat{x}_n(T)\}$ input to the sound signal purification device 1202, the n-th channel upmixed common signal $\hat{Y}_{Mn}=\{y_{Mn}(1), \hat{Y}_{Mn}(2), \ldots, \hat{Y}_{Mn}(T)\}$ output by the decoded sound common signal upmixing unit 1262, the n-th channel upmixed purified signal $\tilde{Y}_{Mn}=\{\tilde{y}_{Mn}(1), \tilde{y}_{Mn}(2), \ldots, \tilde{y}_{Mn}(T)\}$ output by the purified common signal upmixing unit 1272, and the n-th channel separation combination weight $\beta_n$ output by the n-th channel separation combination weight estimation unit 1282-*n* are input to the n-th channel separation combination unit 1292-*n*. For each corresponding sample t, the n-th channel separation combination unit 1292-*n* obtains and outputs a sequence based on a value $\tilde{x}_n(t)$ obtained by subtracting a value $\beta_n \times \hat{y}_{Mn}(t)$ obtained by multiplying the n-th channel separation combination weight $\beta_n$ by a sample value $\hat{y}_{Mn}(t)$ of the n-th channel upmixed common signal $\hat{Y}_{Mn}$ from the sample value $\hat{x}_n(t)$ of the n-th channel decoded sound signal $\hat{X}_n$, and adding a value $\beta_n \times \tilde{y}_{Mn}(t)$ obtained by multiplying the n-th channel separation combination weight $\beta_n$ by a sample value $\tilde{y}_{Mn}(t)$ of the n-th channel upmixed purified signal $\tilde{Y}_{Mn}$, as the n-th channel purified decoded sound signal $\tilde{X}_n=\{\tilde{x}_n(1), \tilde{x}_n(2), \ldots, \tilde{x}_n(T)\}$ (step S1292-*n*). That is, $\tilde{x}_n(t)=\hat{x}_n(t)-\beta_n \times \hat{y}_{Mn}(t)+\beta_n \times \tilde{y}_{Mn}(t)$.

Sixth Embodiment

Similarly to the sound signal purification devices of the fourth embodiment and the fifth embodiment, a sound signal purification device of a sixth embodiment also improves the decoded sound signal of the each channel of the stereo by using a monaural decoded sound signal obtained from a code different from the code from which the decoded sound signal is obtained. The sound signal purification device of the sixth embodiment is different from the sound signal purification device of the fifth embodiment in that the inter-channel relationship information is obtained not from a decoded sound signal but from a code. Hereinafter, regarding the sound signal purification device of the sixth embodiment, differences from the sound signal purification device of the fifth embodiment will be described using an example in a case where the number of channels of the stereo is two.

<<Sound Signal Purification Device 1203>>

Figure 13:
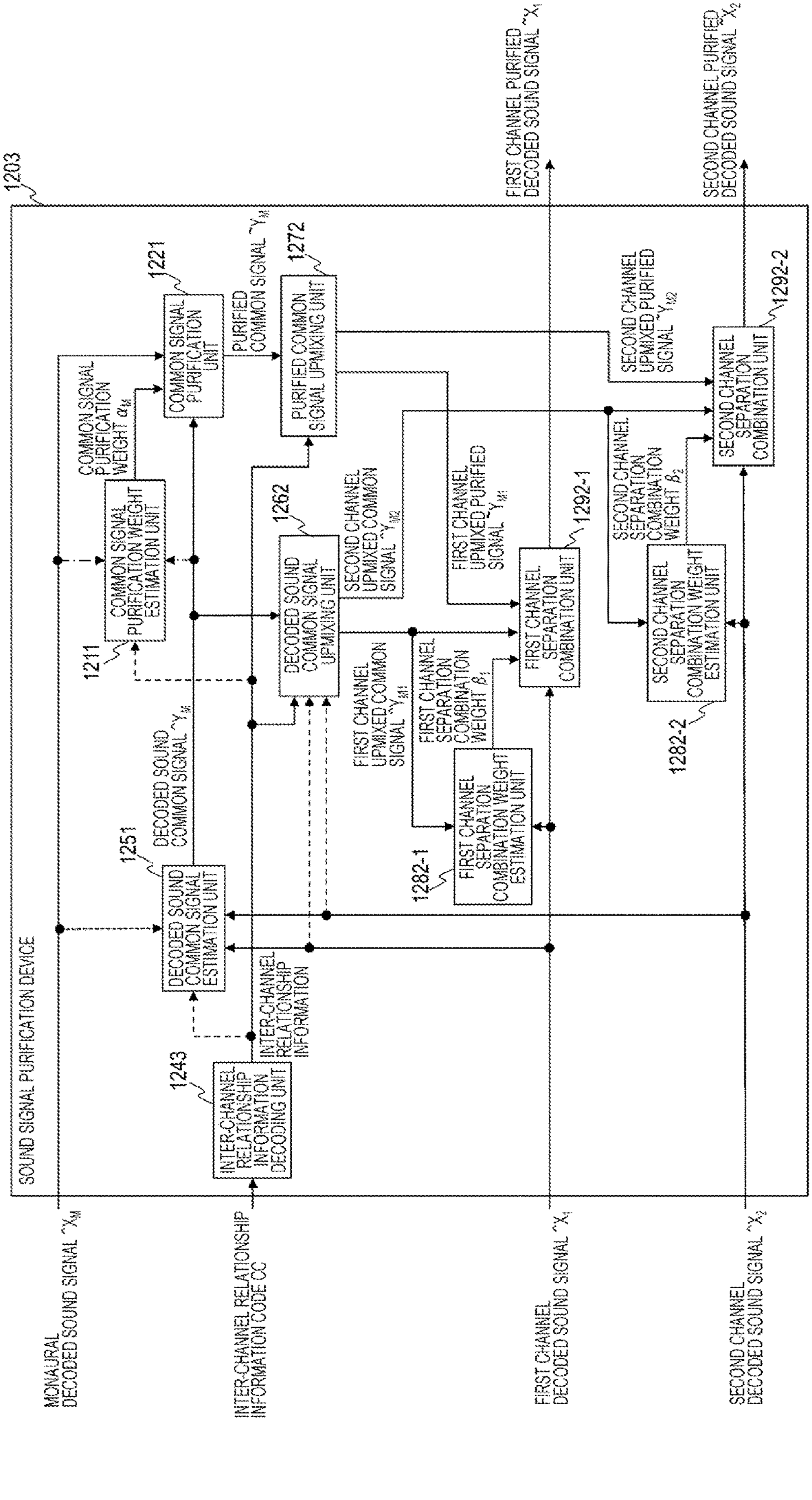
FIG. 13 is a block diagram illustrating an example of a sound signal purification device 1203.
Figure 14:
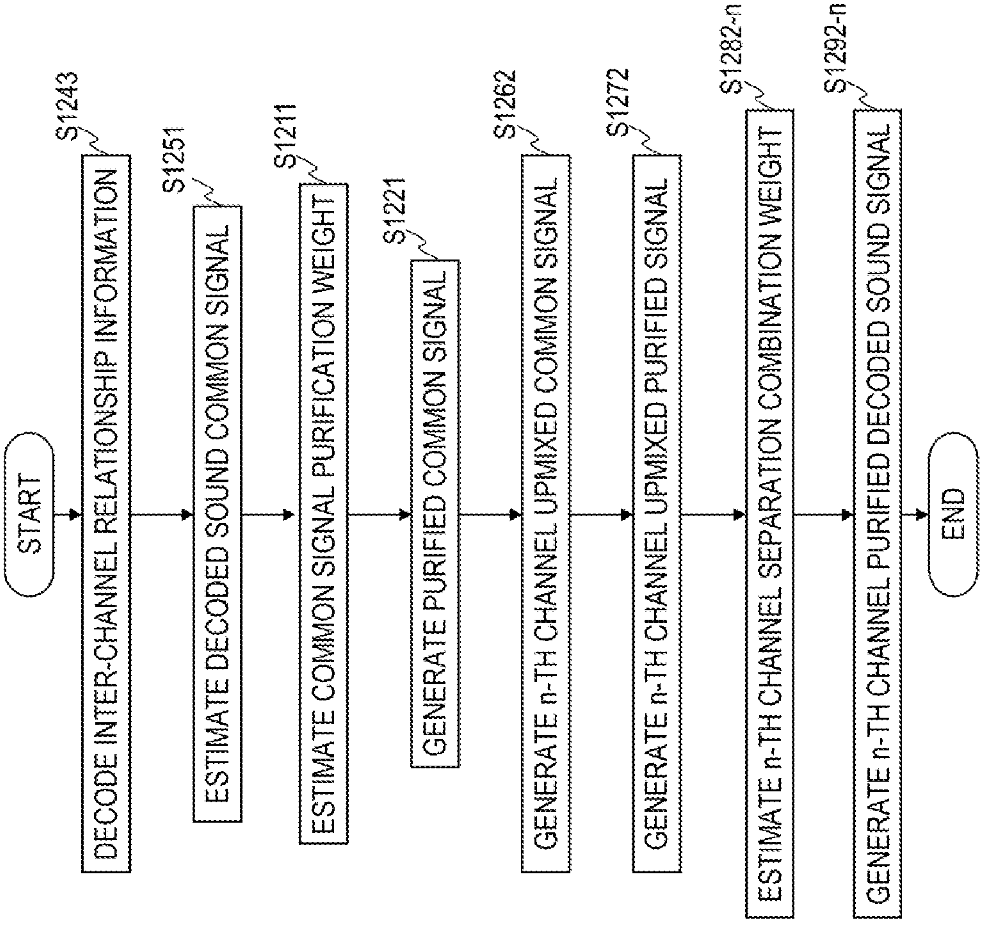
FIG. 14 is a flowchart illustrating an example of processing of the sound signal purification device 1203.

As illustrated in FIG. 13, the sound signal purification device 1203 of the sixth embodiment includes an inter-channel relationship information decoding unit 1243, the decoded sound common signal estimation unit 1251, the common signal purification weight estimation unit 1211, the common signal purification unit 1221, the decoded sound common signal upmixing unit 1262, the purified common signal upmixing unit 1272, the first channel separation combination weight estimation unit 1282-1, the first channel separation combination unit 1292-1, the second channel separation combination weight estimation unit 1282-2, and the second channel separation combination unit 1292-2. For the each frame, as illustrated in FIG. 14, the sound signal purification device 1203 performs steps S1243, S1251, S1211, S1221, S1262, and S1272, and steps S1282-*n* and S1292-*n* for the each channel. The sound signal purification device 1203 of the sixth embodiment is different from the sound signal purification device 1202 of the fifth embodiment in that the inter-channel relationship information decoding unit 1243 is provided instead of the inter-channel relationship information estimation unit 1232, and step S1243 is performed instead of step S1232. Further, the inter-channel relationship information code CC of the each frame is also input to the sound signal purification device 1203 of the sixth embodiment. The inter-channel relationship information code CC may be a code obtained and output by the inter-channel relationship information encoding unit, which is not illustrated, included in the above-described encoding device 500, or may be a code included in the stereo code CS obtained and output by the stereo encoding unit 530 of the above-described encoding device 500. Hereinafter, differences between the sound signal purification device 1203 of the sixth embodiment and the sound signal purification device 1202 of the fifth embodiment will be described.

[Inter-Channel Relationship Information Decoding Unit 1243]

The inter-channel relationship information code CC input to the sound signal purification device 1203 is input to the inter-channel relationship information decoding unit 1243. The inter-channel relationship information decoding unit 1243 decodes the inter-channel relationship information code CC to obtain and output the inter-channel relationship information (step S1243). The inter-channel relationship information obtained by the inter-channel relationship information decoding unit 1243 is the same as the inter-channel relationship information obtained by the inter-channel relationship information estimation unit 1232 of the fifth embodiment.

Modification Example of Sixth Embodiment

In a case where the inter-channel relationship information code CC is a code included in the stereo code CS, the same inter-channel relationship information obtained in step S1243 is obtained by decoding in the stereo decoding unit 620 of the decoding device 600. Therefore, in a case where the inter-channel relationship information code CC is a code included in the stereo code CS, the inter-channel relationship information obtained by the stereo decoding unit 620 of the decoding device 600 may be input to the sound signal purification device 1203 of the sixth embodiment, and the sound signal purification device 1203 of the sixth embodiment may not include the inter-channel relationship information decoding unit 1243 and may not perform step S1243.

Further, in a case where only a part of the inter-channel relationship information code CC is a code included in the stereo code CS, it is only required that the inter-channel relationship information obtained by decoding the code included in the stereo code CS in the inter-channel relationship information code CC by the stereo decoding unit 620 of the decoding device 600 is input to the sound signal purification device 1203 of the sixth embodiment, and that the inter-channel relationship information decoding unit 1243 of the sound signal purification device 1203 of the sixth embodiment decodes, as step S1243, a code not included in the stereo code CS in the inter-channel relationship information code CC to obtain and output the inter-channel relationship information that has not been input to the sound signal purification device 1203.

In addition, in a case where the code corresponding to a part of the inter-channel relationship information used by each unit of the sound signal purification device 1203 is not included in the inter-channel relationship information code CC, the sound signal purification device 1203 of the sixth embodiment is only required to also include the inter-channel relationship information estimation unit 1232, so that the inter-channel relationship information estimation unit 1232 also performs step S1232. In this case, the inter-channel relationship information estimation unit 1232 is only required to obtain and output the inter-channel relationship information that cannot be obtained by decoding the inter-channel relationship information code CC in the inter-channel relationship information used by respective units of the sound signal purification device 1203, similarly to step S1232 of the fifth embodiment.

Seventh Embodiment

Similarly to the sound signal purification devices of the first to sixth embodiments, a sound signal purification device of a seventh embodiment also improves the decoded sound signal of the each channel of the stereo by using a monaural decoded sound signal obtained from a code different from the code from which the decoded sound signal is obtained. Hereinafter, the sound signal purification device of the seventh embodiment will be described with reference to the sound signal purification devices of the above-described embodiments as appropriate using an example in a case where the number of channels of the stereo is two.

Figure 15:
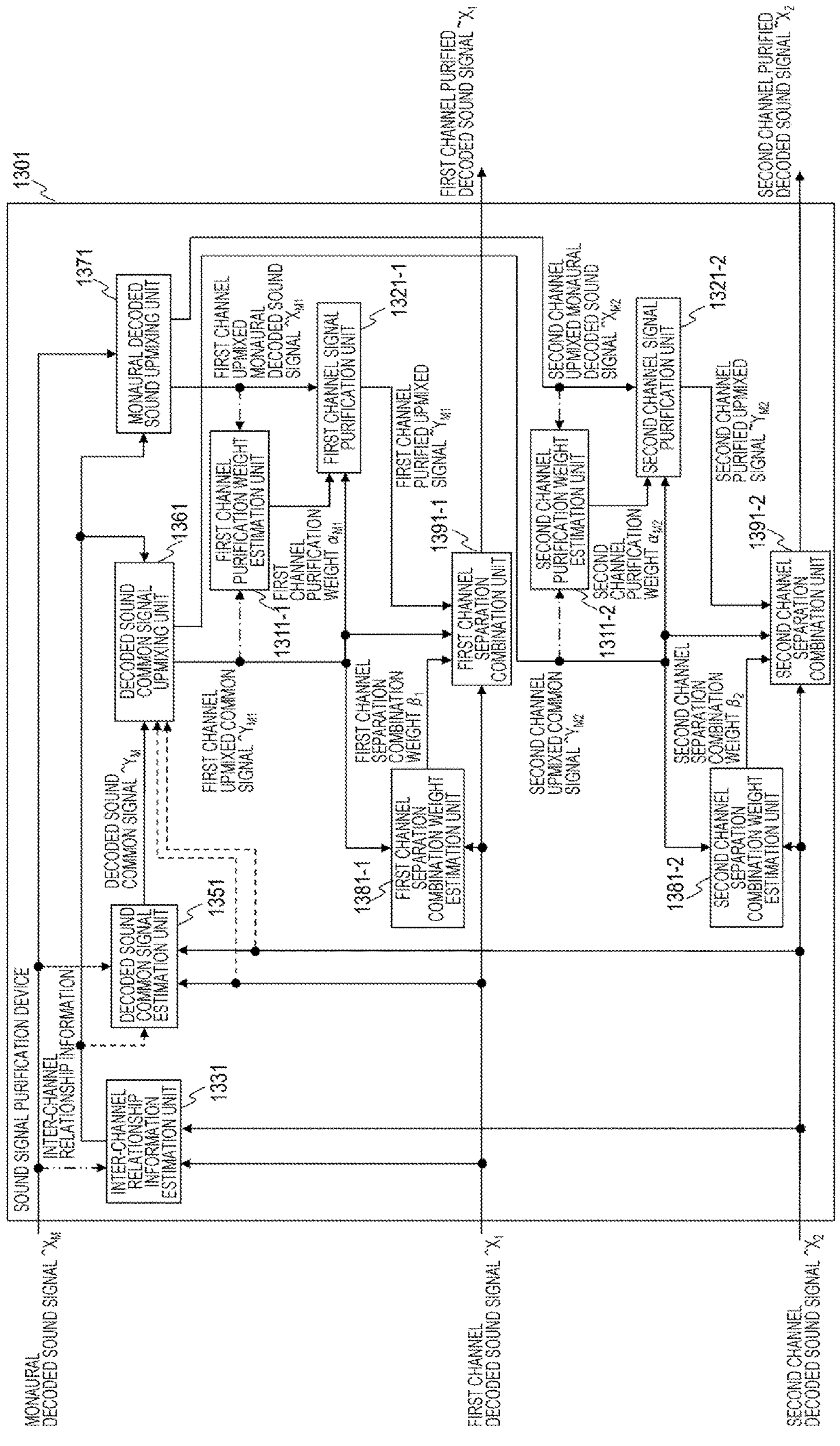
FIG. 15 is a block diagram illustrating an example of a sound signal purification device 1301.
Figure 16:
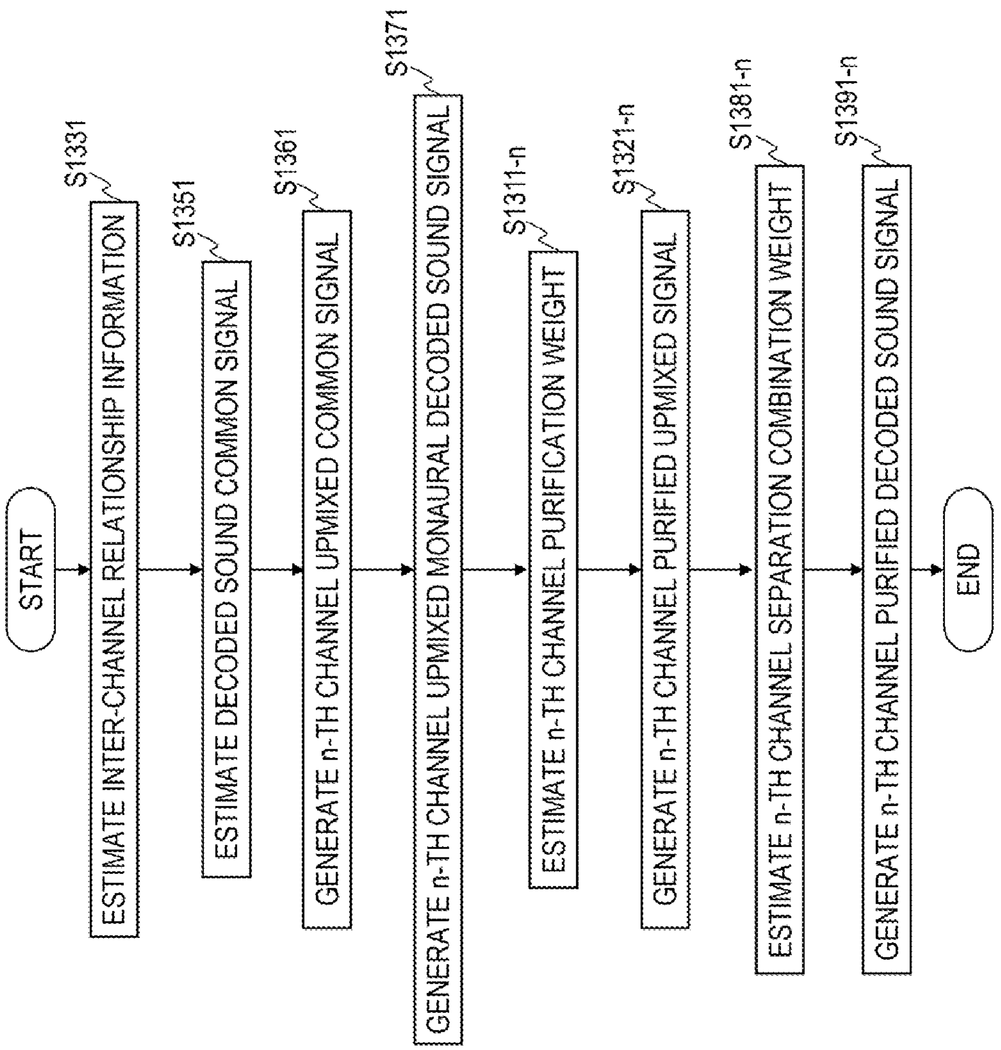
FIG. 16 is a flowchart illustrating an example of processing of the sound signal purification device 1301.

As illustrated in FIG. 15, the sound signal purification device 1301 of the seventh embodiment includes an inter-channel relationship information estimation unit 1331, a decoded sound common signal estimation unit 1351, a decoded sound common signal upmixing unit 1361, a monaural decoded sound upmixing unit 1371, a first channel purification weight estimation unit 1311-1, a first channel signal purification unit 1321-1, a first channel separation combination weight estimation unit 1381-1, a first channel separation combination unit 1391-1, a second channel purification weight estimation unit 1311-2, a second channel signal purification unit 1321-2, a second channel separation combination weight estimation unit 1381-2, and a second channel separation combination unit 1391-2. The sound signal purification device 1301 obtains a purified upmixed signal, which is a sound signal obtained by improving an upmixed common signal, from the upmixed common signal that is a signal obtained by upmixing the decoded sound common signal that is a signal common to all channels of the decoded sound of stereo and an upmixed monaural decoded sound signal obtained by upmixing the monaural decoded sound signal for the each channel of the stereo, for example, in units of frames having a predetermined time length of 20 ms, to obtain and output a purified decoded sound signal, which is a sound signal obtained by improving the decoded sound signal from the decoded sound signal, the upmixed common signal, and the purified upmixed signal. The decoded sound signals of the respective channels input in units of frames to the sound signal purification device 1301 are, for example, the first channel decoded sound signal $\hat{}X_1=\{\hat{}x_1(1), \hat{}x_1(2), \ldots, \hat{}x_1(T)\}$ of the T samples and the second channel decoded sound signal $\hat{}X_2=\{\hat{}x_2(1), \hat{}x_2(2), \ldots, \hat{}x_2(T)\}$ of the T samples obtained by the stereo decoding unit 620 of the decoding device 600 described above decoding the $b_s$-bit stereo code CS that is a code different from the monaural code CM without using the information obtained by decoding the monaural code CM or the monaural code CM. The monaural decoded sound signal input in units of frames to the sound signal purification device 1301 is, for example, the monaural decoded sound signal $\hat{}X_M=\{\hat{}x_M(1), x_M(2), \ldots, \hat{}x_M(T)\}$ of the T samples obtained by the monaural decoding unit 610 of the decoding device 600 described above decoding the $b_M$-bit monaural code CM that is a code different from the stereo code CS without using the information obtained by decoding the stereo code CS or the stereo code CS. The monaural code CM is a code derived from the same sound signal as the sound signal from which the stereo code CS is derived (that is, the first channel input sound signal $X_1$ and the second channel input sound signal $X_2$ input to the encoding device 500), but is a code different from the code from which the first channel decoded sound signal $\hat{}X_1$ and the second channel decoded sound signal $\hat{}X_2$ are obtained (that is, the stereo code CS). Assuming that the channel number n of the first channel is 1 and the channel number n of the second channel is 2, the sound signal purification device 1301 performs steps S1331, S1351, S1361, and S1371, and steps S1311-*n*, S1321-*n*, S1381-*n*, and S1391-*n* for the each channel as illustrated in FIG. 16 for the each frame.

[Inter-Channel Relationship Information Estimation Unit 1331]

At least the first channel decoded sound signal $\hat{}X_1$ input to the sound signal purification device 1301 and the second channel decoded sound signal $\hat{}X_2$ input to the sound signal purification device 1301 are input to the inter-channel relationship information estimation unit 1331. The inter-channel relationship information estimation unit 1331 obtains and outputs the inter-channel relationship information by using at least the first channel decoded sound signal $\hat{}X_1$ and the second channel decoded sound signal $\hat{}X_2$ (step S1331). The inter-channel relationship information is information indicating a relationship between the channels of the stereo. Examples of the inter-channel relationship information are the inter-channel time difference $\tau$, the inter-channel correlation coefficient $\gamma$, and the preceding channel information. The inter-channel relationship information estimation unit 1331 may obtain a plurality of types of the inter-channel relationship information and, for example, may obtain the inter-channel time difference $\tau$, the inter-channel correlation coefficient $\gamma$, and the preceding channel information. As a method of the inter-channel relationship information estimation unit 1331 to obtain the inter-channel time difference $\tau$ and a method thereof to obtain the inter-channel correlation coefficient $\gamma$, for example, it is only required that the methods described above in the description of the inter-channel relationship information estimation unit 1132 of the second embodiment are used. In a case where the decoded sound common signal estimation unit 1351 uses the preceding channel information, the inter-channel relationship information estimation unit 1331 obtains the preceding channel information. As a method of the inter-channel relationship information estimation unit 1331 to obtain the preceding channel information, for example, it is only required that the method described above in the description of the inter-channel relationship information estimation unit 1231 of the fourth embodiment is used. Note that the inter-channel time difference $\tau$ obtained by the method described above in the description of the inter-channel relationship information estimation unit 1132 includes the information indicating the number of samples $|\tau|$ corresponding to the time difference between the first channel and the second channel and the information indicating which channel of the first channel and the second channel is preceding, and thus, in a case where the inter-channel relationship information estimation unit 1331 also obtains and outputs the preceding channel information, information indicating the number of samples $|\tau|$ corresponding to the time difference between the first channel and the second channel may be obtained and output instead of the inter-channel time difference $\tau$.

[Decoded Sound Common Signal Estimation Unit 1351]

At least the first channel decoded sound signal $\hat{}X_1=\{x_1(1), \hat{}x_1(2), \ldots, \hat{}x_1(T)\}$ and the second channel decoded sound signal $\hat{}X_2=\{x_2(1), \hat{}x_2(2), \ldots, \hat{}x_2(T)\}$ input to the sound signal purification device 1301 are input to the decoded sound common signal estimation unit 1351. The decoded sound common signal estimation unit 1351 obtains and outputs the decoded sound common signal $\hat{}Y_M=\{\hat{}y_M(1), \hat{}y_M(2), \ldots, \hat{}y_M(T)\}$ by using at least the first channel decoded sound signal $\hat{}X_1$ and the second channel decoded sound signal $\hat{}X_2$ (step S1351). As a method of the decoded sound common signal estimation unit 1351 to obtain the decoded sound common signal $\hat{}Y_M$, for example, it is only required that the method described above in the description of the decoded sound common signal estimation unit 1251 of the fourth embodiment is used.

[Decoded Sound Common Signal Upmixing Unit 1361]

At least the decoded sound common component signal $\hat{}Y_M=\{\hat{}y_M(1), \hat{}y_M(2), \ldots, \hat{}y_M(T)\}$ output by the decoded sound common signal estimation unit 1351 and the inter-channel relationship information output by the inter-channel relationship information estimation unit 1331 are input to the decoded sound common signal upmixing unit 1361. The decoded sound common signal upmixing unit 1361 performs the upmixing process using at least the decoded sound common signal $\hat{}Y_M=\{\hat{}y_M(1), \hat{}y_M(2), \ldots, \hat{}y_M(T)\}$ and the inter-channel relationship information, to thereby obtain and output an n-th channel upmixed common signal $\hat{}Y_{Mn}=\{\hat{}y_{Mn}(1), \hat{}y_{Mn}(2), \ldots, \hat{}y_{Mn}(T)\}$ that is a signal obtained by upmixing the decoded sound common signal for the each channel (step S1361). The decoded sound common signal upmixing unit 1361 is only required to perform the same processing as the decoded sound common signal upmixing unit 1262 of the fifth embodiment. That is, it is only required to perform, for example, the first method or the second method described above in the description of the decoded sound common signal upmixing unit 1262 of the fifth embodiment. Note that, in a case where the decoded sound common signal upmixing unit 1262 performs the second method, the first channel decoded sound signal input to the sound signal purification device 1301 and the second channel decoded sound signal input to the sound signal purification device 1301 are also input to the decoded sound common signal upmixing unit 1361 as indicated by broken lines in FIG. 15.

[Monaural Decoded Sound Upmixing Unit 1371]

The monaural decoded sound signal $\hat{X}_M=\{x_M(1), \hat{x}_M(2), \ldots, \hat{x}_M(T)\}$ input to the sound signal purification device 1301 and the inter-channel relationship information output by the inter-channel relationship information estimation unit 1331 are input to the monaural decoded sound upmixing unit 1371. The monaural decoded sound upmixing unit 1371 performs the upmixing process using the monaural decoded sound signal $\hat{X}_M=\{\hat{x}_M(1), \hat{x}_M(2), \ldots, \hat{x}_M(T)\}$ and the inter-channel relationship information, to thereby obtain and output the n-th channel upmixed monaural decoded sound signal $\hat{X}_{Mn}=\{\hat{x}_{Mn}(1), \hat{x}_{Mn}(2), \ldots, \hat{x}_{Mn}(T)\}$ that is a signal obtained by upmixing the monaural decoded sound signal for the each channel (step S1371). The monaural decoded sound upmixing unit 1371 is only required to perform the same processing as the monaural decoded sound upmixing unit 1172 of the second embodiment.

[n-th Channel Purification Weight Estimation Unit 1311-*n*]

The n-th channel purification weight estimation unit 1311-*n* obtains and outputs the n-th channel purification weight $\alpha_{Mn}$ (step 1311-*n*). The n-th channel purification weight estimation unit 1311-*n* obtains the n-th channel purification weight $\alpha_{Mn}$ by a method similar to the method based on the principle of minimizing the quantization error described in the first embodiment. The n-th channel purification weight $\alpha_{Mn}$ obtained by the n-th channel purification weight estimation unit 1311-*n* is a value of 0 or more and 1 or less. However, since the n-th channel purification weight estimation unit 1311-*n* obtains the n-th channel purification weight $\alpha_{Mn}$ for the each frame by the method to be described later, the n-th channel purification weight $\alpha_{Mn}$ does not become zero or one in all the frames. That is, there is a frame in which the n-th channel purification weight $\alpha_{Mn}$ is a value larger than 0 and smaller than 1. In other words, in at least any one of all the frames, the n-th channel purification weight $\alpha_{Mn}$ is a value larger than 0 and smaller than 1.

Specifically, as in the following first to seventh examples, the n-th channel purification weight estimation unit 1311-*n* obtains the n-th channel purification weight $\alpha_{Mn}$ by using the n-th channel upmixed common signal $\hat{Y}_{Mn}$ instead of the n-th channel decoded sound signal $\hat{X}_n$ at a position where the n-th channel decoded sound signal $\hat{X}_n$ is used in the method based on the principle of minimizing the quantization error described in the first embodiment, by using the n-th channel upmixed monaural decoded sound signal $\hat{X}_{Mn}$ instead of the monaural decoded sound signal $\hat{X}_M$ at a position where the monaural decoded sound signal $\hat{X}_M$ is used in the method based on the principle of minimizing the quantization error described in the first embodiment, and by using the number of bits $b_m$ corresponding to the common signal in the number of bits of the stereo code CS instead of the number of bits $b_n$ at a position where the number of bits $b_n$ corresponding to the n-th channel in the number of bits of the stereo code CS is used in the method based on the principle of minimizing the quantization error described in the first embodiment. That is, in the following first to seventh examples, the number of bits $b_M$ of the monaural code CM and the number of bits $b_m$ corresponding to the common signal in the number of bits of the stereo code CS are used. A method for specifying the number of bits $b_M$ of the monaural code CM is the same as that in the first embodiment, and a method for specifying the number of bits $b_m$ corresponding to the common signal in the number of bits of the stereo code CS is the same as that in the fourth embodiment. The n-th channel upmixed common signal $\hat{Y}_{Mn}=\{\hat{y}_{Mn}(1), \hat{y}_{Mn}(2), \ldots, \hat{y}_{Mn}(T)\}$ output by the decoded sound common signal upmixing unit 1361 and the n-th channel upmixed monaural decoded sound signal $\hat{X}_{Mn}=\{\hat{x}_{Mn}(1), \hat{x}_{Mn}(2), \ldots, \hat{x}_{Mn}(T)\}$ output by the monaural decoded sound upmixing unit 1371 are input to the n-th channel purification weight estimation unit 1311-*n* as necessary as indicated by one-dot chain lines in FIG. 15.

First Example

The n-th channel purification weight estimation unit 1311-*n* of the first example obtains the n-th channel purification weight $\alpha_{Mn}$ by the following Expression (7-5) using the number of samples T per frame, the number of bits $b_m$ corresponding to the common signal in the number of bits of the stereo code CS, and the number of bits $b_M$ of the monaural code CM.

[Math. 37]

$$\alpha_{Mn} = \frac{2^{-\frac{2b_m}{T}}}{2^{-\frac{2b_m}{T}} + 2^{-\frac{2b_M}{T}}} \tag{7-5}$$

Note that, since the n-th channel purification weight $\alpha_{Mn}$ obtained in the first example has the same value in all the channels, the sound signal purification device 1301 may include the purification weight estimation unit 1311 common to all the channels instead of the n-th channel purification weight estimation unit 1311-*n* of the each channel, and the purification weight estimation unit 1311 may obtain the n-th channel purification weight $\alpha_{Mn}$ common to all the channels by Expression (7-5).

Second Example

The n-th channel purification weight estimation unit 1311-*n* of the second example uses at least the number of bits $b_m$ corresponding to the common signal in the number of bits of the stereo code CS and the number of bits $b_M$ of the monaural code CM to obtain a value that is larger than 0 and smaller than 1, 0.5 when $b_m$ and $b_M$ are equal, closer to 0 than 0.5 as $b_m$ is larger than $b_M$, and closer to 1 than 0.5 as $b_M$ is larger than $b_m$ as the n-th channel purification weight $\alpha_{Mn}$. Note that, since the n-th channel purification weight $\alpha_{Mn}$ obtained in the second example may have the same value in all the channels, the sound signal purification device 1301 may include the purification weight estimation unit 1311 common to all the channels instead of the n-th channel purification weight estimation unit 1311-*n* of the each channel, and the purification weight estimation unit 1311 may obtain the n-th channel purification weight $\alpha_{Mn}$ common to all the channels satisfying the above-described conditions.

Third Example

The n-th channel purification weight estimation unit 1311-*n* of the third example obtains the value $c_n \times r_n$ obtained by multiplying the correction coefficient $c_n$ obtained by

[Math. 38]

$$c_n = \frac{2^{-\frac{2b_m}{T}}}{2^{-\frac{2b_m}{T}} + 2^{-\frac{2b_M}{T}}} \tag{7-8}$$

using the number of samples T per frame, the number of bits $b_m$ corresponding to the common signal in the number of bits of the stereo code CS, and the number of bits $b_M$ of the monaural code CM by the normalized inner product value $r_n$ for the n-th channel upmixed monaural decoded sound signal $\hat{X}_{Mn}$ of the n-th channel upmixed common signal $\hat{Y}_{Mn}$, as the n-th channel purification weight $\alpha_{Mn}$.

The n-th channel purification weight estimation unit 1311-*n* of the third example obtains the n-th channel purification weight $\alpha_{Mn}$ by performing, for example, the following steps S1311-31-*n* to S1311-33-*n*. The n-th channel purification weight estimation unit 1311-*n* first obtains a normalized inner product value $r_n$ for the n-th channel upmixed monaural decoded sound signal $\hat{X}_{Mn}$ of the n-th channel upmixed common signal $\hat{Y}_{Mn}$ by the following Expression (7-6) from the n-th channel upmixed common signal $\hat{Y}_{Mn}=\{\hat{y}_{Mn}(1), \hat{Y}_{Mn}(2), \ldots, \hat{y}_{Mn}(T)\}$ and the n-th channel upmixed monaural decoded sound signal $\hat{X}_{Mn}=\{\hat{x}_{Mn}(1), \hat{x}_{Mn}(2), \ldots, \hat{x}_{Mn}(T)\}$ (step S1311-31-*n*).

[Math. 39]

$$r_n = \frac{\sum_{t=1}^{T} \hat{y}_{Mn}(t)\hat{x}_{Mn}(t)}{\sum_{t=1}^{T} \hat{x}_{Mn}(t)\hat{x}_{Mn}(t)} \tag{7-6}$$

The n-th channel purification weight estimation unit 1311-*n* also obtains the correction coefficient $c_n$ by Expression (7-8) using the number of samples T per frame, the number of bits $b_m$ corresponding to the common signal in the number of bits of the stereo code CS, and the number of bits $b_M$ of the monaural code CM (step S1311-32-*n*). Next, the n-th channel purification weight estimation unit 1311-*n* obtains a value $c_n \times r_n$ obtained by multiplying the normalized inner product value $r_n$ obtained in step S1311-31-*n* by the correction coefficient $c_n$ obtained in step S1311-32-*n* as the n-th channel purification weight $\alpha_{Mn}$ (step S1311-33-*n*).

Fourth Example

The n-th channel purification weight estimation unit 1311-*n* of the fourth example uses the number of bits corresponding to the common signal in the number of bits of the stereo code CS as $b_m$ and the number of bits of the monaural code CM as $b_M$ to obtain a value $c_n \times r_n$ obtained by multiplying $r_n$ that is a value of 0 or more and 1 or less, closer to 1 as the correlation between the n-th channel upmixed common signal $\hat{Y}_{Mn}$ and the n-th channel upmixed monaural decoded sound signal $\hat{X}_{Mn}$ is higher, and closer to 0 as the correlation is lower by the correction coefficient $c_n$ that is a value larger than 0 and smaller than 1, 0.5 when $b_m$ and $b_M$ are equal, closer to 0 than 0.5 as $b_m$ is larger than $b_M$, and closer to 1 than 0.5 as $b_m$ is smaller than $b_M$, as the n-th channel purification weight $\alpha_{Mn}$.

Fifth Example

The n-th channel purification weight estimation unit 1311-*n* of the fifth example obtains the n-th channel purification weight $\alpha_{Mn}$ by performing the following steps S1311-51-*n* to S1311-55-*n*.

The n-th channel purification weight estimation unit 1311-*n* first obtains the inner product value $E_n(0)$ to be used in the current frame by the following Expression (7-9) using the n-th channel upmixed common signal $\hat{Y}_{Mn}=\{\hat{y}_{Mn}(1), \hat{y}_{Mn}(2), \ldots, \hat{y}_{Mn}(T)\}$, the n-th channel upmixed monaural decoded sound signal $\hat{X}_{Mn}=\{\hat{x}_{Mn}(1), \hat{x}_{Mn}(2), \ldots, x_{Mn}(T)\}$, and the inner product value $E_n(-1)$ that has been used in the previous frame (step S1311-51-*n*).

[Math. 40]

$$E_n(0) = \epsilon_n E_n(-1) + \frac{(1-\epsilon_n)}{T}\sum_{t=1}^{T} \hat{y}_{Mn}(t)\hat{x}_{Mn}(t) \tag{7-9}$$

Here, $\varepsilon_n$ is a predetermined value larger than 0 and smaller than 1, and is stored in advance in the n-th channel purification weight estimation unit 1311-*n*. Note that the n-th channel purification weight estimation unit 1311-*n* stores the obtained inner product value $E_n(0)$ in the n-th channel purification weight estimation unit 1311-*n* in order to use this inner product value $E_n(0)$ as the "inner product value $E_n(-1)$ that has been used in the previous frame" in the next frame.

The n-th channel purification weight estimation unit 1311-*n* also obtains the energy $E_{Mn}(0)$ of the n-th channel upmixed monaural decoded sound signal to be used in the current frame by the following Expression (7-10) using the n-th channel upmixed monaural decoded sound signal $\hat{X}_{Mn}=\{\hat{x}_{Mn}(1), \hat{x}_{Mn}(2), \ldots, \hat{x}_{Mn}(T)\}$ and the energy $E_{Mn}(-1)$ of the n-th channel upmixed monaural decoded sound signal that has been used in the previous frame (step S1311-52-*n*).

[Math. 41]

$$E_{Mn}(0) = \epsilon_{Mn} E_{Mn}(-1) + \frac{(1-\epsilon_{Mn})}{T}\sum_{t=1}^{T} \hat{x}_{Mn}(t)\hat{x}_{Mn}(t) \tag{7-10}$$

Here, $\varepsilon_{Mn}$ is a predetermined value larger than 0 and smaller than 1, and is stored in advance in the n-th channel purification weight estimation unit 1311-*n*. Note that the n-th channel purification weight estimation unit 1311-*n* stores the energy $E_{Mn}(0)$ of the obtained n-th channel upmixed monaural decoded sound signal in the n-th channel purification weight estimation unit 1311-*n* in order to use this energy $E_{Mn}(0)$ as the "energy $E_{Mn}(-1)$ of the n-th channel upmixed monaural decoded sound signal that has been used in the previous frame" in the next frame.

Next, the n-th channel purification weight estimation unit 1311-*n* obtains the normalized inner product value $r_n$ by the following Expression (7-11) using the inner product value $E_n(0)$ to be used in the current frame obtained in step S1311-51-*n* and the energy $E_{Mn}(0)$ of the n-th channel upmixed monaural decoded sound signal used in the current frame obtained in step S1311-52-*n* (step S1311-53-*n*).

[Math. 42]

$$r_n = E_n(0)/E_{Mn}(0) \tag{7-11}$$

The n-th channel purification weight estimation unit 1311-*n* also obtains the correction coefficient $c_n$ by Expression (7-8) (step S1311-54-*n*). Next, the n-th channel purification weight estimation unit 1311-*n* obtains the value $c_n \times r_n$ obtained by multiplying the normalized inner product value $r_n$ obtained in step S1311-53-*n* and the correction coefficient $c_n$ obtained in step S1311-54-*n* as the n-th channel purification weight $\alpha_{Mn}$ (step S1311-55-*n*).

That is, the n-th channel purification weight estimation unit 1311-*n* of the fifth example obtains the value $c_n \times r_n$ obtained by multiplying the normalized inner product value $r_n$ obtained by Expression (7-11) using the inner product value $E_n(0)$ obtained by Expression (7-9) using each sample value $\hat{y}_{Mn}(t)$ of the n-th channel upmixed common signal $\hat{Y}_{Mn}$, each sample value $\hat{x}_{Mn}(t)$ of the n-th channel upmixed monaural decoded sound signal $\hat{X}_{Mn}$, and an inner product value $E_n(-1)$ of the previous frame, and the energy $E_{Mn}(0)$ of the n-th channel upmixed monaural decoded sound signal obtained by Expression (7-10) using each sample value $\hat{x}_{Mn}(t)$ of the n-th channel upmixed monaural decoded sound signal $\hat{X}_{Mn}$ and energy $E_{Mn}(-1)$ of the n-th channel upmixed monaural decoded sound signal of the previous frame, by the correction coefficient $c_n$ obtained by Expression (7-8) using the number of samples T per frame, the number of bits $b_m$ corresponding to the common signal in the number of bits of the stereo code CS, and the number of bits $b_M$ of the monaural code CM, as the n-th channel purification weight $\alpha_{Mn}$.

Sixth Example

The n-th channel purification weight estimation unit 1311-*n* of the sixth example obtains a value $\lambda \times c_n \times r_n$ obtained by multiplying the normalized inner product value $r_n$ and the correction coefficient $c_n$ described in the third example or the normalized inner product value $r_n$ and the correction coefficient $c_n$ described in the fifth example by $\lambda$ that is a predetermined value larger than 0 and smaller than 1, as the n-th channel purification weight $\alpha_{Mn}$.

Seventh Example

The n-th channel purification weight estimation unit 1311-*n* of the seventh example obtains a value $\gamma \times c_n \times r_n$ obtained by multiplying the normalized inner product value $r_n$ and the correction coefficient $c_n$ described in the third example or the normalized inner product value $r_n$ and the correction coefficient $c_n$ described in the fifth example by the inter-channel correlation coefficient $\gamma$ obtained by the inter-channel relationship information estimation unit 1331, as the n-th channel purification weight $\alpha_{Mn}$.

[n-th Channel Signal Purification Unit 1321-*n*]

The n-th channel upmixed common signal $\hat{Y}_{Mn}=\{\hat{y}_{Mn}(1), \hat{y}_{Mn}(2), \ldots, \hat{y}_{Mn}(T)\}$ output by the decoded sound common signal upmixing unit 1361, the n-th channel upmixed monaural decoded sound signal $\hat{X}_{Mn}=\{\hat{x}_{Mn}(1), \hat{x}_{Mn}(2), \ldots, \hat{x}_{Mn}(T)\}$ output by the monaural decoded sound upmixing unit 1371, and the n-th channel purification weight $\alpha_{Mn}$ output by the n-th channel purification weight estimation unit 1311-*n* are input to the n-th channel signal purification unit 1321-*n*. For each corresponding sample t, the n-th channel signal purification unit 1321-*n* obtains and outputs a sequence based on a value $\tilde{y}_{Mn}(t)$ obtained by adding a value $\alpha_{Mn} \times \hat{x}_{Mn}(t)$ obtained by multiplying the n-th channel purification weight $\alpha_{Mn}$ by the sample value $\hat{x}_{Mn}(t)$ of the n-th channel upmixed monaural decoded sound signal $\hat{X}_{Mn}$ and a value $(1-\alpha_{Mn}) \times \hat{y}_{Mn}(t)$ obtained by multiplying a value $(1-\alpha_{Mn})$ obtained by subtracting the n-th channel purification weight $\alpha_{Mn}$ from 1 by the sample value $\hat{y}_{Mn}(t)$ of the n-th channel upmixed common signal $\hat{Y}_{Mn}$, as the n-th channel purified upmixed signal $\tilde{Y}_{Mn}=\{\hat{y}_{Mn}(1), \hat{y}_{Mn}(2), \ldots, \hat{y}_{Mn}(T)\}$ (step S1321-*n*). That is, $\tilde{y}_{Mn}(t)=(1-\alpha_{Mn}) \times \hat{Y}_{Mn}(t)+\alpha_{Mn} \times \hat{x}_{Mn}(t)$.

[n-th Channel Separation Combination Weight Estimation Unit 1381-*n*]

The n-th channel decoded sound signal $\hat{X}_n=\{\hat{x}_n(1), \hat{x}_n(2), \ldots, \hat{x}_n(T)\}$ input to the sound signal purification device 1301 and the n-th channel upmixed common signal $\hat{Y}_{Mn}=\{\hat{y}_{Mn}(1), \hat{Y}_{Mn}(2), \ldots, \hat{Y}_{Mn}(T)\}$ output by the decoded sound common signal upmixing unit 1361 are input to the n-th channel separation combination weight estimation unit 1381-*n*. The n-th channel separation combination weight estimation unit 1381-*n* obtains and outputs the normalized inner product value for the n-th channel upmixed common signal $\hat{Y}_{Mn}$ of the n-th channel decoded sound signal $\hat{X}_n$ from the n-th channel decoded sound signal $\hat{X}_n$ and the n-th channel upmixed common signal $\hat{Y}_{Mn}$, as the n-th channel separation combination weight $\beta_n$ (step S1381-*n*). Specifically, the n-th channel separation combination weight $\beta_n$ is as represented by Expression (71).

[Math. 43]

$$\beta_n = \frac{\sum_{t=1}^{T} \hat{x}_n(t)\hat{y}_{Mn}(t)}{\sum_{t=1}^{T} \hat{y}_{Mn}(t)\hat{y}_{Mn}(t)} \tag{71}$$

[n-th Channel Separation Combination Unit 1391-*n*]

The n-th channel decoded sound signal $\hat{X}_n=\{\hat{x}_n(1), \hat{x}_n(2), \ldots, \hat{x}_n(T)\}$ input to the sound signal purification device 1301, the n-th channel upmixed common signal $\hat{Y}_{Mn}=\{\hat{Y}_{Mn}(1), \hat{Y}_{Mn}(2), \ldots, \hat{Y}_{Mn}(T)\}$ output by the decoded sound common signal upmixing unit 1361, the n-th channel purified upmixed signal 18 $Y_{Mn}=\{$18 $y_{Mn}(1)$, 18 $y_{Mn}(2), \ldots, \tilde{y}_{Mn}(T)\}$ output by the n-th channel signal purification unit 1321-*n*, and the n-th channel separation combination weight $\beta_n$ output by the n-th channel separation combination weight estimation unit 1381-*n* are input to the n-th channel separation combination unit 1391-*n*. For each corresponding sample t, the n-th channel separation combination unit 1391-*n* obtains and outputs a sequence based on a value $\tilde{x}_n(t)$ obtained by subtracting a value $\beta_n \times \hat{y}_{Mn}(t)$ obtained by multiplying the n-th channel separation combination weight $\beta_n$ by the sample value $\hat{y}_{Mn}(t)$ of the n-th channel upmixed common signal $\hat{Y}_{Mn}$ from the sample value $\hat{x}_n(t)$ of the n-th channel decoded sound signal $\hat{X}_n$, and adding a value $\beta_n \times \tilde{y}_{Mn}(t)$ obtained by multiplying the n-th channel separation combination weight $\beta_n$ by the sample value $\tilde{y}_{Mn}(t)$ of the n-th channel purified upmixed signal $\tilde{Y}_{Mn}$, as the n-th channel purified decoded sound signal $\tilde{X}_n=\{\tilde{x}_n(1), \tilde{x}_n(2), \ldots, \tilde{x}_n(T)\}$ (step S1391-*n*). That is, $\sim x_n(t)=\hat{x}_n(t)-\beta_n \times \hat{y}_{Mn}(t)+\beta_n \times \tilde{y}_{Mn}(t)$.

Eighth Embodiment

Similarly to the sound signal purification device of the seventh embodiment, a sound signal purification device of an eighth embodiment also improves the decoded sound signal of the each channel of the stereo by using a monaural decoded sound signal obtained from a code different from the code from which the decoded sound signal is obtained. The sound signal purification device of the eighth embodiment is different from the sound signal purification device of the seventh embodiment in that the inter-channel relationship information is obtained not from a decoded sound signal but from a code. Hereinafter, regarding the sound signal purification device of the eighth embodiment, differences from the sound signal purification device of the seventh embodiment will be described using an example in a case where the number of channels of the stereo is two.

<<Sound Signal Purification Device 1302>>

Figure 17:
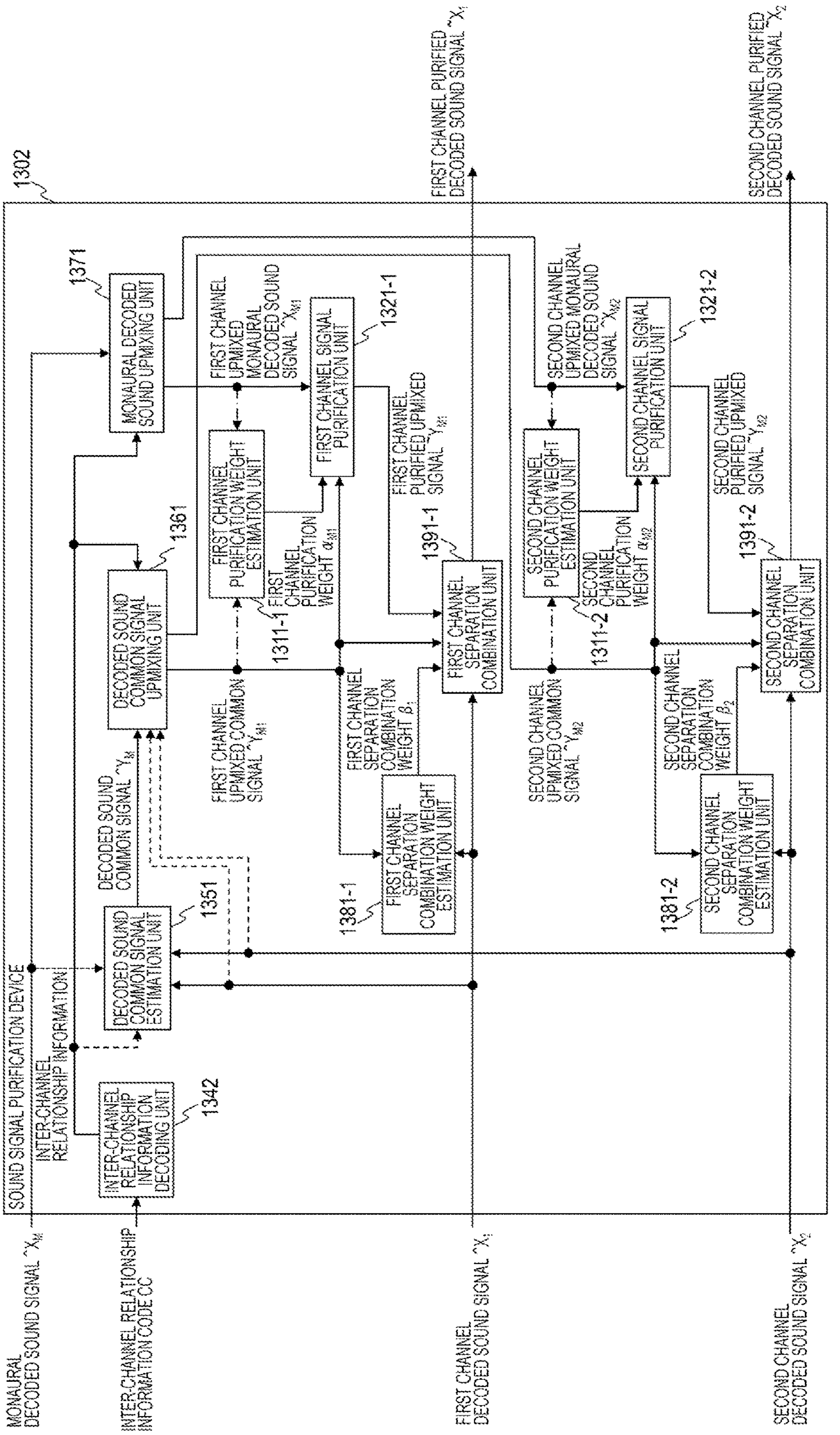
FIG. 17 is a block diagram illustrating an example of a sound signal purification device 1302.
Figure 18:
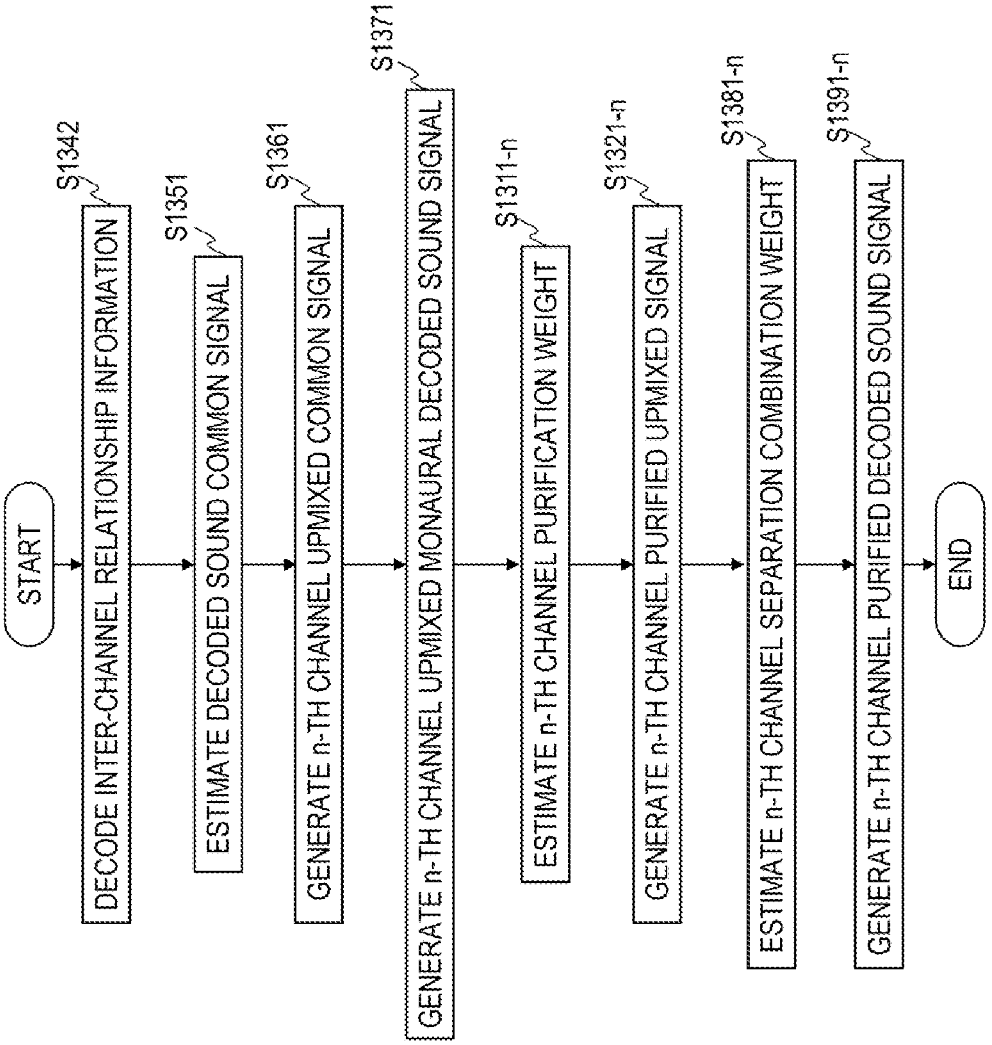
FIG. 18 is a flowchart illustrating an example of processing of the sound signal purification device 1302.

As illustrated in FIG. 17, the sound signal purification device 1302 of the eighth embodiment includes an inter-channel relationship information decoding unit 1342, the decoded sound common signal estimation unit 1351, the decoded sound common signal upmixing unit 1361, the monaural decoded sound upmixing unit 1371, the first channel purification weight estimation unit 1311-1, the first channel signal purification unit 1321-1, the first channel separation combination weight estimation unit 1381-1, the first channel separation combination unit 1391-1, the second channel purification weight estimation unit 1311-2, the second channel signal purification unit 1321-2, the second channel separation combination weight estimation unit 1381-2, and the second channel separation combination unit 1391-2. For the each frame, as illustrated in FIG. 18, the sound signal purification device 1302 performs steps S1342, S1351, S1361, and S1371, and steps S1311-*n*, S1321-*n*, S1381-*n*, and S1391-*n* for the each channel. The sound signal purification device 1302 of the eighth embodiment is different from the sound signal purification device 1301 of the seventh embodiment in that the inter-channel relationship information decoding unit 1342 is provided instead of the inter-channel relationship information estimation unit 1331, and step S1342 is performed instead of step S1331. Further, the inter-channel relationship information code CC of the each frame is also input to the sound signal purification device 1302 of the eighth embodiment. The inter-channel relationship information code CC may be a code obtained and output by the inter-channel relationship information encoding unit, which is not illustrated, included in the above-described encoding device 500, or may be a code included in the stereo code CS obtained and output by the stereo encoding unit 530 of the above-described encoding device 500. Hereinafter, differences between the sound signal purification device 1302 of the eighth embodiment and the sound signal purification device 1301 of the seventh embodiment will be described.

[Inter-channel Relationship Information Decoding Unit 1342]

The inter-channel relationship information code CC input to the sound signal purification device 1302 is input to the inter-channel relationship information decoding unit 1342. The inter-channel relationship information decoding unit 1342 decodes the inter-channel relationship information code CC to obtain and output the inter-channel relationship information (step S1342). The inter-channel relationship information obtained by the inter-channel relationship information decoding unit 1342 is the same as the inter-channel relationship information obtained by the inter-channel relationship information estimation unit 1331 of the seventh embodiment.

Modification Example of Eighth Embodiment

In a case where the inter-channel relationship information code CC is a code included in the stereo code CS, the same inter-channel relationship information obtained in step S1342 is obtained by decoding in the stereo decoding unit 620 of the decoding device 600. Therefore, in a case where the inter-channel relationship information code CC is a code included in the stereo code CS, the inter-channel relationship information obtained by the stereo decoding unit 620 of the decoding device 600 may be input to the sound signal purification device 1302 of the eighth embodiment, and the sound signal purification device 1302 of the eighth embodiment may not include the inter-channel relationship information decoding unit 1342 and does not perform step S1342.

Further, in a case where only a part of the inter-channel relationship information code CC is a code included in the stereo code CS, it is only required that the inter-channel relationship information obtained by decoding the code included in the stereo code CS in the inter-channel relationship information code CC by the stereo decoding unit 620 of the decoding device 600 is input to the sound signal purification device 1302 of the eighth embodiment, and that the inter-channel relationship information decoding unit 1342 of the sound signal purification device 1302 of the eighth embodiment decodes, as step S1342, a code not included in the stereo code CS in the inter-channel relationship information code CC to obtain and output the inter-channel relationship information that has not been input to the sound signal purification device 1302.

Further, in a case where the code corresponding to a part of the inter-channel relationship information used by each unit of the sound signal purification device 1302 is not included in the inter-channel relationship information code CC, the sound signal purification device 1302 of the eighth embodiment is only required to also include the inter-channel relationship information estimation unit 1331, so that the inter-channel relationship information estimation unit 1331 also performs step S1331. In this case, as step S1331, the inter-channel relationship information estimation unit 1331 is only required to obtain and output the inter-channel relationship information that cannot be obtained by decoding the inter-channel relationship information code CC among pieces of the inter-channel relationship information used by respective units of the sound signal purification device 1302, similarly to step S1331 of the seventh embodiment.

Ninth Embodiment

In the decoded sound signal obtained by encoding/decoding the input sound signal, a phase of a high-frequency component rotates with respect to the input sound signal due to distortion caused by encoding processing. Since the encoding/decoding method for obtaining the monaural decoded sound signal and the encoding/decoding method for obtaining the decoded sound signal of the each channel of the stereo are different encoding/decoding methods independent from each other, high-frequency components of the monaural decoded sound signal obtained by the monaural decoding unit 610 and the decoded sound signal of the each channel of the stereo obtained by the stereo decoding unit 620 have a small correlation and the energy of the high-frequency components may be reduced by the weighted addition process (hereinafter referred to as "signal purification processing in the time domain" for convenience) in the time domain in the signal purification unit of the sound signal purification device described above or the separation combination unit of the each channel, and thus the purified decoded sound signal of the each channel may be heard like being muffled. A sound signal high-frequency compensation device of a ninth embodiment eliminates this muffling by compensating for high-frequency energy using the high-frequency component of a signal before the signal purification processing.

Note that a case where the sound signal is heard like being muffled due to the reduction in energy of the high-frequency component is not limited to the purified decoded sound signal obtained by performing the signal purification processing in the time domain by the sound signal purification device described above on the decoded sound signal of the each channel, and a sound signal obtained by performing the signal processing in the time domain other than the signal purification processing by the sound signal purification device described above on the decoded sound signal of the each channel may also be heard like being muffled. The sound signal high-frequency compensation device of the ninth embodiment can eliminate the muffling by compensating for high-frequency energy using a high-frequency component of a signal before signal processing in the time domain regardless of whether or not it is the signal purification processing in the time domain by the sound signal purification device described above.

Hereinafter, not only the purified decoded sound signal obtained by performing the signal purification processing by the sound signal purification device described above on the decoded sound signal of the each channel, but also the sound signal obtained by performing the signal processing in the time domain on the decoded sound signal of the each channel is also referred to as a purified decoded sound signal for convenience, and the sound signal high-frequency compensation device of the ninth embodiment will be described using an example in a case where the number of channels of the stereo is two.

<<Sound Signal High-Frequency Compensation Device 201>>

Figure 19:
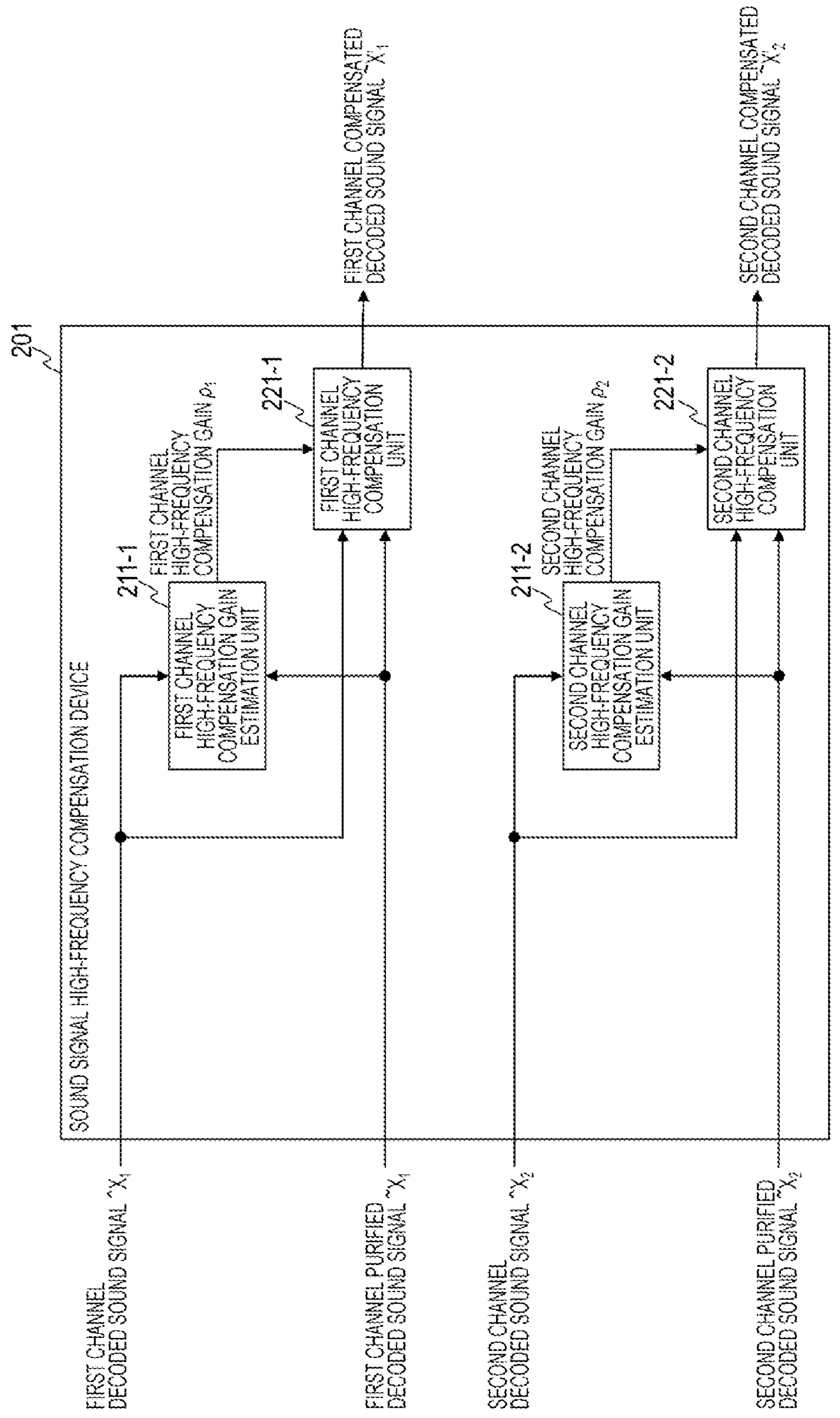
FIG. 19 is a block diagram illustrating an example of a sound signal high-frequency compensation device 201.
Figure 20:
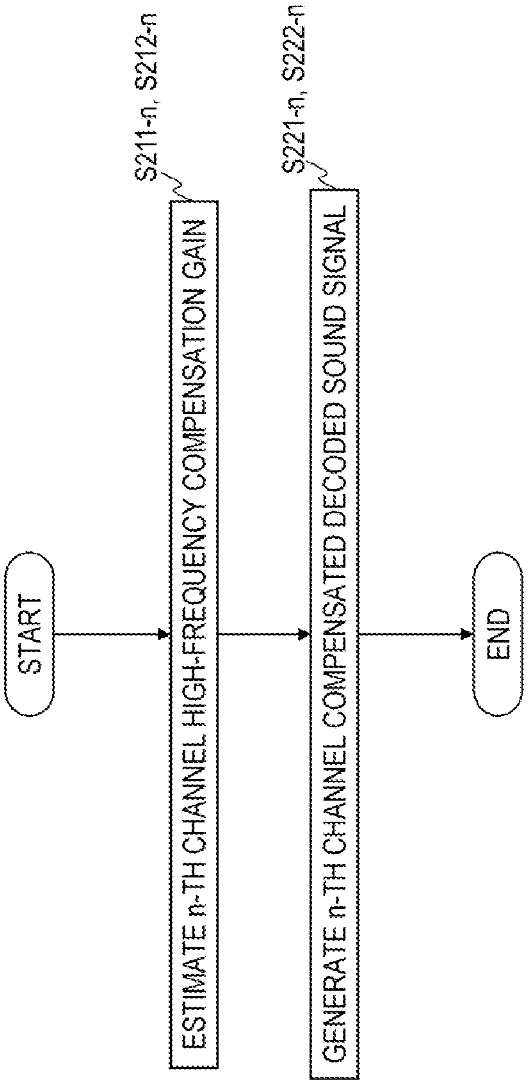
FIG. 20 is a flowchart illustrating an example of processing of the sound signal high-frequency compensation device 201/202.

As illustrated in FIG. 19, a sound signal high-frequency compensation device 201 of the ninth embodiment includes a first channel high-frequency compensation gain estimation unit 211-1, a first channel high-frequency compensation unit 221-1, a second channel high-frequency compensation gain estimation unit 211-2, and a second channel high-frequency compensation unit 221-2. The first channel purified decoded sound signal $\tilde{X}_1$ and the second channel purified decoded sound signal $\tilde{X}_2$ output by any of the sound signal purification devices described above and the first channel decoded sound signal $\hat{X}_1$ and the second channel decoded sound signal $\hat{X}_2$ output by the stereo decoding unit 620 of the decoding device 600 are input to the sound signal high-frequency compensation device 201. The sound signal high-frequency compensation device 201 obtains and outputs, for the each channel of the stereo in units of frames having a predetermined time length of 20 ms, for example, a compensated decoded sound signal of the channel, which is a sound signal obtained by compensating the high-frequency energy of the purified decoded sound signal of the channel, by using the purified decoded sound signal of the channel and the decoded sound signal of the channel. Assuming that the channel number n (channel index n) of the first channel is 1 and the channel number n of the second channel is 2, the sound signal high-frequency compensation device 201 performs steps S211-*n* and S221-*n* illustrated in FIG. 20 for the each channel for the each frame. Note that the high frequency mentioned here means a band that is not a low frequency band (what is called a "low frequency") in which a phase is maintained to some extent even by encoding processing. The high frequency, even if the phases of the input sound signal and the decoded sound signal are different from each other, has a difference in audibility that is hard to be perceived, and thus the phase of the component of approximately 2 kHz or more is often rotated by the encoding processing. Therefore, the sound signal high-frequency compensation device 201 is only required to handle, for example, a component having a frequency of approximately 2 kHz or more as the high frequency. However, it is not essential that approximately 2 kHz or more are the high frequency, and the sound signal high-frequency compensation device 201 is only required to handle, as the high frequency, a component equal to or higher than a predetermined frequency that divides a frequency band having a possibility of being included in each signal into two. This similarly applies to the following embodiments and modification examples. Note that the first channel purified decoded sound signal $\tilde{X}_1$ and the second channel purified decoded sound signal $\tilde{X}_2$ input to the sound signal high-frequency compensation device 201 are not necessarily signals output by any of the sound signal purification devices described above, and are only required to be the first channel purified decoded sound signal $\tilde{X}_1$ and the second channel purified decoded sound signal $\tilde{X}_2$ which are sound signals obtained by performing the signal processing in the time domain on the first channel decoded sound signal $\hat{X}_1$ and the second channel decoded sound signal $\hat{X}_2$ output by the stereo decoding unit 620 of the decoding device 600. This also similarly applies to the following embodiments and modification examples.

[n-th Channel High-Frequency Compensation Gain Estimation Unit 211-*n*]

The n-th channel decoded sound signal $\hat{X}_n=\{\hat{x}_n(1), x_n(2), \ldots, \hat{x}_n(T)\}$ input to the sound signal high-frequency compensation device 201 and the n-th channel purified decoded sound signal $\tilde{X}_n=\{\tilde{x}_n(1), \tilde{x}_n(2), \ldots, \tilde{x}_n(T)\}$ input to the sound signal high-frequency compensation device 201 are input to the n-th channel high-frequency compensation gain estimation unit 211-*n*. The n-th channel high-frequency compensation gain estimation unit 211-*n* obtains and outputs an n-th channel high-frequency compensation gain $\rho_n$ from the n-th channel decoded sound signal $\hat{X}_n$ and the n-th channel purified decoded sound signal $\tilde{X}_n$ (step S211-*n*). The n-th channel high-frequency compensation gain $\rho_n$ is a value for bringing high-frequency energy of an n-th channel compensated decoded sound signal $\tilde{X}'_n$ obtained by the n-th channel high-frequency compensation unit 221-*n* described later close to high-frequency energy of the n-th channel decoded sound signal $\hat{X}_n$. A method by which the n-th channel high-frequency compensation gain estimation unit 211-*n* obtains the n-th channel high-frequency compensation gain ρn will be described later.

[n-th Channel High-Frequency Compensation Unit 221-*n*]

The n-th channel decoded sound signal $\hat{X}_n=\{\hat{x}_n(1), \hat{x}_n(2), \ldots, \hat{x}_n(T)\}$ input to the signal high-frequency compensation device 201, the n-th channel purified decoded sound signal $\tilde{X}_n=\{\tilde{x}_n(1), \tilde{x}_n(2), \ldots, \tilde{x}_n(T)\}$ input to the sound signal high-frequency compensation device 201, and the n-th channel high-frequency compensation gain $\rho_n$ output by the n-th channel high-frequency compensation gain estimation unit 211-*n* are input to the n-th channel high-frequency compensation unit 221-*n*. The n-th channel high-frequency compensation unit 221-*n* obtains and outputs a signal obtained by adding the n-th channel purified decoded sound signal $\tilde{X}_n$ and a signal obtained by multiplying the high-frequency component of the n-th channel decoded sound signal $\hat{X}_n$ by the n-th channel high-frequency compensation gain $\rho_n$, as the n-th channel compensated decoded sound signal $\tilde{X}'_n=\{\tilde{x}'_n(1), \tilde{x}'_n(2), \ldots, \tilde{x}'_n(T)\}$ (step S221-*n*).

For example, the n-th channel high-frequency compensation unit 221-*n* passes the n-th channel decoded sound signal $\hat{X}_n$ through a high-pass filter to obtain an n-th channel compensation signal $\hat{X}'_n=\{\hat{x}'_n(1), \hat{x}'_n(2), \ldots, \hat{x}'_n(T)\}$ and, for each corresponding sample t, obtains and outputs a sequence based on a value $\tilde{x}'_n(t)$ obtained by adding a sample value $\tilde{x}_n(t)$ of the n-th channel purified decoded sound signal $\tilde{X}_n$ and a value $\rho_n \times x'_n(t)$ obtained by multiplying the n-th channel high-frequency compensation gain $\rho_n$ by a sample value $\hat{x}'_n(t)$ of the n-th channel compensation signal $\hat{X}'_n$ as the n-th channel compensated decoded sound signal $\tilde{X}'_n=\{\tilde{x}'_n(1), \tilde{x}'_n(2), \ldots, \tilde{x}'_n(T)\}$. That is, $\tilde{x}'_n(t)=\tilde{x}_n(t)+\rho_n \times \hat{x}'_n(t)$. As the high-pass filter, it is only required that a high-pass filter having a passband equal to or higher than a predetermined frequency that divides a frequency band having a possibility of being included in each signal into two is, and for example, in a case where a component having a frequency of 2 kHz or higher is handled as the high frequency, it is only required that a high-pass filter having a passband of 2 kHz or higher is used.

[Method by which n-th Channel High-Frequency Compensation Gain Estimation Unit 211-*n* Obtains n-th Channel High-Frequency Compensation Gain Ion]

The n-th channel high-frequency compensation gain estimation unit 211-*n* obtains the n-th channel high-frequency compensation gain ρn by, for example, the following first method or second method.

[[First Method for Obtaining n-th Channel High-Frequency Compensation Gain $\rho_n$]]

In the first method, the n-th channel high-frequency compensation gain estimation unit 211-*n* obtains the n-th channel high-frequency compensation gain $\rho_n$ having a larger value as the high-frequency energy of the n-th channel purified decoded sound signal $\tilde{X}_n$ is smaller than the high-frequency energy of the n-th channel decoded sound signal $\hat{X}_n$. For example, the n-th channel high-frequency compensation gain estimation unit 211-*n* obtains a square root of a value $(1-\tilde{E}X_n/\hat{E}X_n)$ obtained by subtracting a value obtained by dividing high-frequency energy $^{18}$ $EX_n$ of the n-th channel purified decoded sound signal $\tilde{X}_n$ by high-frequency energy $\hat{E}X_n$ of the n-th channel decoded sound signal $\hat{X}_n$ from 1 as the n-th channel high-frequency compensation gain $\rho_n$. That is, the n-th channel high-frequency compensation gain estimation unit 211-*n* obtains the n-th channel high-frequency compensation gain $\rho_n$ by the following Expression (91) using the high-frequency energy $^{18}$ $EX_n$ of the n-th channel purified decoded sound signal $\tilde{X}_n$ and the high-frequency energy $\hat{E}X_n$ of the n-th channel decoded sound signal $\hat{X}_n$.

[Math. 44]

$$\rho_n = \sqrt{1 - \frac{\tilde{E}X_n}{\hat{E}X_n}} \tag{91}$$

[[Second Method for Obtaining n-th Channel High-Frequency Compensation Gain $\rho_n$]]

When the signal is passed through the high-pass filter, the phase of each frequency component of the signal rotates. Accordingly, even if the phases of the high-frequency components do not match between the n-th channel compensation signal $\hat{X}'_n$ and the n-th channel purified decoded sound signal $\tilde{X}_n$, and the n-th channel high-frequency compensation unit 221-*n* adds $\tilde{x}'_n(t)=\tilde{x}_n(t)+\rho_n \times \hat{x}'_n(t)$ for each sample t using the n-th channel high-frequency compensation gain $\rho_n$ obtained by the first method to obtain the n-th channel compensated decoded sound signal $\tilde{X}'_n$, there is a possibility that the high-frequency component of the n-th channel compensation signal $\hat{X}'_n$ and the high-frequency component of the n-th channel purified decoded sound signal $\tilde{X}_n$ cancel each other, and thus the high-frequency energy of the n-th channel compensated decoded sound signal $\tilde{X}'_n$ does not approach the high-frequency energy of the n-th channel decoded sound signal $\hat{X}_n$ as expected. Therefore, even if the high-frequency components cancel each other out by the above-described addition, the second method can bring the high-frequency energy of the n-th channel compensated decoded sound signal $\tilde{X}'_n$ close to the high-frequency energy of the n-th channel decoded sound signal $\hat{X}_n$. In the second method, the n-th channel high-frequency compensation gain estimation unit 211-*n* obtains the n-th channel high-frequency compensation gain $\rho_n$, for example, by performing the following steps S211-21-*n* to S211-23-*n*.

The n-th channel high-frequency compensation gain estimation unit 211-*n* first passes the n-th channel decoded sound signal $\hat{X}_n$ through a high-pass filter having the same characteristics as that used by the n-th channel high-frequency compensation unit 221-*n* to obtain the n-th channel compensation signal $\hat{X}'_n=\{\hat{x}'_n(1), \hat{x}'_n(2), \ldots, x'_n(T)\}$ (step S211-21-*n*). Next, the n-th channel high-frequency compensation gain estimation unit 211-*n* obtains, for each corresponding sample t, a sequence based on a value $\tilde{x}''_n(t)$ obtained by adding the sample value $\tilde{x}_n(t)$ of the n-th channel purified decoded sound signal $\tilde{X}_n$ and the sample value $\hat{x}'_n(t)$ of the n-th channel compensation signal $\hat{X}'_n$ as an n-th channel temporary addition signal $\tilde{X}''_n=\{\tilde{x}''_n(1), \tilde{x}''_n(2), \ldots, \sim X''_n(T)\}$ (step S211-22-*n*). That is, $\sim x''_n(t)=\tilde{x}_n(t)+\hat{x}'_n(t)$. Next, the n-th channel high-frequency compensation gain estimation unit 211-*n* obtains the n-th channel high-frequency compensation gain $\rho^n$ (step S211-23-*n*) that is a value larger as the high-frequency energy $\tilde{E}X_n$ of the n-th channel purified decoded sound signal $\tilde{X}_n$ is smaller than the high-frequency energy $\hat{E}X_n$ of the n-th channel decoded sound signal $\hat{X}_n$, and is a value larger as a difference between the high-frequency energy of the n-th channel purified decoded sound signal $\tilde{X}_n$ and the high-frequency energy of the n-th channel temporary addition signal $\tilde{X}''_n$ is smaller than the high-frequency energy $\hat{E}X_n$ of the n-th channel decoded sound signal $\hat{X}_n$. For example, the n-th channel high-frequency compensation gain estimation unit 211-*n* obtains the n-th channel high-frequency compensation gain $\rho_n$ by the following Expression (92) using the high-frequency energy $\hat{E}X_n$ of the n-th channel decoded sound signal $\hat{X}_n$, the high-frequency energy $\hat{E}X_n$ of the n-th channel purified decoded sound signal $\tilde{X}_n$, and a value $(\tilde{E}X''_n-\tilde{E}X_n)$ obtained by subtracting the high-frequency energy $\tilde{E}X_n$ of the n-th channel purified decoded sound signal $\tilde{X}_n$ from the high-frequency energy $\tilde{E}X''_n$ of the n-th channel temporary addition signal $\tilde{X}''_n$.

[Math. 45]

$$\rho_n=\sqrt{\rho_n^2+0.25\mu_n^2}+0.5\mu_n \tag{92}$$

Here, $\hat{\rho}_n^2$ is a value obtained by the following Expression (92a), and $\mu_n$ is a value obtained by the following Expression (92b).

[Math. 46]

$$\hat{\rho}_n^2 = 1 - \frac{\tilde{E}X_n}{\hat{E}X_n} \tag{92a}$$

[Math. 47]

$$\mu_n = 1 - \frac{\tilde{E}X''_n - \tilde{E}X_n}{\hat{E}X_n} \tag{92b}$$

If the high-frequency component of the n-th channel compensation signal $\hat{X}'_n$ and the high-frequency component of the n-th channel purified decoded sound signal $\tilde{X}_n$ do not cancel each other out of energy by addition, a value ($\tilde{E}X''_n - \tilde{E}X_n$) obtained by subtracting the high-frequency energy $\tilde{E}X_n$ of the n-th channel purified decoded sound signal $\tilde{X}_n$ from the high-frequency energy $\tilde{E}X''_n$ of the n-th channel temporary addition signal $\tilde{X}''_n$ becomes equal to the high-frequency energy $\hat{E}X_n$ of the n-th channel decoded sound signal $\hat{X}_n$, and thus $\mu_n$ becomes zero and the n-th channel high-frequency compensation gain $\rho_n$ obtained by Expression (92) becomes equal to the n-th channel high-frequency compensation gain $\rho_n$ obtained by Expression (91) of [[First Method for Obtaining n-th Channel High-Frequency Compensation Gain $\rho_n$]]. Further, as the high-frequency component of the n-th channel compensation signal $\hat{X}'_n$ and the high-frequency component of the n-th channel purified decoded sound signal $\tilde{X}_n$ cancel each other out of energy by addition, $\mu_n$ becomes a value larger than zero, and the n-th channel high-frequency compensation gain $\rho_n$ obtained by Expression (92) becomes a value larger than the n-th channel high-frequency compensation gain $\rho_n$ obtained by Expression (91) of [[First Method for Obtaining n-th Channel High-Frequency Compensation Gain ρ^n]]. Therefore, since it is assumed that some cancellation of energy occurs due to the addition of the high-frequency component of the n-th channel compensation signal $\hat{X}'_n$ and the high-frequency component of the n-th channel purified decoded sound signal $\tilde{X}_n$, it can be said that in the second method, the n-th channel high-frequency compensation gain estimation unit 211-*n* obtains a value larger than the value obtained by Expression (91) as the n-th channel high-frequency compensation gain $\rho_n$.

Note that the n-th channel high-frequency compensation gain estimation unit 211-*n* may obtain the n-th channel high-frequency compensation gain $\rho_n$ by the following Expression (93) or the following Expression (94) instead of Expression (92). A in Expression (94) is a predetermined positive value, and is desirably a value near one.

[Math. 48]

$$\rho_n = \sqrt{\rho_n^2 + \mu_n} \quad (93)$$

[Math. 49]

$$\rho_n = \sqrt{\rho_n^2 + A\mu_n} \quad (94)$$

In the example of the second method described above, the n-th channel high-frequency compensation gain estimation unit 211-*n* obtains, in step S211-21-*n*, the same n-th channel compensation signal $\hat{X}'_n$ used by the n-th channel high-frequency compensation unit 221-*n*. Therefore, the n-th channel high-frequency compensation gain estimation unit 211-*n* may output the n-th channel compensation signal $\hat{X}'_n$ obtained in step S211-21-*n*, and the n-th channel compensation signal $\hat{X}'_n$ output by the n-th channel high-frequency compensation gain estimation unit 211-*n* may be input to the n-th channel high-frequency compensation unit 221-*n* instead of the n-th channel decoded sound signal $\hat{X}_n$ input to the signal high-frequency compensation device 201. In this case, the n-th channel high-frequency compensation unit 221-*n* does not need to perform the high-pass filter processing for obtaining the n-th channel compensation signal $\hat{X}'_n$. Conversely, the n-th channel high-frequency compensation unit 221-*n* may output the n-th channel compensation signal $\hat{X}'_n$ obtained by the high-pass filter processing, and the n-th channel compensation signal $\hat{X}'_n$ output by the n-th channel high-frequency compensation unit 221-*n* may be input to the n-th channel high-frequency compensation gain estimation unit 211-*n*. In this case, the n-th channel high-frequency compensation gain estimation unit 211-*n* does not need to perform the high-pass filter processing for obtaining the n-th channel compensation signal $\hat{X}'_n$. Of course, the signal high-frequency compensation device 201 may include a high-pass filter unit which is not illustrated, the high-pass filter unit may pass the n-th channel decoded sound signal $\hat{X}_n$ through the high-pass filter to obtain and output the n-th channel compensation signal $\hat{X}'_n$, the n-th channel compensation signal $\hat{X}'_n$ may be input to the n-th channel high-frequency compensation gain estimation unit 211-*n* and the n-th channel high-frequency compensation unit 221-*n*, and the n-th channel high-frequency compensation gain estimation unit 211-*n* and the n-th channel high-frequency compensation unit 221-*n* may not perform the high-pass filter processing for obtaining the n-th channel compensation signal $\hat{X}'_n$. That is, the signal high-frequency compensation device 201 may employ any configuration as long as the n-th channel high-frequency compensation gain estimation unit 211-*n* and the n-th channel high-frequency compensation unit 221-*n* can use a signal obtained by passing the n-th channel decoded sound signal $\hat{X}_n$ through the high-pass filter as the n-th channel compensation signal $\hat{X}'_n$.

Tenth Embodiment

In a case where the monaural encoding unit 520 of the encoding device 500 performs encoding at a higher bit rate than the each channel of the stereo encoding unit 530, there are cases where an n-th channel monaural decoded sound upmixed signal $\hat{X}_{Mn}$ based on the monaural decoded sound signal $\hat{X}_M$ obtained by the monaural decoding unit 610 of the decoding device 600 has higher sound quality than the n-th channel decoded sound signal $\hat{X}_n$ obtained by the stereo decoding unit 620 of the decoding device 600 and is suitable as a signal used for compensation of the high frequency. Accordingly, a sound signal high-frequency compensation device of a tenth embodiment uses the n-th channel monaural decoded sound upmixed signal $\hat{X}_{Mn}$ for the compensation of the high frequency instead of the n-th channel decoded sound signal $\hat{X}_n$ that has been used for the compensation of the high frequency by the sound signal high-frequency compensation device of the ninth embodiment. Hereinafter, regarding the sound signal high-frequency compensation device of the tenth embodiment, differences from the sound signal high-frequency compensation device of the ninth embodiment will be mainly described using an example in a case where the number of channels of the stereo is two.

<<Sound Signal High-Frequency Compensation Device 202>>

Figure 21:
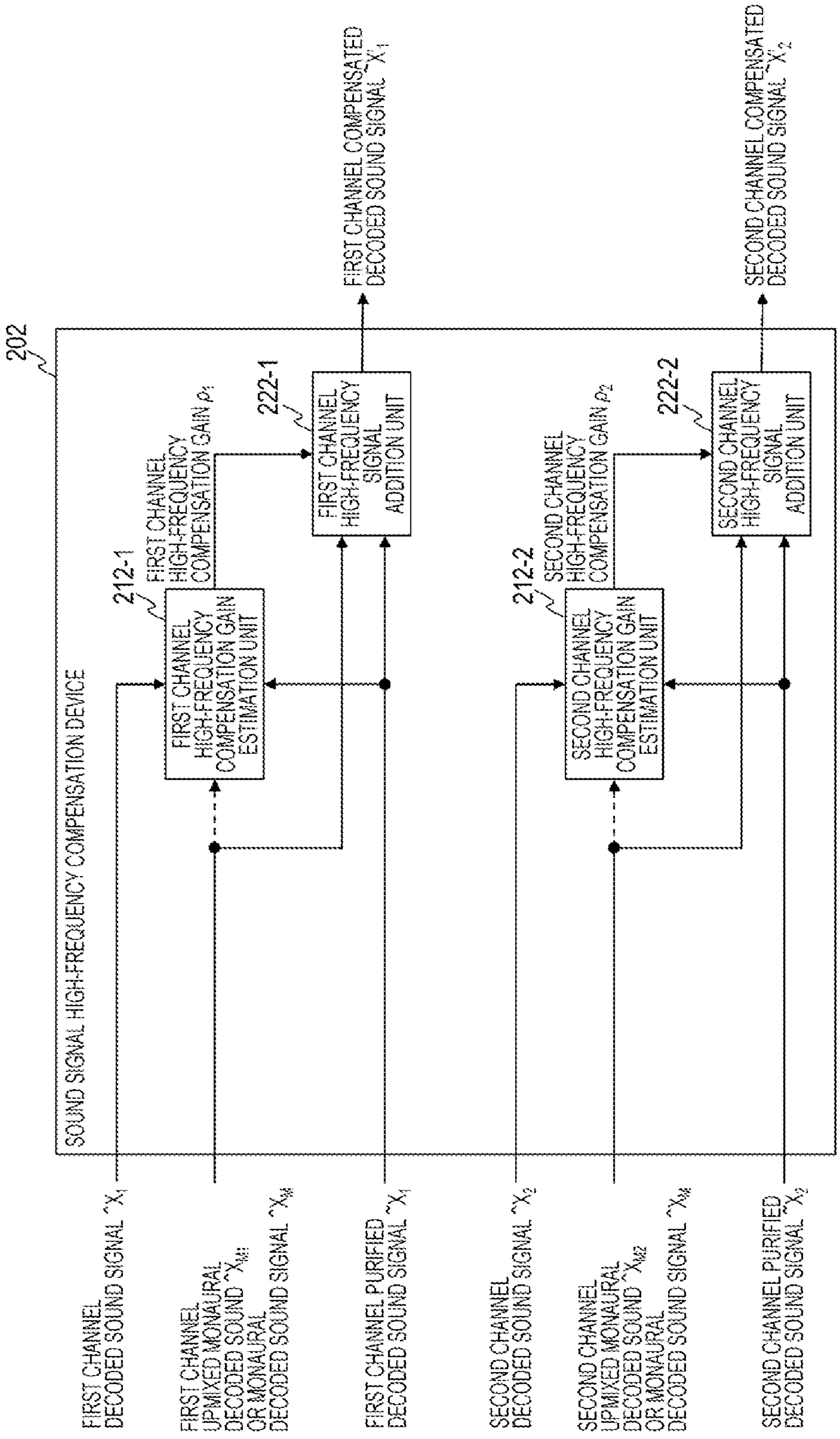
FIG. 21 is a block diagram illustrating an example of a sound signal high-frequency compensation device 202.

As illustrated in FIG. 21, a sound signal high-frequency compensation device 202 of the tenth embodiment includes a first channel high-frequency compensation gain estimation unit 212-1, a first channel high-frequency compensation unit 222-1, a second channel high-frequency compensation gain estimation unit 212-2, and a second channel high-frequency compensation unit 222-2. The first channel purified decoded sound signal $\tilde{X}_1$ and the second channel purified decoded sound signal $\tilde{X}_2$ output by any of the sound signal purification devices described above, the first channel decoded sound signal $\hat{X}_1$ and the second channel decoded sound signal $\hat{X}_2$ output by the stereo decoding unit 620 of the decoding device 600, and the first channel upmixed monaural decoded sound signal $\hat{X}_{M1}$ and the second channel upmixed monaural decoded sound signal $\hat{X}_{M2}$ output by any of the sound signal purification devices described above are input to the sound signal high-frequency compensation device 202.

That is, in a case where the sound signal purification device includes the monaural decoded sound upmixing unit and obtains the upmixed monaural decoded sound signal $\hat{X}_{Mn}$ of the each channel, the upmixed monaural decoded sound signal $\hat{X}_{Mn}$ of the each channel obtained by the monaural decoded sound upmixing unit is output by the sound signal purification device and input to the sound signal high-frequency compensation device 202. Note that a case where the sound signal purification device does not include the monaural decoded sound upmixing unit will be described later in a modification example of the tenth embodiment.

The sound signal high-frequency compensation device 202 obtains and outputs, for the each channel of the stereo in units of frames having a predetermined time length of 20 ms, for example, a compensated decoded sound signal of the channel, which is a sound signal obtained by compensating the high-frequency energy of the purified decoded sound signal of the channel, by using the purified decoded sound signal of the channel, the decoded sound signal of the channel, and the upmixed monaural decoded sound signal of the channel. Assuming that the channel number n (channel index n) of the first channel is 1 and the channel number n of the second channel is 2, the sound signal high-frequency compensation device 202 performs steps S212-*n* and S222-*n* illustrated in FIG. 20 for the each channel for the each frame.

[n-th Channel High-Frequency Compensation Gain Estimation Unit 212-*n*]

At least the n-th channel decoded sound signal $\hat{X}_n=\{\hat{x}_n(1), \hat{x}_n(2), \ldots, \hat{x}_n(T)\}$ input to the sound signal high-frequency compensation device 202 and the n-th channel purified decoded sound signal $\tilde{X}_n=\{\tilde{x}_n(1), \tilde{x}_n(2), \ldots, \tilde{x}_n(T)\}$ input to the sound signal high-frequency compensation device 202 are input to the n-th channel high-frequency compensation gain estimation unit 212-*n*. The n-th channel high-frequency compensation gain estimation unit 212-*n* obtains and outputs the n-th channel high-frequency compensation gain $\rho_n$ by using at least the n-th channel decoded sound signal $\hat{X}_n$ and the n-th channel purified decoded sound signal $\tilde{X}_n$ (step S212-*n*). The n-th channel high-frequency compensation gain estimation unit 212-*n* obtains the n-th channel high-frequency compensation gain $\rho_n$ by, for example, the first method described in the ninth embodiment or the following second method.

[[Second Method for Obtaining n-th Channel High-Frequency Compensation Gain $\rho_n$]]

The second method is a method of performing a process of obtaining the n-th channel compensation signal $\hat{X}'_n$ from the n-th channel upmixed monaural decoded sound signal $\hat{X}_{Mn}$ instead of the process of obtaining the n-th channel compensation signal $\hat{X}'_n$ from the n-th channel decoded sound signal $\hat{X}_n$ by the second method of the ninth embodiment. Therefore, in the case of using the second method, the n-th channel upmixed monaural decoded sound signal $\hat{X}_{Mn}$ input to the sound signal high-frequency compensation device 202 is also input to the n-th channel high-frequency compensation gain estimation unit 212-*n* as indicated by a broken line in FIG. 21. In the second method, the n-th channel high-frequency compensation gain estimation unit 212-*n* obtains the n-th channel high-frequency compensation gain $\rho_n$ by, for example, performing the following step S212-21-*n* instead of step S211-21-*n* of the second method of the ninth embodiment, and then performing the same steps S211-22-*n* and S211-23-*n* as those in the second method of the ninth embodiment. That is, the n-th channel high-frequency compensation gain estimation unit 212-*n* first passes the n-th channel upmixed monaural decoded sound signal $\hat{X}_{Mn}$ through a high-pass filter having the same characteristics as those used by the n-th channel high-frequency compensation unit 222-*n* to obtain the n-th channel compensation signal $\hat{X}'_n=\{\hat{x}'_n(1), \hat{x}'_n(2), \ldots, \hat{x}'_n(T)\}$ (step S212-21-*n*), and then performs step S211-22-*n* and step S211-23-*n* described above in the description of the second method of the ninth embodiment.

[n-th Channel High-Frequency Compensation Unit 222-*n*]

The n-th channel high-frequency compensation unit 222-*n* obtains the n-th channel compensated decoded sound signal $\tilde{X}'_n$ by using the n-th channel upmixed monaural decoded sound signal $\hat{X}_{Mn}$ instead of the n-th channel decoded sound signal $\hat{X}_n$ that has been used by the n-th channel high-frequency compensation unit 221-*n* of the ninth embodiment. The n-th channel upmixed monaural decoded sound signal $\hat{X}_{Mn}=\{\hat{x}_{Mn}(1), \hat{x}_{Mn}(2), \ldots, \hat{x}_{Mn}(T)\}$ input to the signal high-frequency compensation device 202, the n-th channel purified decoded sound signal $\tilde{X}_n=\{\tilde{x}_n(1), \tilde{x}_n(2), \ldots, \tilde{x}_n(T)\}$ input to the sound signal high-frequency compensation device 202, and the n-th channel high-frequency compensation gain $\rho_n$ output by the n-th channel high-frequency compensation gain estimation unit 212-*n* are input to the n-th channel high-frequency compensation unit 222-*n*. The n-th channel high-frequency compensation unit 222-*n* obtains and outputs a signal obtained by adding the n-th channel purified decoded sound signal $\tilde{X}_n$ and a signal obtained by multiplying a high-frequency component of the n-th channel upmixed monaural decoded sound signal $\hat{X}_{Mn}$ by the n-th channel high-frequency compensation gain $\rho_n$, as the n-th channel compensated decoded sound signal $\tilde{X}'_n=\{\tilde{x}'_n(1), \tilde{x}_n'(2), \ldots, \tilde{x}'_n(T)\}$ (step S222-*n*).

For example, the n-th channel high-frequency compensation unit 222-*n* passes the n-th channel upmixed monaural decoded sound signal $\hat{X}_{Mn}$ through a high-pass filter to obtain an n-th channel compensation signal $\hat{X}'_n=\{\hat{x}'_n(1), \hat{x}'_n(2), \ldots, \hat{x}'_n(T)\}$ and, for each corresponding sample t, obtains and outputs a sequence based on a value $\tilde{x}'_n(t)$ obtained by adding the sample value $\tilde{x}_n(t)$ of the n-th channel purified decoded sound signal $\tilde{X}_n$ and a value $\rho_n \times \hat{x}'_n(t)$ obtained by multiplying the n-th channel high-frequency compensation gain $\rho_n$ by the sample value $\hat{x}'_n(t)$ of the n-th channel compensation signal $\hat{X}'_n$ as the n-th channel compensated decoded sound signal $\tilde{X}'_n=\{\tilde{x}'_n(1), \tilde{x}'_n(2), \ldots, \tilde{x}'_n(T)\}$. That is, $\tilde{x}'_n(t)=\tilde{x}_n(t)+\rho_n \times \hat{x}'_n(t)$.

Note that, as in the ninth embodiment, in a case where the n-th channel high-frequency compensation gain estimation unit 212-*n* uses the method exemplified in the [[Second Method for Obtaining n-th Channel High-Frequency Compensation Gain $\rho_n$]], one of the n-th channel high-frequency compensation gain estimation unit 212-*n* and the n-th channel high-frequency compensation unit 222-*n* may pass the n-th channel upmixed monaural decoded sound signal $\hat{X}_{Mn}$ through the high-pass filter to obtain and output the n-th channel compensation signal $\hat{X}'_n$, and the other may use the n-th channel compensation signal $\hat{X}'_n$ obtained by the other without performing the high-pass filter processing for obtaining the n-th channel compensation signal $\hat{X}'_n$. In addition, the signal high-frequency compensation device 202 may include a high-pass filter unit, which is not illustrated, the high-pass filter unit may pass the n-th channel upmixed monaural decoded sound signal $\hat{X}_{Mn}$ through the high-pass filter to obtain and output the n-th channel compensation signal $\hat{X}'_n$, and the n-th channel high-frequency compensation gain estimation unit 212-*n* and the n-th channel high-frequency compensation unit 222-*n* may use the n-th channel compensation signal $\hat{X}'_n$ obtained by the high-pass filter unit without performing the high-pass filter processing for obtaining the n-th channel compensation signal $\hat{X}'_n$. That is, the signal high-frequency compensation device 202 may employ any configuration as long as the n-th channel high-frequency compensation gain estimation unit 212-*n* and the n-th channel high-frequency compensation unit 222-*n* can use a signal obtained by passing the n-th channel upmixed monaural decoded sound signal $\hat{X}_{Mn}$ through the high-pass filter as the n-th channel compensation signal $\hat{X}'_n$.

Modification Example of Tenth Embodiment

In the tenth embodiment, the case where the sound signal purification device includes the monaural decoded sound upmixing unit and obtains the upmixed monaural decoded sound signal $\hat{X}_{Mn}$ of the each channel has been described, but in a case where the sound signal purification device does not include the monaural decoded sound upmixing unit and does not obtain the upmixed monaural decoded sound signal $\hat{X}_{Mn}$ of the each channel, the sound signal purification device 202 is only required to use the monaural decoded sound signal $\hat{X}_M$ output by the monaural decoding unit 610 of the decoding device 600 instead of the upmixed monaural decoded sound signal $\hat{X}_{Mn}$ of the each channel that has been used in the tenth embodiment. In addition, even in a case where the sound signal purification device includes the monaural decoded sound upmixing unit and obtains the upmixed monaural decoded sound signal $\hat{X}_{Mn}$ of the each channel, the sound signal purification device 202 may use the monaural decoded sound signal $\hat{X}_M$ output by the monaural decoding unit 610 of the decoding device 600 instead of the upmixed monaural decoded sound signal $\hat{X}_{Mn}$ of the each channel that has been used in the tenth embodiment.

Eleventh Embodiment

Which one of the n-th channel decoded sound signal $\hat{X}_n$ and the n-th channel upmixed monaural decoded sound signal $\hat{X}_{Mn}$ is used for the compensation of the high frequency may be selected according to the bit rate. Using this mode as an eleventh embodiment, differences from the sound signal high-frequency compensation device of the ninth embodiment and the sound signal high-frequency compensation device of the tenth embodiment will be mainly described using an example in a case where the number of channels of the stereo is two.

<<Sound Signal High-Frequency Compensation Device 203>>

Figure 22:
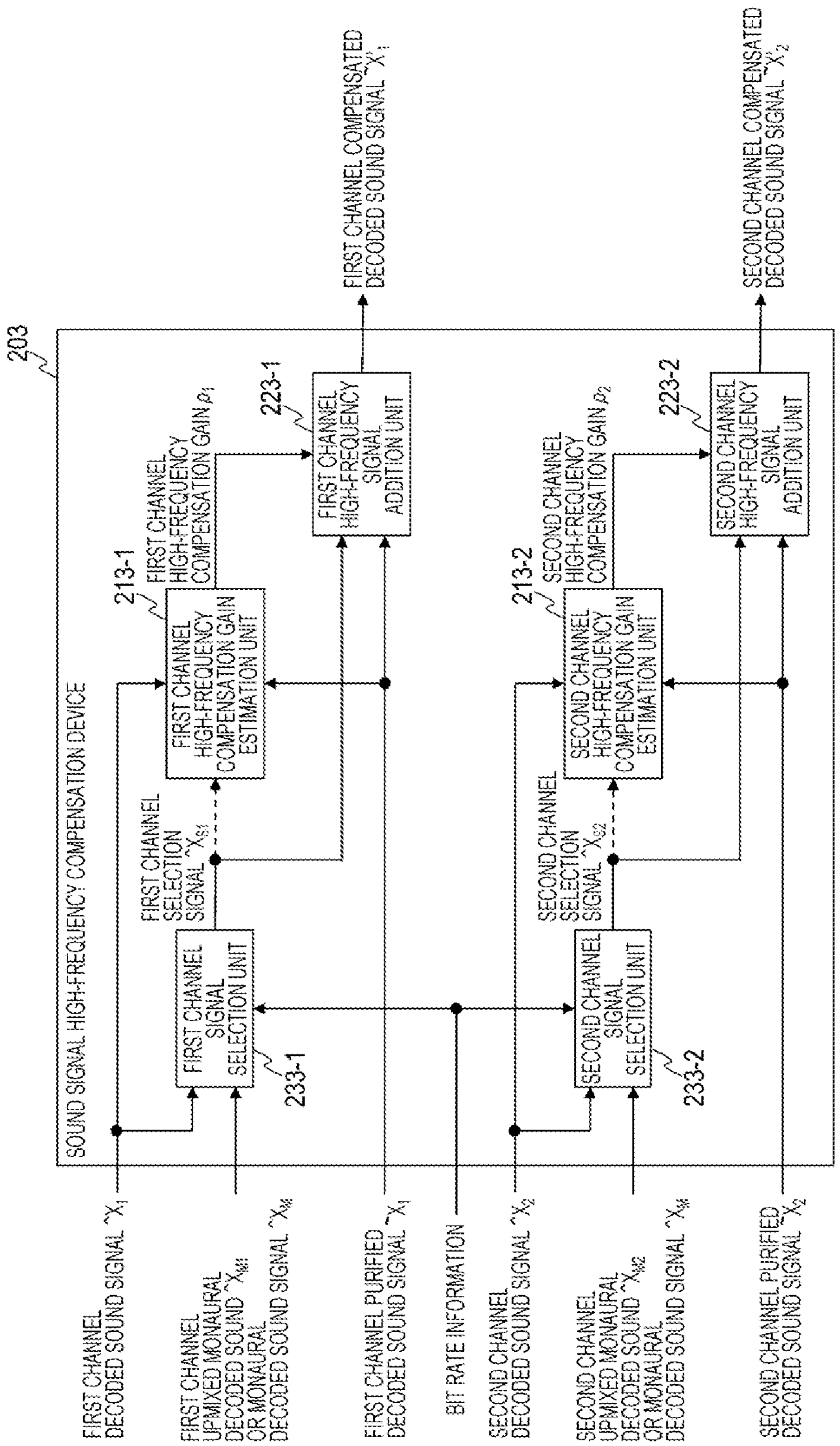
FIG. 22 is a block diagram illustrating an example of a sound signal high-frequency compensation device 203.

As illustrated in FIG. 22, the sound signal high-frequency compensation device 203 of the eleventh embodiment includes a first channel signal selection unit 233-1, a first channel high-frequency compensation gain estimation unit 213-1, a first channel high-frequency compensation unit 223-1, a second channel signal selection unit 233-2, a second channel high-frequency compensation gain estimation unit 213-2, and a second channel high-frequency compensation unit 223-2. The first channel purified decoded sound signal $\tilde{X}_1$ and the second channel purified decoded sound signal $\tilde{X}_2$ output by any one of the sound signal purification devices described above, the first channel decoded sound signal $\hat{X}_1$ and the second channel decoded sound signal $\hat{X}_2$ output by the stereo decoding unit 620 of the decoding device 600, the first channel upmixed monaural decoded sound signal $\hat{X}_{M1}$ and the second channel upmixed monaural decoded sound signal $\hat{X}_{M2}$ output by any one of the sound signal purification devices described above, and bit rate information are input to the sound signal high-frequency compensation device 203.

The bit rate information is information corresponding to the bit rates of the monaural encoding unit 520 and the monaural decoding unit 610 for the each frame and information corresponding to the bit rates per channel of the stereo encoding unit 530 and the stereo decoding unit 620. The information corresponding to the bit rates of the monaural encoding unit 520 and the monaural decoding unit 610 for the each frame is, for example, the number of bits $b_M$ of the monaural code CM of the each frame. The information corresponding to the bit rates of the stereo encoding unit 530 and the stereo decoding unit 620 for the each frame is, for example, the number of bits $b_n$ of the each channel in the number of bits $b_s$ of the stereo code CS of the each frame. Note that, in a case where the number of bits $b_M$ and the number of bits $b_n$ are the same in all the frames, it is not necessary to input the bit rate information to the sound signal high-frequency compensation device 203, and it is only required that the bit rate information is stored in advance in the storage unit, which is not illustrated, in the first channel signal selection unit 233-1 and the storage unit, which is not illustrated, in the second channel signal selection unit 233-2.

Figure 23:
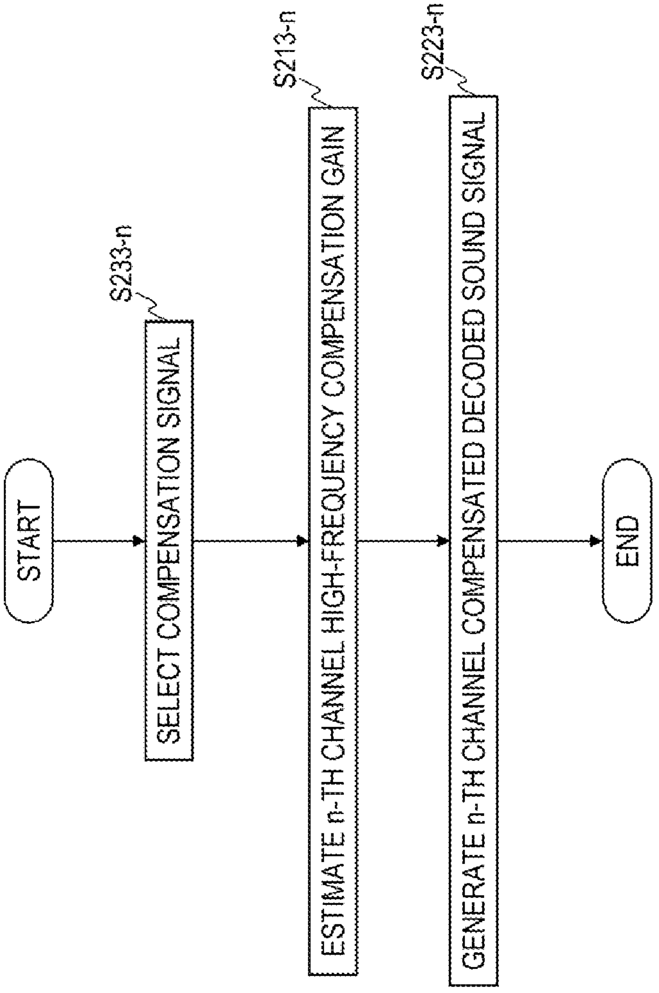
FIG. 23 is a flowchart illustrating an example of processing of the sound signal high-frequency compensation device 203.

The sound signal high-frequency compensation device 203 obtains and outputs, for the each channel of the stereo in units of frames having a predetermined time length of 20 ms, for example, a compensated decoded sound signal of the channel, which is a sound signal obtained by compensating the high-frequency energy of the purified decoded sound signal of the channel, by using the purified decoded sound signal of the channel, the decoded sound signal of the channel, the upmixed monaural decoded sound signal of the channel, and the bit rate information. Assuming that the channel number n (channel index n) of the first channel is 1 and the channel number n of the second channel is 2, the sound signal high-frequency compensation device 203 performs steps S233-*n*, S213-*n*, and S223-*n* illustrated in FIG. 23 for the each channel for the each frame.

[n-th Channel Signal Selection Unit 233-*n*]

To the n-th channel signal selection unit 233-*n*, the n-th channel decoded sound signal $\hat{X}_n=\{\hat{x}_n(1), \hat{x}_n(2), \ldots, \hat{x}_n(T)\}$ input to the sound signal high-frequency compensation device 203, the n-th channel upmixed monaural decoded sound signal $\hat{X}_{Mn}=\{\hat{x}_{Mn}(1), \hat{x}_{Mn}(2), \ldots, \hat{x}_{Mn}(T)\}$ input to the sound signal high-frequency compensation device 203, and the bit rate information input to the sound signal high-frequency compensation device 203 are input. However, in a case where the bit rate information is stored in advance in the storage unit, which is not illustrated, in the n-th channel signal selection unit 233-*n*, the bit rate information may not be input. In a case where the bit rates per channel of the stereo encoding unit 530 and the stereo decoding unit 620 are higher than the bit rates of the monaural encoding unit 520 and the monaural decoding unit 610, that is, in a case where $b_n$ is larger than $b_M$, the n-th channel signal selection unit 233-*n* selects the n-th channel decoded sound signal $\hat{X}_n=\{\hat{x}_n(1), \hat{x}_n(2), \ldots, \hat{x}_n(T)\}$ and outputs the selected signal as the n-th channel selection signal $\hat{X}_{Sn}=\{\hat{x}_{Sn}(1), \hat{x}_{Sn}(2), \ldots, \hat{x}_{Sn}(T)\}$, and in a case where the bit rates per channel of the stereo encoding unit 530 and the stereo decoding unit 620 are lower than the bit rates of the monaural encoding unit 520 and the monaural decoding unit 610, that is, in a case where $b_n$ is smaller than $b_M$, the n-th channel signal selection unit 233-*n* selects the n-th channel upmixed monaural decoded sound signal $\hat{X}_{Mn}=\{\hat{x}_{Mn}(1), \hat{x}_{Mn}(2), \ldots, \hat{x}_{Mn}(T)\}$ and outputs the selected signal as the n-th channel selection signal $\hat{X}_{Sn}=\{\hat{x}_{Sn}(1), \hat{x}_{Sn}(2), \ldots, \hat{x}_{Sn}(T)\}$ (step S233-*n*). In a case where the bit rates of the monaural encoding unit 520 and the monaural decoding unit 610 and the bit rates per channel of the stereo encoding unit 530 and the stereo decoding unit 620 are equal, that is, in a case where $b_M$ and $b_n$ have the same value, the n-th channel signal selection unit 233-*n* may select either the n-th channel decoded sound signal $\hat{X}_n=\{\hat{x}_n(1), \hat{x}_n(2), \ldots, \hat{x}_n(T)\}$ or the n-th channel upmixed monaural decoded sound signal $\hat{X}_{Mn}=\{\hat{x}_{Mn}(1), \hat{x}_{Mn}(2), \ldots, \hat{x}_{Mn}(T)\}$ and output the selected signal as the n-th channel selection signal $\hat{X}_{Sn}=\{\hat{x}_{Sn}(1), \hat{x}_{Sn}(2), \ldots, \hat{x}_{Sn}(T)\}$.

[n-th Channel High-Frequency Compensation Gain Estimation Unit 213-*n*]

At least the n-th channel decoded sound signal $\hat{X}_n=\{\hat{x}_n(1), \hat{x}_n(2), \ldots, \hat{x}_n(T)\}$ input to the sound signal high-frequency compensation device 203 and the n-th channel purified decoded sound signal $\tilde{X}_n=\{\tilde{x}_n(1), \tilde{x}_n(2), \ldots, \tilde{x}_n(T)\}$ input to the sound signal high-frequency compensation device 203 are input to the n-th channel high-frequency compensation gain estimation unit 213-*n*. The n-th channel high-frequency compensation gain estimation unit 213-*n* obtains and outputs the n-th channel high-frequency compensation gain $\rho_n$ by using at least the n-th channel decoded sound signal $\hat{X}_n$ and the n-th channel purified decoded sound signal $\tilde{X}_n$ (step S213-*n*). The n-th channel high-frequency compensation gain estimation unit 213-*n* obtains the n-th channel high-frequency compensation gain $\rho_n$ by, for example, the first method described in the ninth embodiment or the following second method.

[[Second Method for Obtaining n-th Channel High-Frequency Compensation Gain $\rho_n$]]

In the case of using the second method, as indicated by a broken line in FIG. 22, the n-th channel selection signal $\hat{X}_{Sn}=\{\hat{x}_{Sn}(1), \hat{x}_{Sn}(2), \ldots, \hat{x}_{Sn}(T)\}$ obtained by the n-th channel signal selection unit 233-*n* is also input to the n-th channel high-frequency compensation gain estimation unit 213-*n*. In the second method, the n-th channel high-frequency compensation gain estimation unit 213-*n* obtains the n-th channel high-frequency compensation gain $\rho_n$ by, for example, performing the following step S213-21-*n* instead of step S211-21-*n* of the second method of the ninth embodiment, and then performing the same steps S211-22-*n* and S211-23-*n* as those in the second method of the ninth embodiment. That is, the n-th channel high-frequency compensation gain estimation unit 213-*n* first passes the n-th channel selection signal $\hat{X}_{Sn}=\{\hat{x}_{Sn}(1), \hat{x}_{Sn}(2), \ldots, \hat{x}_{Sn}(T)\}$ through a high-pass filter having the same characteristics as those used by the n-th channel high-frequency compensation unit 223-*n* to obtain the n-th channel compensation signal $\hat{X}'_n=\{\hat{x}'_n(1), \hat{x}'_n(2), \ldots, x'_n(T)\}$ (step S213-21-*n*), and then performs step S211-22-*n* and step S211-23-*n* described above in the description of the second method of the ninth embodiment.

[n-th Channel High-Frequency Compensation Unit 223-*n*]

The n-th channel high-frequency compensation unit 223-*n* obtains the n-th channel compensated decoded sound signal $\tilde{X}'_n$ using the n-th channel selection signal $\hat{X}_{Sn}$. The n-th channel selection signal $\hat{X}_{Sn}=\{\hat{x}_{Sn}(1), \hat{x}_{Sn}(2), \ldots, \hat{x}_{Sn}(T)\}$ obtained by the n-th channel signal selection unit 233-*n*, the n-th channel purified decoded sound signal $\tilde{X}_n=\{\tilde{x}_n(1), \tilde{x}_n(2), \ldots, \tilde{x}_n(T)\}$ input to the sound signal high-frequency compensation device 203, and the n-th channel high-frequency compensation gain $\rho_n$ output by the n-th channel high-frequency compensation gain estimation unit 213-*n* are input to the n-th channel high-frequency compensation unit 223-*n*. The n-th channel high-frequency compensation unit 223-*n* obtains and outputs a signal obtained by adding the n-th channel purified decoded sound signal $\tilde{X}_n$ and a signal obtained by multiplying the high-frequency component of the n-th channel selection signal $\hat{X}_{Sn}$ by the n-th channel high-frequency compensation gain $\rho_n$, as the n-th channel compensated decoded sound signal $\tilde{X}'_n=\{\tilde{x}'_n(1), \tilde{x}_n'(2), \ldots, \tilde{x}'_n(T)\}$ (step S223-*n*).

For example, the n-th channel high-frequency compensation unit 223-*n* passes the n-th channel selection signal $\hat{X}_{Sn}$ through a high-pass filter to obtain an n-th channel compensation signal $\hat{X}'_n=\{\hat{x}'_n(1), \hat{x}'_n(2), \ldots, \hat{x}'_n(T)\}$ and, for each corresponding sample t, obtains and outputs a sequence based on a value $\tilde{x}'_n(t)$ obtained by adding the sample value $\tilde{x}_n(t)$ of the n-th channel purified decoded sound signal $\tilde{X}_n$ and a value $\rho_n \times x'_n(t)$ obtained by multiplying the n-th channel high-frequency compensation gain $\rho_n$ by the sample value $\hat{x}'_n(t)$ of the n-th channel compensation signal $\hat{X}'_n$ as the n-th channel compensated decoded sound signal $\tilde{X}'_n=\{\tilde{x}'_n(1), \tilde{x}'_n(2), \ldots, \tilde{x}'_n(T)\}$. That is, $\tilde{x}'_n(t)=\tilde{x}_n(t)+\rho_n \times \hat{x}'_n(t)$.

Note that, as in the ninth embodiment and the tenth embodiment, in a case where the n-th channel high-frequency compensation gain estimation unit 213-*n* uses the method exemplified in the [[Second Method for Obtaining n-th Channel High-frequency Compensation Gain $\rho_n$]], one of the n-th channel high-frequency compensation gain estimation unit 213-*n* and the n-th channel high-frequency compensation unit 223-*n* may pass the n-th channel selection signal $\hat{X}_{Sn}$ through the high-pass filter to obtain and output the n-th channel compensation signal $\hat{X}'_n$, and the other may use the n-th channel compensation signal $\hat{X}'_n$ obtained by the other without performing the high-pass filter processing for obtaining the n-th channel compensation signal $\hat{X}'_n$. In addition, the signal high-frequency compensation device 203 may include a high-pass filter unit, which is not illustrated, the high-pass filter unit may pass the n-th channel selection signal $\hat{X}_{Sn}$ through the high-pass filter to obtain and output the n-th channel compensation signal $\hat{X}'_n$, and the n-th channel high-frequency compensation gain estimation unit 213-*n* and the n-th channel high-frequency compensation unit 223-*n* may use the n-th channel compensation signal $\hat{X}'_n$ obtained by the high-pass filter unit without performing the high-pass filter processing for obtaining the n-th channel compensation signal $\hat{X}'_n$. That is, the signal high-frequency compensation device 203 may employ any configuration as long as the n-th channel high-frequency compensation gain estimation unit 213-*n* and the n-th channel high-frequency compensation unit 223-*n* can use a signal obtained by passing the n-th channel selection signal $\hat{X}_{Sn}$ through the high-pass filter as the n-th channel compensation signal $\hat{X}'_n$.

Modification Example of Eleventh Embodiment

In the eleventh embodiment, the case where the sound signal purification device includes the monaural decoded sound upmixing unit and obtains the upmixed monaural decoded sound signal $\hat{X}_{Mn}$ of the each channel has been described, but in a case where the sound signal purification device does not include the monaural decoded sound upmixing unit and does not obtain the upmixed monaural decoded sound signal $\hat{X}_{Mn}$ of the each channel, the sound signal purification device 203 is only required to use the monaural decoded sound signal $\hat{X}_M$ output by the monaural decoding unit 610 of the decoding device 600 instead of the upmixed monaural decoded sound signal $\hat{X}_{Mn}$ of the each channel that has been used in the eleventh embodiment. In addition, even in the case where the sound signal purification device includes the monaural decoded sound upmixing unit and obtains the upmixed monaural decoded sound signal $\hat{X}_{Mn}$ of the each channel, the sound signal purification device 203 may use the monaural decoded sound signal $\hat{X}_M$ output by the monaural decoding unit 610 of the decoding device 600 instead of the upmixed monaural decoded sound signal $\hat{X}_{Mn}$ of the each channel that has been used in the eleventh embodiment.

Twelfth Embodiment

Various modes based on the above-described embodiments and modification examples will be described as a twelfth embodiment.

[Number of Channels]

In each of the above-described embodiments and modification examples, the description has been given with an example of handling two channels in order to simplify the description. However, the number of channels is not limited to this, and is only required to be 2 or more. Assuming that the number of channels is N (N is an integer of 2 or more), the above-described embodiments and modification examples can be implemented by replacing two as the number of channels with N. Specifically, in each of the above-described embodiments and modification examples, each unit/step to which "−n" is attached includes N units/steps corresponding to the each channel from 1 to N, and each unit/step to which a notation of a suffix or the like with "n" is attached includes N units/steps corresponding to each channel number from 1 to N, and thus a sound signal purification device with the number N of channels or a sound signal high-frequency compensation device with the number N of channels can be provided. However, a portion including the processing exemplified using the inter-channel time difference $\tau$ and the inter-channel correlation coefficient $\gamma$ in each embodiment and modification example of the sound signal purification device described above may be limited to two channels.

[Sound Signal Post-Processing Device]

Figure 24:
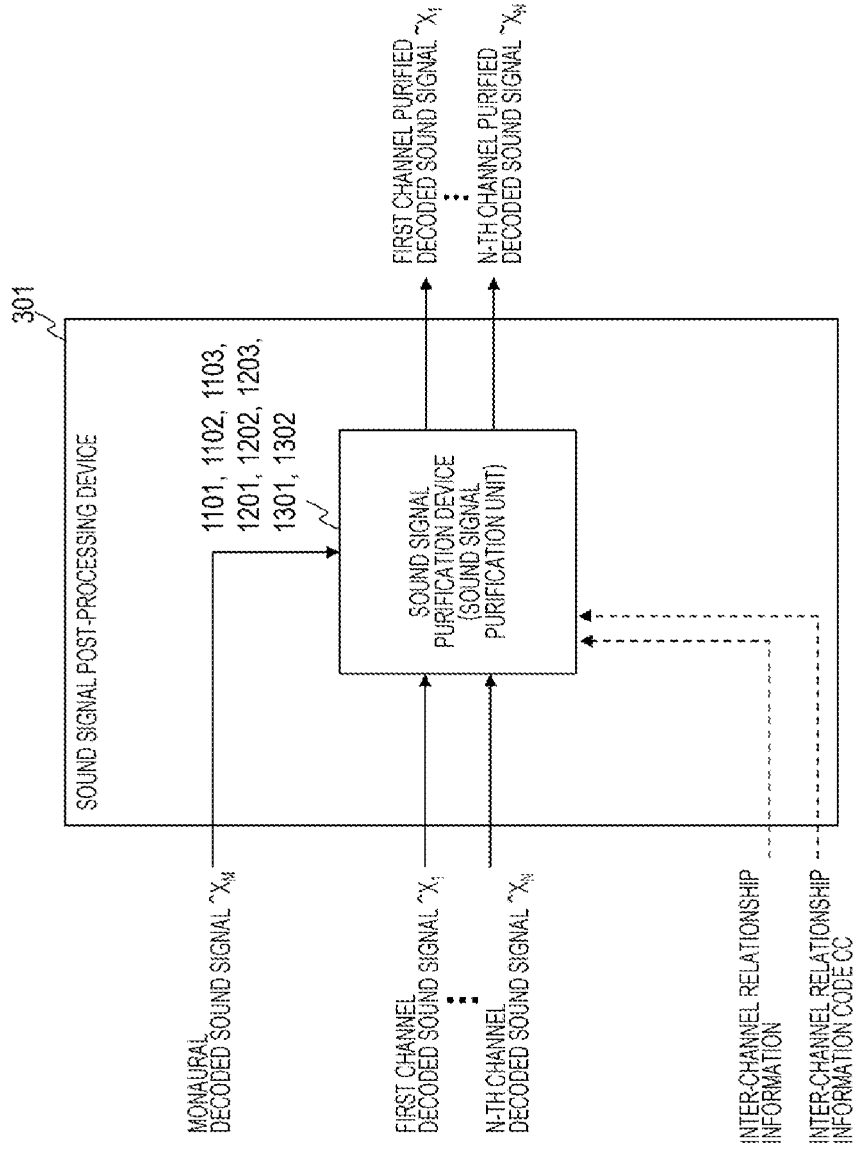
FIG. 24 is a block diagram illustrating an example of a sound signal post-processing device 301.
Figure 25:
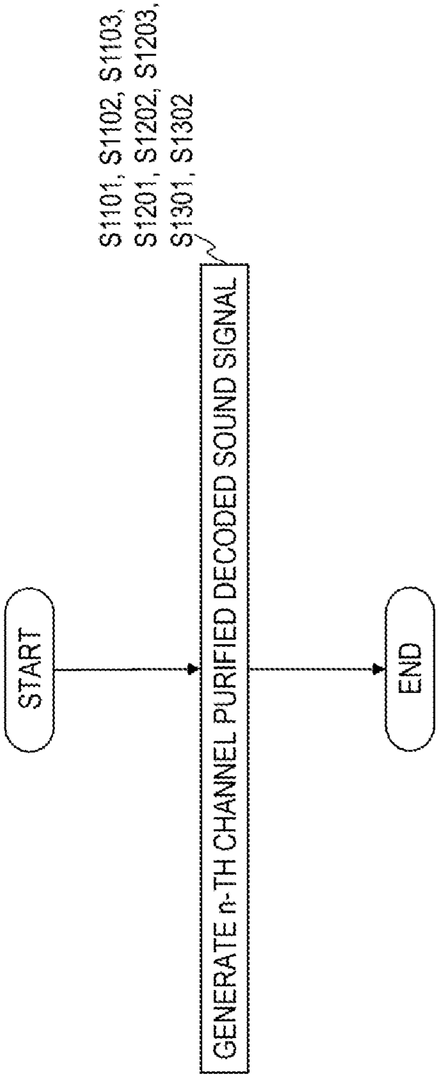
FIG. 25 is a flowchart illustrating an example of processing of the sound signal post-processing device 301.

The sound signal purification device of any one of the first to eighth embodiments and the respective modification examples is a device that processes a sound signal obtained by decoding, and thus can be said to be a sound signal post-processing device. That is, as illustrated in FIG. 24, any of the sound signal purification devices 1101, 1102, 1103, 1201, 1202, 1203, 1301, and 1302 of the first to eighth embodiments and the respective modification examples can be said to be a sound signal post-processing device 301 (see also FIG. 25). Further, as illustrated in FIG. 24, a device including any one of the sound signal purification devices 1101, 1102, 1103, 1201, 1202, 1203, 1301, and 1302 of the first to eighth embodiments and the respective modification examples as a sound signal purification unit can be said to be the sound signal post-processing device 301.

Figure 26:
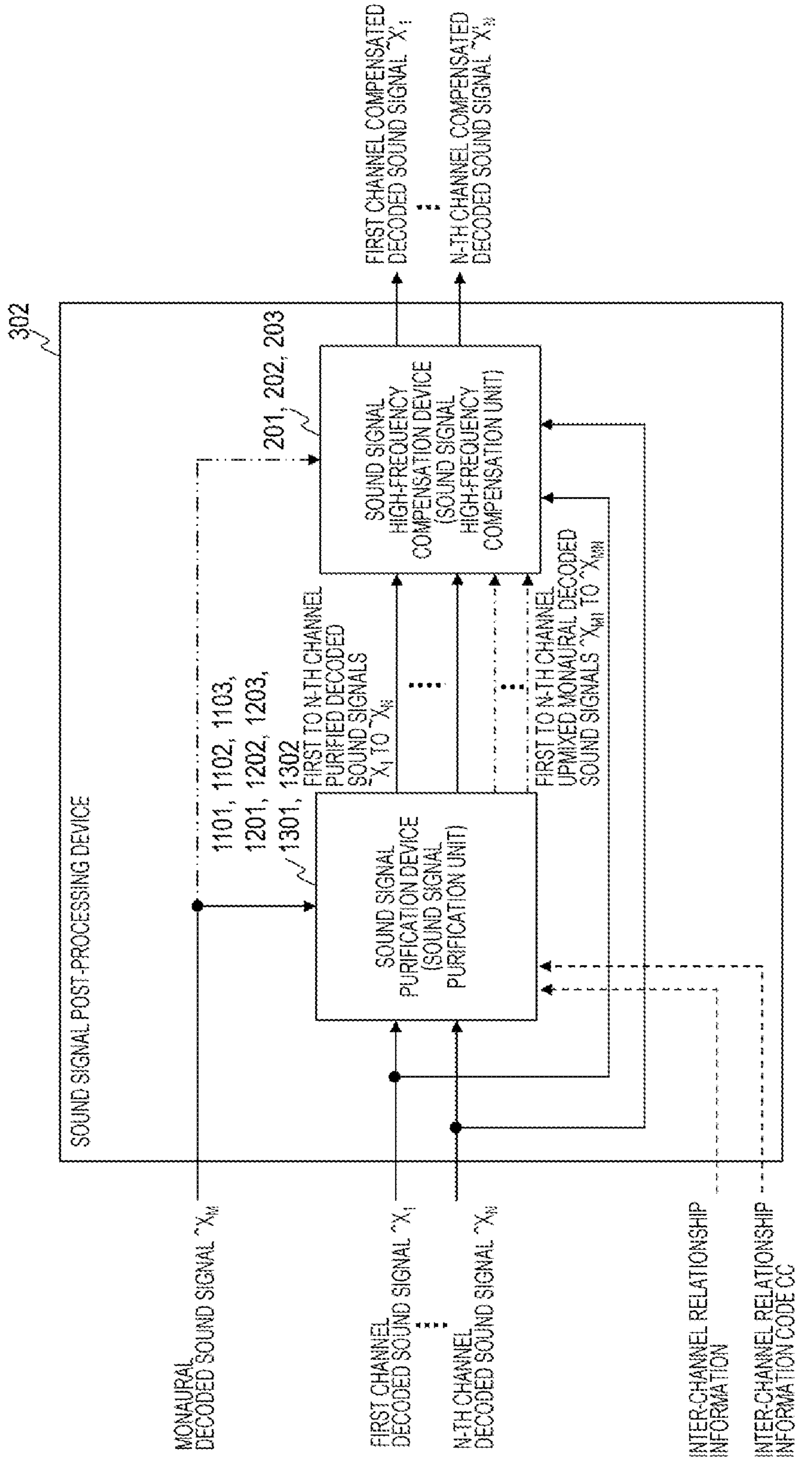
FIG. 26 is a block diagram illustrating an example of a sound signal post-processing device 302.
Figure 27:
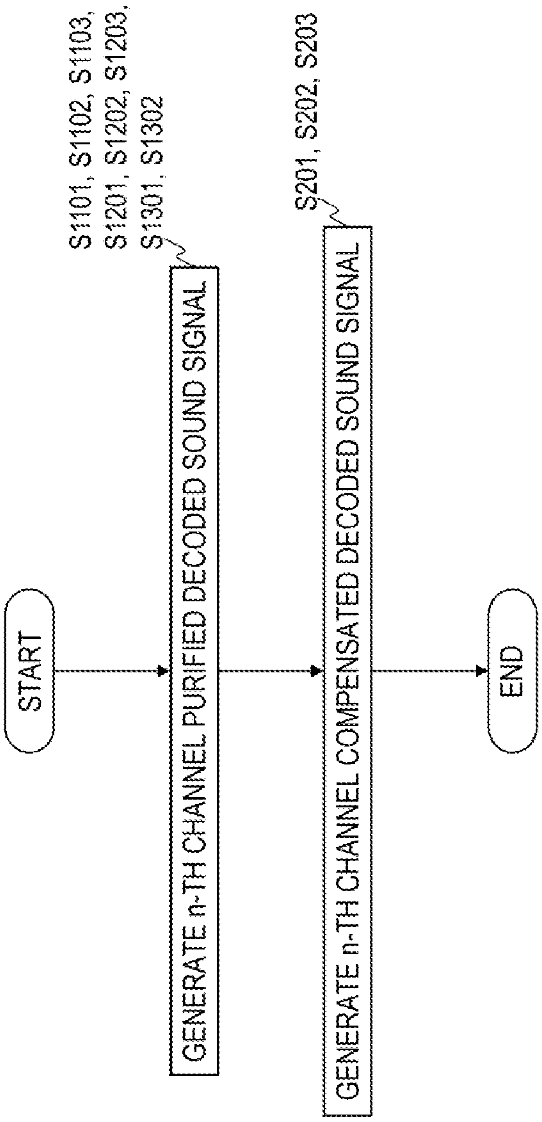
FIG. 27 is a flowchart illustrating an example of processing of the sound signal post-processing device 302.

Similarly, a device obtained by combining the sound signal purification device of any one of the first to eighth embodiments and the respective modification examples and the sound signal high-frequency compensation device of any one of the ninth to eleventh embodiments and the respective modification examples is also a device that processes a sound signal obtained by decoding, and thus can be said to be a sound signal post-processing device. That is, as illustrated in FIG. 26, a device obtained by combining any one of the sound signal purification devices 1101, 1102, 1103, 1201, 1202, 1203, 1301, and 1302 of the first to eighth embodiments and the respective modification examples and any one of the sound signal high-frequency compensation devices 201, 202, and 203 of the ninth to eleventh embodiments and the respective modification examples can be said to be a sound signal post-processing device 302 (see also FIG. 27). In addition, as illustrated in FIG. 26, a device including any one of the sound signal purification devices 1101, 1102, 1103, 1201, 1202, 1203, 1301, and 1302 of the first to eighth embodiments and the respective modification examples as a sound signal purification unit and including any one of the sound signal high-frequency compensation devices 201, 202, and 203 of the ninth to eleventh embodiments and the respective modification examples as a sound signal high-frequency compensation unit can be said to be the sound signal post-processing device 302.

[Sound Signal Decoding Device]

Figure 28:
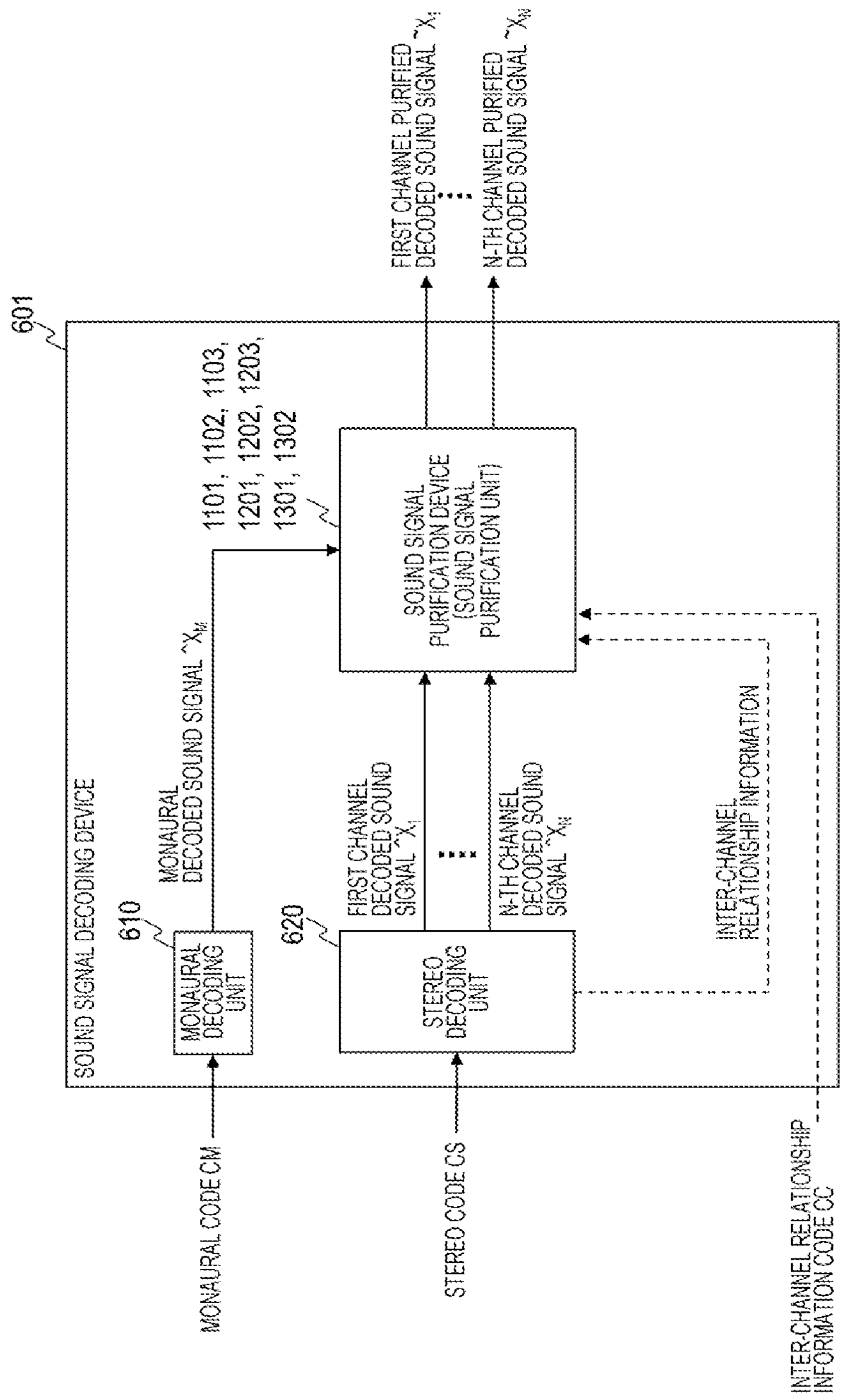
FIG. 28 is a block diagram illustrating an example of a sound signal decoding device 601.
Figure 29:
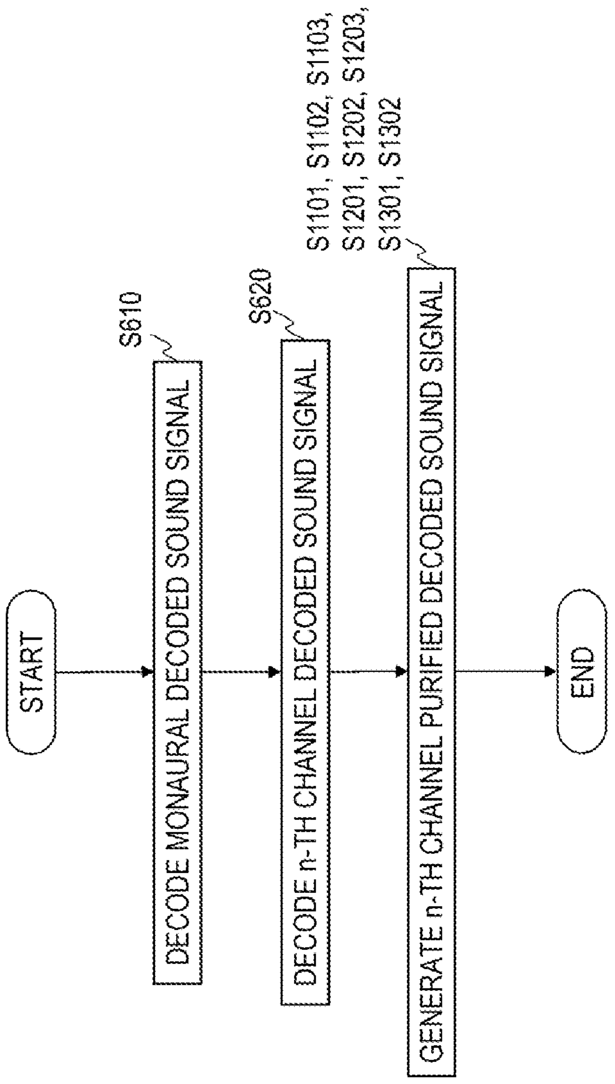
FIG. 29 is a flowchart illustrating an example of processing of the sound signal decoding device 601.

The sound signal purification device of any one of the first to eighth embodiments and the respective modification examples can be included in the sound signal decoding device together with the monaural decoding unit 610 and the stereo decoding unit 620. That is, as illustrated in FIG. 28, a sound signal decoding device 601 may be configured to include the monaural decoding unit 610, the stereo decoding unit 620, and any one of the sound signal purification devices 1101, 1102, 1103, 1201, 1202, 1203, 1301, and 1302 of the first to eighth embodiments and the respective modification examples (see also FIG. 29). In addition, as illustrated in FIG. 28, in addition to the monaural decoding unit 610 and the stereo decoding unit 620, the sound signal decoding device 601 may be configured to include any one of the sound signal purification devices 1101, 1102, 1103, 1201, 1202, 1203, 1301, and 1302 of the first to eighth embodiments and the respective modification examples as a sound signal purification unit.

Figure 30:
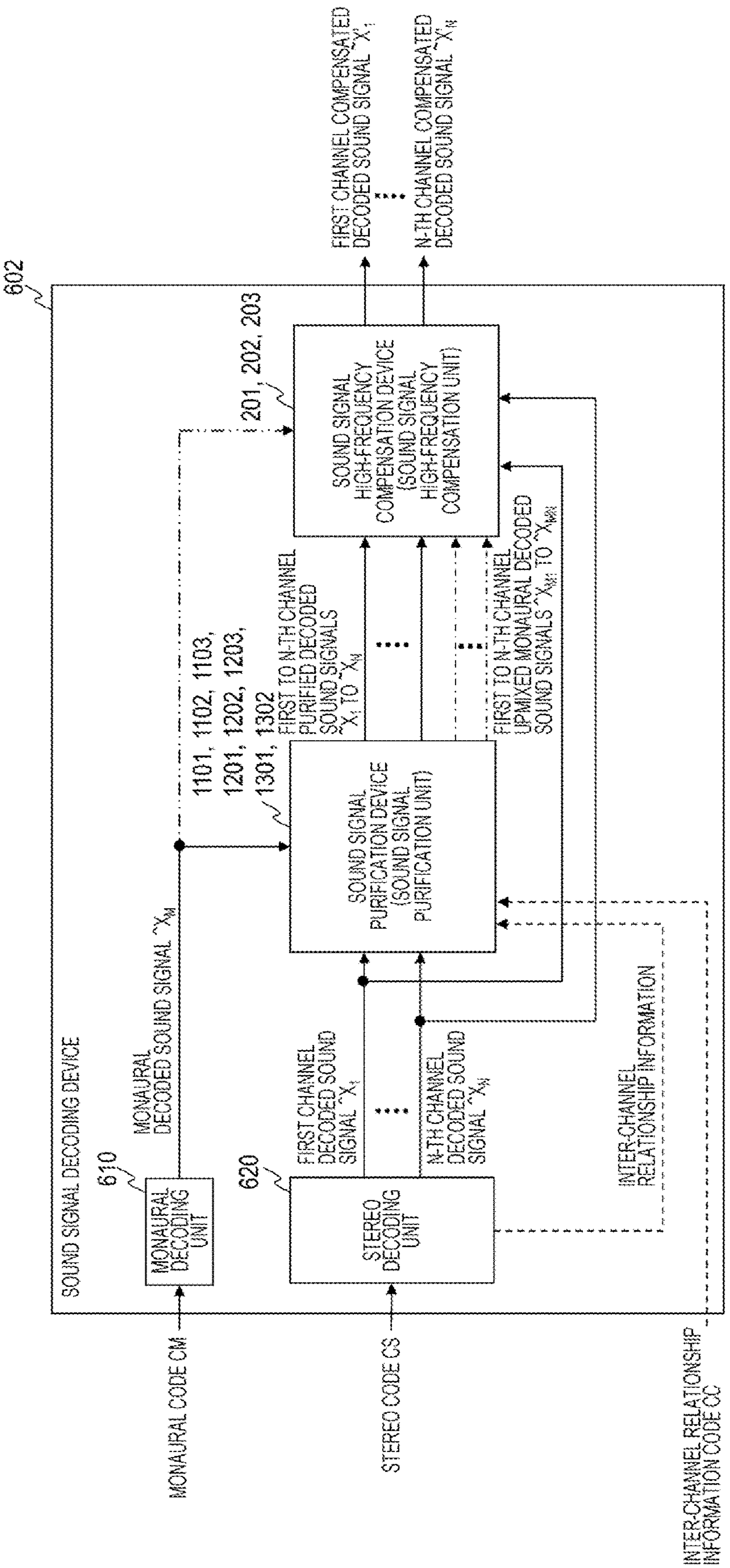
FIG. 30 is a block diagram illustrating an example of a sound signal decoding device 602.
Figure 31:
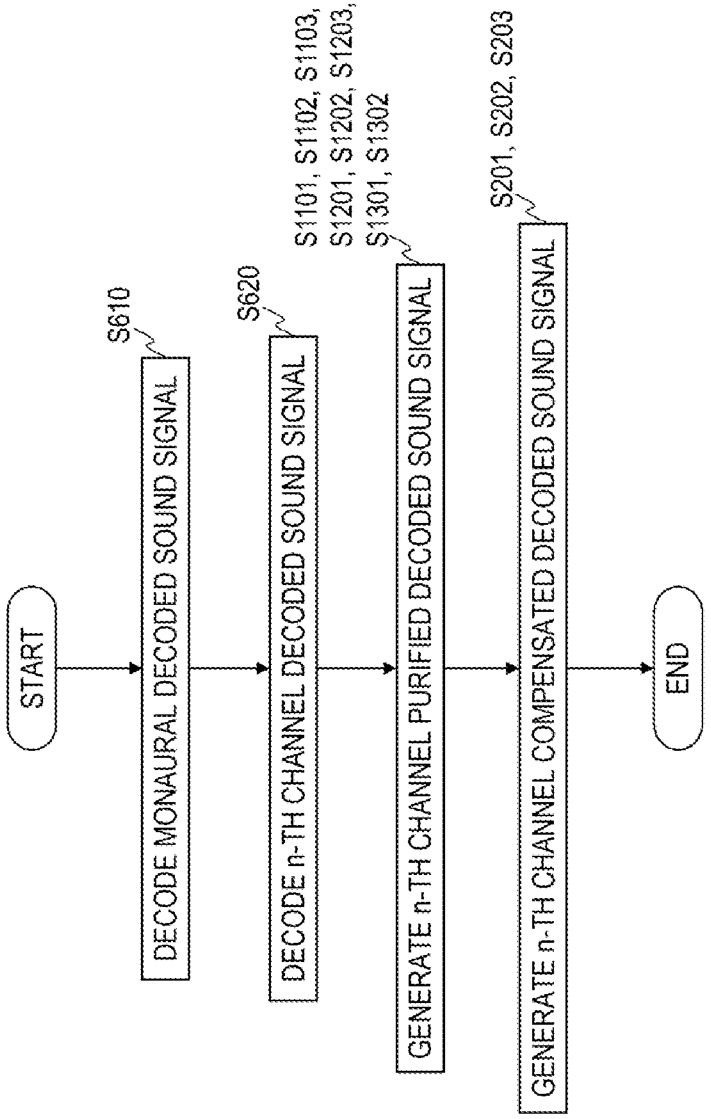
FIG. 31 is a flowchart illustrating an example of processing of the sound signal decoding device 602.

Similarly, a combination of the sound signal purification device of any one of the first to eighth embodiments and the respective modification examples and the sound signal high-frequency compensation device of any one of the ninth to eleventh embodiments and the respective modification examples can be included in the sound signal decoding device together with the monaural decoding unit 610 and the stereo decoding unit 620. That is, as illustrated in FIG. 30, the sound signal decoding device 602 may be configured to include the monaural decoding unit 610, the stereo decoding unit 620, any one of the sound signal purification devices 1101, 1102, 1103, 1201, 1202, 1203, 1301, and 1302 of the first to eighth embodiments and the respective modification examples, and any one of the sound signal high-frequency compensation devices 201, 202, and 203 of the ninth to eleventh embodiments and the respective modification examples (see also FIG. 31). In addition, as illustrated in FIG. 30, in addition to the monaural decoding unit 610 and the stereo decoding unit 620, the sound signal decoding device 602 may be configured to include any one of the sound signal purification devices 1101, 1102, 1103, 1201, 1202, 1203, 1301, and 1302 of the first to eighth embodiments and the respective modification examples as a sound signal purification unit, and include any one of the sound signal high-frequency compensation devices 201, 202, and 203 of the ninth to eleventh embodiments and the respective modification examples as a sound signal high-frequency compensation unit.

[Program and Recording Medium]

Figure 33:
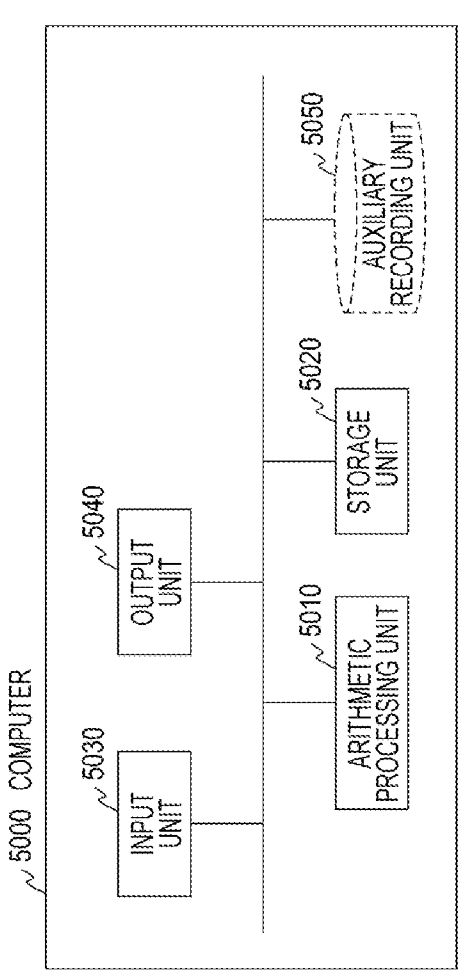
FIG. 33 is a diagram illustrating an example of a functional configuration of a computer that implements respective devices in embodiments of the present invention.

The processing of each unit of each device described above may be implemented by a computer, in which case, processing content of a function that each device should have is described by a program. Then, by causing a storage unit 5020 of a computer 5000 illustrated in FIG. 33 to read this program and causing an arithmetic processing unit 5010, an input unit 5030, an output unit 5040, and the like to operate, various processing functions in the above devices are implemented on the computer.

The program describing the processing content can be recorded in a computer-readable recording medium. The computer-readable recording medium is, for example, a non-transitory recording medium and is specifically a magnetic recording device, an optical disk, or the like.

Further, distribution of the program is carried out by, for example, selling, transferring, renting, or the like of a portable recording medium such as a DVD or a CD-ROM in which the program is recorded. Furthermore, the program may be stored in a storage device of a server computer, and the program may be distributed by transferring the program from the server computer to another computer via a network.

For example, the computer that executes such a program, first, temporarily stores the program recorded in a portable recording medium or the program transferred from a server computer in an auxiliary recording unit 5050 that is a non-transitory storage device of the computer. Then, at the time of executing the processing, the computer reads the program stored in the auxiliary recording unit 5050, which is the non-temporary storage device of the computer, into the storage unit 5020 and executes the processing in accordance with the read program. In addition, as another embodiment of the program, the computer may directly read the program from the portable recording medium into the storage unit 5020 and execute processing in accordance with the program, and furthermore, the computer may sequentially execute processing in accordance with the received program each time the program is transferred from the server computer to the computer. Furthermore, the above-described processing may be executed by a so-called application service provider (ASP) type service that implements a processing function only by an execution instruction and result acquisition without transferring the program from the server computer to the computer. Note that the program in the present embodiment includes information used for processing by an electronic computer and equivalent to the program (data or the like that is not direct command to computer but has property that defines processing of the computer).

Furthermore, while the present device is configured by executing a predetermined program on a computer in this embodiment, at least some of the processing contents may be implemented by hardware.

In addition, it goes without saying that modifications can be appropriately made without departing from the gist of the present invention. Further, the processing described in the above embodiment may be executed not only in chronological order according to the described order, but also in parallel or individually according to the processing capability of the device that executes the processing or as necessary. Furthermore, the processing described in the above embodiment may be executed not only in chronological order according to the order of description, but also in chronological order in the order opposite to the order of description in a case where the order of execution may be switched.

The invention claimed is:

1. A sound signal purification method for obtaining, a purified decoded sound signal representing a sound signal of a channel of stereo, the sound signal purification method comprising:

a decoded sound common signal estimation step of obtaining, for each frame, a decoded sound common signal $\hat{Y}_M$ that is a signal common to all channels of the stereo by using at least all of one or more and N or less n-th channel decoded sound signals $\hat{X}_n$, wherein n represents each integer of 1 or more and N or less, the n-th channel decoded sound signal $\hat{X}_n$ represents a decoded sound signal of the each channel of the stereo, the n-th channel decoded sound signal $\hat{X}_n$ is obtained by decoding a stereo code CS and a monaural decoded sound signal $\hat{X}_M$ represents a monaural decoded sound signal, the monaural decoded sound signal $\hat{X}_M$ is obtained by decoding a monaural code CM that is a code different from the stereo code CS, the n-th channel decoded sound signal $\hat{X}_n$ is obtained by decoding the stereo code CS without using either information obtained by decoding the monaural code CM or the monaural code CM;

a decoded sound common signal upmixing step of obtaining, for the each frame, an n-th channel upmixed common signal $\hat{Y}_{Mn}$, wherein the n-th channel upmixed common signal $\hat{Y}_{Mn}$ is obtained by upmixing the decoded sound common signal $\hat{Y}_M$ for the each channel by an upmixing process using the decoded sound common signal $\hat{Y}_M$ and inter-channel relationship information, and the inter-channel relationship information indicates a relationship between the channels of the stereo;

a monaural decoded sound upmixing step of obtaining, for the each frame, an n-th channel upmixed monaural decoded sound signal $\hat{X}_{Mn}$, wherein the n-th channel upmixed monaural decoded sound signal $\hat{X}_{Mn}$ is obtained by upmixing the monaural decoded sound signal $\hat{X}_M$ for the each channel by an upmixing process using the monaural decoded sound signal $\hat{X}_M$ and the inter-channel relationship information;

an n-th channel signal purification step of obtaining, for the each frame and for each corresponding sample t with respect to the each channel n, a sequence based on a value $\tilde{y}_{Mn}(t)=(1-\alpha_{Mn})\times\hat{y}_{Mn}(t)+\alpha_{Mn}\times\hat{x}_{Mn}(t)$ as an n-th channel purified upmixed signal $\tilde{Y}_{Mn}$, wherein the value $\tilde{y}_{Mn}(t)$ is obtained by adding a value $\alpha_{Mn}\times\hat{X}_{Mn}(t)$ and a value $(1-\alpha_{Mn})\times\hat{y}_{Mn}(t)$, the value $\alpha_{Mn}\times\hat{X}_{Mn}(t)$ is obtained by multiplying an n-th channel purification weight $\alpha_{Mn}$ by a sample value $\hat{x}_{Mn}(t)$ of the n-th channel upmixed monaural decoded sound signal $\hat{X}_{Mn}$, the value $(1-\alpha_{Mn})\times\hat{y}_{Mn}(t)$ is obtained by multiplying a value $(1-\alpha_{Mn})$ by a sample value $\hat{y}_{Mn}(t)$ of the n-th channel upmixed common signal $\hat{Y}_{Mn}$, and the value $(1-\alpha_{Mn})$ is obtained by subtracting the n-th channel purification weight $\alpha_{Mn}$ from 1;

an n-th channel separation combination weight estimation step of obtaining, for the each frame with respect to the each channel n, a normalized inner product value for the n-th channel upmixed common signal $\hat{Y}_{Mn}$ of the n-th channel decoded sound signal $\hat{X}_n$ as an n-th channel separation combination weight $\beta_n$; and an n-th channel separation combination step of obtaining, for the each frame and for each corresponding sample t with respect to the each channel n, a sequence based on a value $\tilde{x}_n(t)=\hat{x}_n(t)-\beta_n\times\hat{y}_{Mn}(t)+\beta_n\times\tilde{y}_{Mn}(t)$ as an n-th channel purified decoded sound signal $\tilde{X}_n$, wherein the value $\tilde{x}_n(t)$ is obtained by subtracting a value $\beta_n \times \hat{y}_{Mn}(t)$ from a sample value $\hat{x}_n(t)$ of the n-th channel decoded sound signal $\hat{X}_n$ and adding a value $\beta_n \times \tilde{y}_{Mn}(t)$, the value $\beta_n \times \hat{y}_{Mn}(t)$ is obtained by multiplying the n-th channel separation combination weight $\beta_n$ by the sample value $\hat{y}_{Mn}(t)$ of the n-th channel upmixed common signal $\hat{Y}_{Mn}$, and the value $\beta_n \times \tilde{y}_{Mn}(t)$ is obtained by multiplying the n-th channel separation combination weight $\beta_n$ by a sample value $\tilde{y}_{Mn}(t)$ of the n-th channel purified upmixed signal $\tilde{Y}_{Mn}$.

2. The sound signal purification method according to claim 1, wherein the decoded sound common signal estimation step further comprises operations to obtain a weighting coefficient that minimizes a difference between a weighted average of the decoded sound signals $\hat{X}_1, \ldots, \hat{X}_N$ of all channels from a first to an N-th channel and the monaural decoded sound signal $\hat{X}_M$, and obtain, as the decoded sound common signal $\hat{Y}_M$, the weighted average of the decoded sound signals $\hat{X}_1, \ldots, \hat{X}_N$ of all the channels from the first to the N-th channel using the obtained weighting coefficient.

3. The sound signal purification method according to claim 1, wherein a number N of the channels is two, the inter-channel relationship information includes information indicating a number of samples $|\tau|$ corresponding to a time difference between channels of a first channel and a second channel and information indicating which of the first channel and the second channel is preceding, and the decoded sound common signal upmixing step further comprises operations to obtain the decoded sound common signal without change as the first channel upmixed common signal $\hat{Y}_{M1}$ and obtain a signal obtained by delaying the decoded sound common signal by $|\tau|$ samples as the second channel upmixed common signal $\hat{Y}_{M2}$ in a case where the first channel is preceding, and obtain a signal obtained by delaying the decoded sound common signal by $|\tau|$ samples as the first channel upmixed common signal $\hat{Y}_{M1}$ and obtain the decoded sound common signal without change as the second channel upmixed common signal $\hat{Y}_{M2}$ in a case where the second channel is preceding.

4. The sound signal purification method according to claim 1, further comprising an n-th channel purification weight estimation step of obtaining, for the each frame with respect to the each channel n, the n-th channel purification weight $\alpha_{Mn}$ b $$\alpha_{Mn} = \frac{2^{-\frac{2b_m}{T}}}{2^{-\frac{2b_m}{T}} + 2^{-\frac{2b_M}{T}}}$$

using a number of samples T per frame, a number of bits $b_m$ corresponding to a common signal in a number of bits of the stereo code CS, and a number of bits $b_M$ of the monaural code CM.

5. The sound signal purification method according to claim 1, further comprising an n-th channel purification weight estimation step of obtaining, for the each frame with respect to the each channel n, a value that is larger than 0 and smaller than 1, 0.5 when $b_m$ and $b_M$ are equal, closer to 0 than 0.5 as $b_m$ is larger than $b_M$, and closer to 1 than 0.5 as $b_M$ is larger than $b_m$ by using at least a number of bits $b_m$ corresponding to a common signal in a number of bits of the stereo code CS, and a number of bits $b_M$ of the monaural code CM, as the n-th channel purification weight $\alpha_{Mn}$.

6. The sound signal purification method according to claim 1, further comprising an n-th channel purification weight estimation step of obtaining, for the each frame with respect to the each channel n, with a number of bits corresponding to a common signal in a number of bits of the stereo code CS as $b_m$ and a number of bits of the monaural code CM as $b_M$, a value $c_n \times r_n$ obtained by multiplying $r_n$ that is a value closer to 1 as a correlation between the n-th channel upmixed common signal $\hat{Y}_{Mn}$ and the n-th channel upmixed monaural decoded sound signal $\hat{X}_{Mn}$ is higher, and closer to 0 as the correlation is lower by a correction coefficient $c_n$ that is a value larger than 0 and smaller than 1, 0.5 when $b_m$ and $b_M$ are equal, closer to 0 than 0.5 as $b_m$ is larger than $b_M$, and closer to 1 than 0.5 as $b_m$ is smaller than $b_M$, as the n-th channel purification weight $\alpha_{Mn}$.

7. The sound signal purification method according to claim 1, wherein

T is a number of samples per frame and each of $\varepsilon_n$ and $\varepsilon_{Mn}$ is a value larger than 0 and smaller than 1, and the sound signal purification method further comprises an n-th channel purification weight estimation step of obtaining, for the each frame with respect to the each channel n, a value $c_n \times r_n$ obtained by multiplying a normalized inner product value $r_n$ obtained by $$r_n = E_n(0)/E_{Mn}(0)$$

using an inner product value $E_n(0)$ obtained by $$E_n(0) = \epsilon_n E_n(-1) + \frac{(1-\epsilon_n)}{T}\sum_{t=1}^{T}\hat{y}_{Mn}(t)\hat{x}_{Mn}(t)$$

using each sample value $\hat{y}_{Mn}(t)$ of the n-th channel upmixed common signal $\hat{Y}_{Mn}$, each sample value $\hat{x}_{Mn}(t)$ of the n-th channel upmixed monaural decoded sound signal $\hat{X}_{Mn}$, and an inner product value $E_n(-1)$ of a previous frame, and energy $E_{Mn}(0)$ of the n-th channel upmixed monaural decoded sound signal obtained by $$E_{Mn}(0) = \epsilon_{Mn} E_{Mn}(-1) + \frac{(1-\epsilon_{Mn})}{T}\sum_{t=1}^{T}\hat{x}_{Mn}(t)\hat{x}_{Mn}(t)$$

using the each sample value $\hat{x}_{Mn}(t)$ of the n-th channel upmixed monaural decoded sound signal $\hat{X}_{Mn}$ and energy $E_{Mn}(-1)$ of the n-th channel upmixed monaural decoded sound signal of the previous frame, by a correction coefficient $c_n$ obtained by $$c_n = \frac{2^{-\frac{2b_m}{T}}}{2^{-\frac{2b_m}{T}} + 2^{-\frac{2b_M}{T}}}$$

using a number of samples T per frame, a number of bits $b_m$ corresponding to a common signal in a number of bits of the stereo code CS, and a number of bits $b_M$ of the monaural code CM, as the n-th channel purification weight $\alpha_{Mn}$.

8. A sound signal decoding method comprising the sound signal purification method according to claim 1 as a sound signal purification step, the sound signal decoding method further comprising:

a stereo decoding step of decoding the stereo code CS to obtain the n-th channel decoded sound signal $\hat{X}_n$ of the each channel n without using either information obtained by decoding the monaural code CM or the monaural code CM; and a monaural decoding step of decoding the monaural code CM to obtain the monaural decoded sound signal $\hat{X}_M$.

9. The sound signal purification method according to claim 1, further comprising an n-th channel purification weight estimation step of obtaining, for the each frame with respect to the each channel n, a value $c_n \times r_n$ obtained by multiplying a normalized inner product value $r_n$ for the n-th channel upmixed monaural decoded sound signal $\hat{X}_{Mn}$ of the n-th channel upmixed common signal $\hat{Y}_{Mn}$ by a correction coefficient $c_n$ obtained by $$c_n = \frac{2^{-\frac{2b_m}{T}}}{2^{-\frac{2b_m}{T}} + 2^{-\frac{2b_M}{T}}}$$

using a number of samples T per frame, a number of bits $b_m$ corresponding to a common signal in a number of bits of the stereo code CS, and a number of bits $b_M$ of the monaural code CM, as the n-th channel purification weight $\alpha_{Mn}$.

10. The sound signal purification method according to claim 9, wherein the n-th channel purification weight estimation step further comprises operations to obtain a value $\lambda \times c_n \times r_n$ obtained by multiplying the normalized inner product value $r_n$, the correction coefficient $c_n$, and $\lambda$ that is a predetermined value larger than 0 and smaller than 1 as the n-th channel purification weight $\alpha_{Mn}$.

11. The sound signal purification method according to claim 9, wherein a number N of the channels is two, and the n-th channel purification weight estimation step further comprises operations to obtain a value $\gamma \times c_n \times r_n$ obtained by multiplying the normalized inner product value $r_n$, the correction coefficient $c_n$, and an inter-channel correlation coefficient $\gamma$ that is a correlation coefficient between the first channel decoded sound signal and the second channel decoded sound signal as the n-th channel purification weight $\alpha_{Mn}$.

12. A sound signal purification device for obtaining a purified decoded sound signal, representing a sound signal of a channel of stereo the sound signal purification device comprising:

a decoded sound common signal estimation circuitry configured to obtain, for each frame, a decoded sound common signal $\hat{Y}_M$ that is a signal common to all channels of the stereo by using at least all of one or more and N or less n-th channel decoded sound signals $\hat{X}_n$, wherein n represents each integer of 1 or more and N or less, the n-th channel decoded sound signal $\hat{X}_n$ represents a decoded sound signal of the each channel of the stereo, the n-th channel decoded sound signal $\hat{X}_n$ is obtained by decoding a stereo code CS and a monaural decoded sound signal $\hat{X}_M$ represents a monaural decoded sound signal, the monaural decoded sound signal $\hat{X}_M$ is obtained by decoding a monaural code CM that is a code different from the stereo code CS, the n-th channel decoded sound signal $\hat{X}_n$ is obtained by decoding the stereo code CS without using either information obtained by decoding the monaural code CM or the monaural code CM;

a decoded sound common signal upmixing circuitry configured to obtain, for the each frame, an n-th channel upmixed common signal $\hat{Y}_{Mn}$, wherein the n-th channel upmixed common signal $\hat{Y}_{Mn}$ is obtained by upmixing the decoded sound common signal $\hat{Y}_M$ for the each channel by an upmixing process using the decoded sound common signal $\hat{Y}_M$ and inter-channel relationship information, and the inter-channel relationship information indicates a relationship between the channels of the stereo;

a monaural decoded sound upmixing circuitry configured to obtain, for the each frame, an n-th channel upmixed monaural decoded sound signal $\hat{X}_{Mn}$, wherein the n-th channel upmixed monaural decoded sound signal $\hat{X}_{Mn}$ that is a signal is obtained by upmixing the monaural decoded sound signal $\hat{X}_M$ for the each channel by an upmixing process using the monaural decoded sound signal $\hat{X}_M$ and the inter-channel relationship information;

an n-th channel signal purification circuitry configured to obtain, for the each frame and for each corresponding sample t with respect to the each channel n, a sequence based on a value $\tilde{y}_{Mn}(t)=(1-\alpha_{Mn})\times\hat{y}_{Mn}(t)+\alpha_{Mn}\times\hat{x}_{Mn}(t)$ as an n-th channel purified upmixed signal $\tilde{Y}_{Mn}$, wherein the value $\tilde{y}_{Mn}(t)$ is obtained by adding a value $\alpha_{Mn}\times\hat{x}_{Mn}(t)$ and a value $(1-\alpha_{Mn})\times\hat{y}_{Mn}(t)$, the value $\alpha_{Mn}\times\hat{x}_{Mn}(t)$ is obtained by multiplying an n-th channel purification weight $\alpha_{Mn}$ by a sample value $\Lambda x_{Mn}(t)$ of the n-th channel upmixed monaural decoded sound signal $\hat{X}_{Mn}$, the value $(1-\alpha_{Mn})\times\hat{y}_{Mn}(t)$ is obtained by multiplying a value $(1-\alpha_{Mn})$ by a sample value $\hat{y}_{Mn}(t)$ of the n-th channel upmixed common signal $\hat{Y}_{Mn}$, and the value $(1-\alpha_{Mn})$ is obtained by subtracting the n-th channel purification weight $\alpha_{Mn}$ from 1;

an n-th channel separation combination weight estimation circuitry configured to obtain, for the each frame with respect to the each channel n, a normalized inner product value for the n-th channel upmixed common signal $\hat{Y}_M$ of the n-th channel decoded sound signal $\hat{X}_n$ as an n-th channel separation combination weight $\beta_n$; and an n-th channel separation combination circuitry configured to obtain, for the each frame and for each corresponding sample t with respect to the each channel n, a sequence based on a value $\tilde{x}_n(t)=\hat{X}_n(t)-\beta_n\times\hat{y}_{Mn}(t)+$ $\beta_n\times\tilde{y}_{Mn}$ (t) as an n-th channel purified decoded sound signal $\tilde{X}_n$, wherein the value $\tilde{x}_n(t)$ is obtained by subtracting a value $\beta_n\times\hat{y}_{Mn}(t)$ from a sample value $\hat{X}_n(t)$ of the n-th channel decoded sound signal $\hat{X}_n$ and adding a value $\beta_n\times\tilde{y}_{Mn}(t)$, the value $\beta_n\times\hat{y}_{Mn}$ (t) is obtained by multiplying the n-th channel separation combination weight $\beta_n$ by the sample value $\hat{y}_{Mn}(t)$ of the n-th channel upmixed common signal $\hat{Y}_{Mn}$, and the value $\beta_n\times\tilde{y}_{Mn}(t)$ is obtained by multiplying the n-th channel separation combination weight $\beta_n$ by a sample value $\tilde{y}_{Mn}(t)$ of the n-th channel purified upmixed signal $\tilde{Y}_{Mn}$.

13. A sound signal decoding device comprising the sound signal purification device according to claim 12 as a sound signal purification circuitry, the sound signal decoding device further comprising:

a stereo decoding circuitry configured to decode the stereo code CS to obtain the n-th channel decoded sound signal $\hat{X}_n$ of the each channel n without using either information obtained by decoding the monaural code CM or the monaural code CM; and a monaural decoding circuitry configured to decode the monaural code CM to obtain the monaural decoded sound signal $\hat{X}_M$.

14. A non-transitory computer readable recording medium recording computer-executable program instructions that when executed by a processor cause a computer to execute sound signal purification steps comprising:

a decoded sound common signal estimation step of obtaining, for each frame, a decoded sound common signal $\hat{Y}_M$ that is a signal common to all channels of the stereo by using at least all of one or more and N or less n-th channel decoded sound signals $\hat{X}_n$, wherein n represents each integer of 1 or more and N or less, the n-th channel decoded sound signal $\hat{X}_n$ represents a decoded sound signal of the each channel of the stereo, the n-th channel decoded sound signal $\hat{X}_n$ is obtained by decoding a stereo code CS and a monaural decoded sound signal $\hat{X}_M$ represents a monaural decoded sound signal, the monaural decoded sound signal $\hat{X}_M$ is obtained by decoding a monaural code CM that is a code different from the stereo code CS, the n-th channel decoded sound signal $\hat{X}_n$ is obtained by decoding the stereo code CS without using either information obtained by decoding the monaural code CM or the monaural code CM;

a decoded sound common signal upmixing step of obtaining, for the each frame, an n-th channel upmixed common signal $\hat{Y}_{Mn}$, wherein the n-th channel upmixed common signal $\hat{Y}_{Mn}$ is obtained by upmixing the decoded sound common signal $\hat{Y}_M$ for the each channel by an upmixing process using the decoded sound common signal $\hat{Y}_M$ and inter-channel relationship information, and the inter-channel relationship information indicates a relationship between the channels of the stereo;

a monaural decoded sound upmixing step of obtaining, for the each frame, an n-th channel upmixed monaural decoded sound signal $\hat{X}_{Mn}$, wherein the n-th channel upmixed monaural decoded sound signal $\hat{X}_{Mn}$ is obtained by upmixing the monaural decoded sound signal $\hat{X}_M$ for the each channel by an upmixing process using the monaural decoded sound signal $\hat{X}_M$ and the inter-channel relationship information;

an n-th channel signal purification step of obtaining, for the each frame and for each corresponding sample t with respect to the each channel n, a sequence based on a value $\tilde{y}_{Mn}(t)=(1-\alpha_{Mn})\times\hat{y}_{Mn}(t)+\alpha_{Mn}\times\hat{x}_{Mn}(t)$ as an n-th channel purified upmixed signal $\tilde{Y}_{Mn}$, wherein the value $\tilde{y}_{Mn}(t)$ is obtained by adding a value on $\alpha_{Mn}\times\hat{x}_{Mn}(t)$ and a value $(1-\alpha_{Mn})\times\hat{y}_{Mn}(t)$, the value $\alpha_{Mn}\times\hat{x}_{Mn}$ (t) is obtained by multiplying an n-th channel purification weight $\alpha_{Mn}$ by a sample value $\hat{x}_{Mn}$ (t) of the n-th channel upmixed monaural decoded sound signal $\hat{X}_{Mn}$, the value $(1-\alpha_{Mn})\times\hat{y}_{Mn}$ (t) is obtained by multiplying a value $(1-\alpha_{Mn})$ by a sample value $\hat{y}_{Mn}(t)$ of the n-th channel upmixed common signal $\hat{Y}_{Mn}$, and the value $(1-\alpha_{Mn})$ is obtained by subtracting the n-th channel purification weight $\alpha_{Mn}$ from 1;

an n-th channel separation combination weight estimation step of obtaining, for the each frame with respect to the each channel n, a normalized inner product value for the n-th channel upmixed common signal $\hat{Y}_{Mn}$ of the n-th channel decoded sound signal $\hat{X}_n$ as an n-th channel separation combination weight $\beta_n$; and an n-th channel separation combination step of obtaining, for the each frame and for each corresponding sample t with respect to the each channel n, a sequence based on a value $\tilde{x}_n$ (t)=$\hat{x}_n$ (t)$-\beta n\times\hat{y}_{Mn}(t)+\beta_n\times\tilde{y}_{Mn}(t)$ as an n-th channel purified decoded sound signal $\tilde{X}_n$, wherein the value $\tilde{x}_n$ (t) is obtained by subtracting a value $\beta_n\times\hat{y}_{Mn}(t)$ from a sample value $\hat{x}_n(t)$ of the n-th channel decoded sound signal $\hat{X}_n$ and adding a value $\beta_n\times\tilde{y}_{Mn}(t)$, the value $\beta_n\times\hat{y}_{Mn}(t)$ is obtained by multiplying the n-th channel separation combination weight $\beta_n$ by the sample value $\hat{y}_{Mn}(t)$ of the n-th channel upmixed common signal $\hat{Y}_{Mn}$, and the value $\beta_n\times\tilde{y}_{Mn}(t)$ is obtained by multiplying the n-th channel separation combination weight $\beta_n$ by a sample value $\tilde{y}_{Mn}(t)$ of the n-th channel purified upmixed signal $\tilde{Y}_{Mn}$.

* * * * *